United States Patent
McBride et al.

(10) Patent No.: US 12,143,310 B2
(45) Date of Patent: *Nov. 12, 2024

(54) INTENT-BASED ORCHESTRATION USING NETWORK PARSIMONY TREES

(71) Applicant: Level 3 Communications, LLC, Broomfield, CO (US)

(72) Inventors: Kevin M. McBride, Lone Tree, CO (US); Brett E. Dwyer, Clermont, FL (US); James E. Sutherland, Vancouver, WA (US); Jamie Lin, Clayton, MO (US); Brent Smith, Arvada, CO (US); Glenn B. Balanoff, Arvada, CO (US); Frank Moss, Chesterfield, MO (US); Bryan Dreyer, Bellevue, WA (US)

(73) Assignee: Level 3 Communications, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/392,772

(22) Filed: Dec. 21, 2023

(65) Prior Publication Data

US 2024/0146667 A1 May 2, 2024

Related U.S. Application Data

(63) Continuation of application No. 18/137,791, filed on Apr. 21, 2023, now Pat. No. 11,855,911, which is a
(Continued)

(51) Int. Cl.
*H04L 47/70* (2022.01)
*G06F 16/22* (2019.01)
(Continued)

(52) U.S. Cl.
CPC .......... *H04L 47/82* (2013.01); *G06F 16/2246* (2019.01); *G06F 16/51* (2019.01);
(Continued)

(58) Field of Classification Search
CPC ..... H04L 47/82; H04L 67/51; H04L 41/0816; H04L 41/14; H04L 41/5009;
(Continued)

(56) References Cited

U.S. PATENT DOCUMENTS 10,333,724 B2   6/2019   Piro
11,423,886 B2 * 8/2022   Gruber ................... G10L 21/06
(Continued)

FOREIGN PATENT DOCUMENTS

WO   WO-2014146096   9/2014

*Primary Examiner* — Hitesh Patel
*Assistant Examiner* — Sujana Khakural

(57) ABSTRACT

Novel tools and techniques are provided for implementing intent-based orchestration using network parsimony trees. In various embodiments, in response to receiving a request for network services that comprises desired characteristics and performance parameters for the requested network services without information regarding specific hardware, hardware type, location, or network, a computing system might generate a request-based parsimony tree based on the desired characteristics and performance parameters. The computing system might access, from a datastore, a plurality of network-based parsimony trees that are each generated based on measured network metrics, might compare the request-based parsimony tree with each of one or more network-based parsimony trees to determine a fitness score for each network-based parsimony tree, and might identify a best-fit network-based parsimony tree based on the fitness scores. The computing system might identify and might allocate network resources based on the identified best-fit network-based parsimony tree, for providing the requested network services.

19 Claims, 24 Drawing Sheets

Related U.S. Application Data continuation of application No. 17/990,363, filed on Nov. 18, 2022, now Pat. No. 11,637,790, which is a continuation of application No. 17/747,041, filed on May 18, 2022, now Pat. No. 11,509,601, which is a continuation of application No. 17/176,066, filed on Feb. 15, 2021, now Pat. No. 11,343,201.

(60) Provisional application No. 63/067,597, filed on Aug. 19, 2020, provisional application No. 62/981,308, filed on Feb. 25, 2020.

(51) Int. Cl.
| | | |
|---|---|---|
| *G06F 16/51* | (2019.01) | |
| *G06N 3/04* | (2023.01) | |
| *G06T 11/00* | (2006.01) | |
| *G06T 11/20* | (2006.01) | |
| *H04L 41/0816* | (2022.01) | |
| *H04L 41/14* | (2022.01) | |
| *H04L 41/5009* | (2022.01) | |
| *H04L 41/5019* | (2022.01) | |
| *H04L 41/5054* | (2022.01) | |
| *H04L 43/045* | (2022.01) | |
| *H04L 47/762* | (2022.01) | |
| *H04L 67/51* | (2022.01) | |

(52) U.S. Cl.
CPC .............. *G06N 3/04* (2013.01); *G06T 11/001* (2013.01); *G06T 11/206* (2013.01); *H04L 41/0816* (2013.01); *H04L 41/14* (2013.01); *H04L 41/5009* (2013.01); *H04L 41/5019* (2013.01); *H04L 41/5054* (2013.01); *H04L 43/045* (2013.01); *H04L 47/762* (2013.01); *H04L 67/51* (2022.05)

(58) Field of Classification Search
CPC .............. H04L 41/5019; H04L 41/5054; H04L 43/045; H04L 47/76; G06F 16/2246; G06F 16/51; G06N 3/04; G06T 11/001; G06T 11/206
See application file for complete search history.

(56) References Cited

U.S. PATENT DOCUMENTS

| | | | |
|---|---|---|---|
| 11,574,242 | B1 | 2/2023 | Burke |
| 2012/0100847 | A1 | 4/2012 | Rahman |
| 2015/0295808 | A1 | 10/2015 | O'Malley |
| 2017/0171040 | A1* | 6/2017 | Randolph .............. G06F 16/29 |
| 2018/0343567 | A1 | 11/2018 | Ashrafi |
| 2019/0182177 | A1* | 6/2019 | Bugenhagen .......... H04L 47/56 |
| 2020/0162319 | A1 | 5/2020 | Szigeti |
| 2020/0193309 | A1 | 6/2020 | Hazard |
| 2021/0160154 | A1 | 5/2021 | Cohen |
| 2021/0266269 | A1 | 8/2021 | McBride |
| 2022/0278945 | A1 | 9/2022 | McBride |
| 2023/0096135 | A1 | 3/2023 | McBride |
| 2023/0269198 | A1 | 8/2023 | McBride |

\* cited by examiner

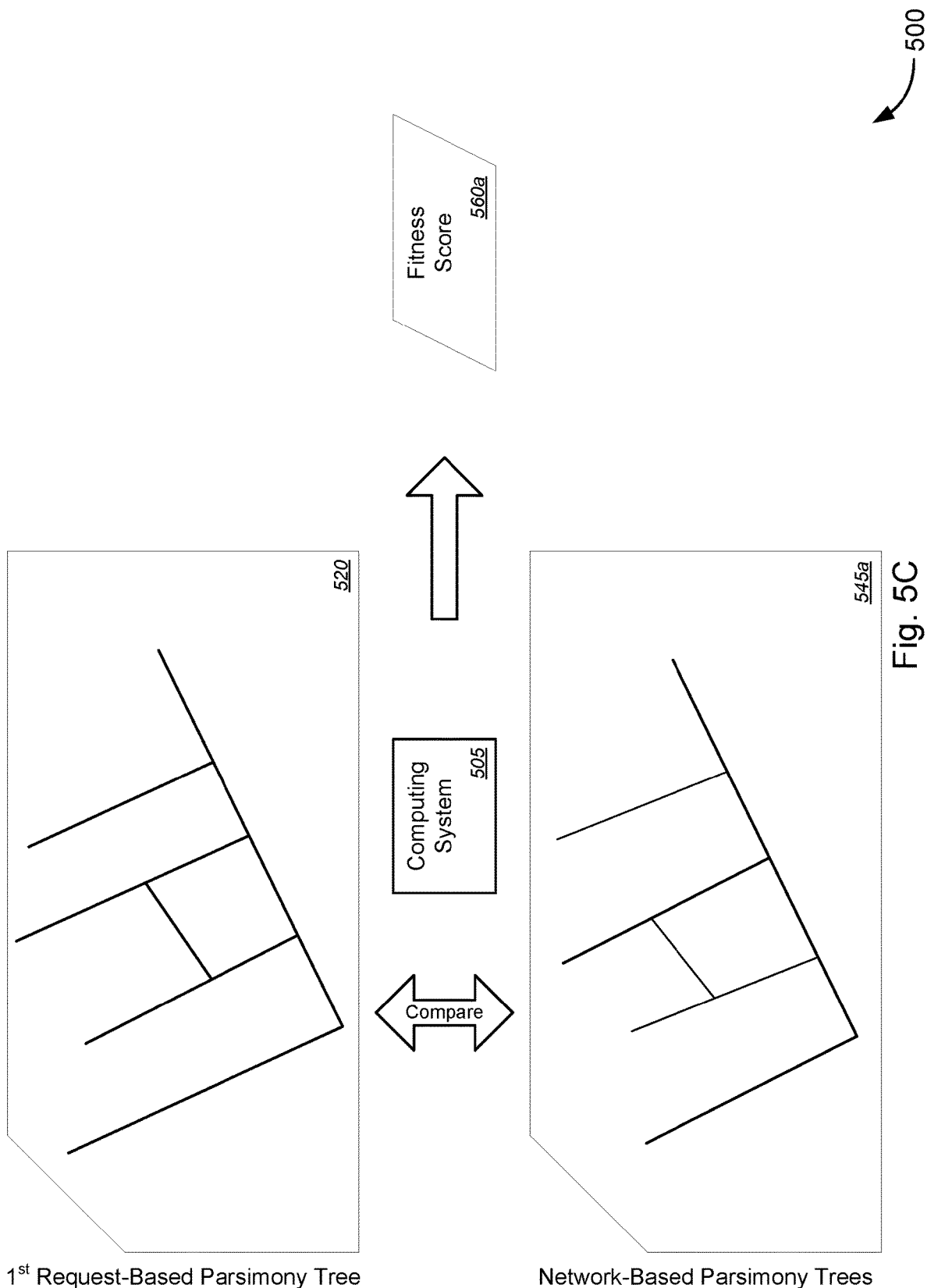

(e) 545e (f) 545f (g) 545g (h) 545h

500

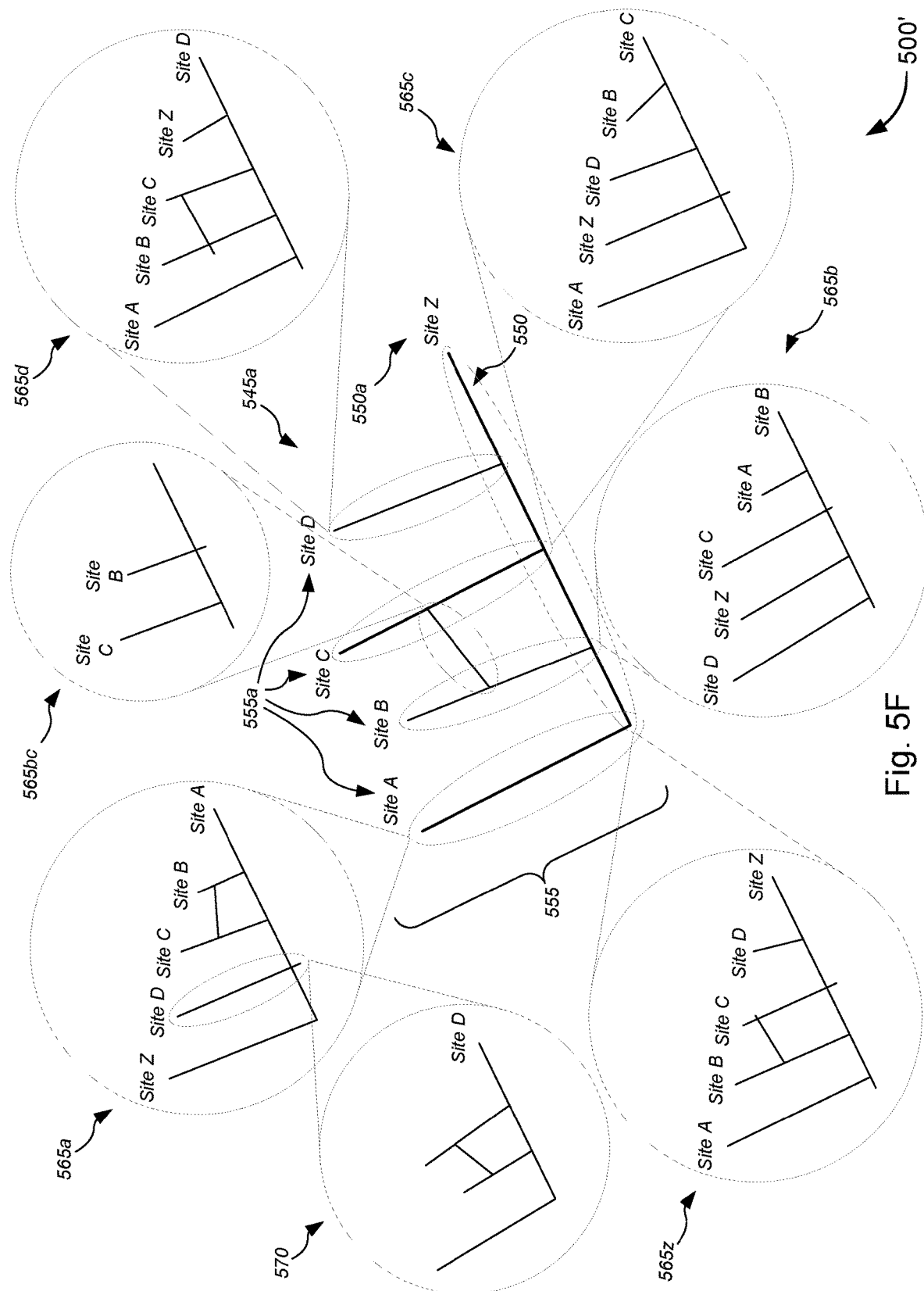

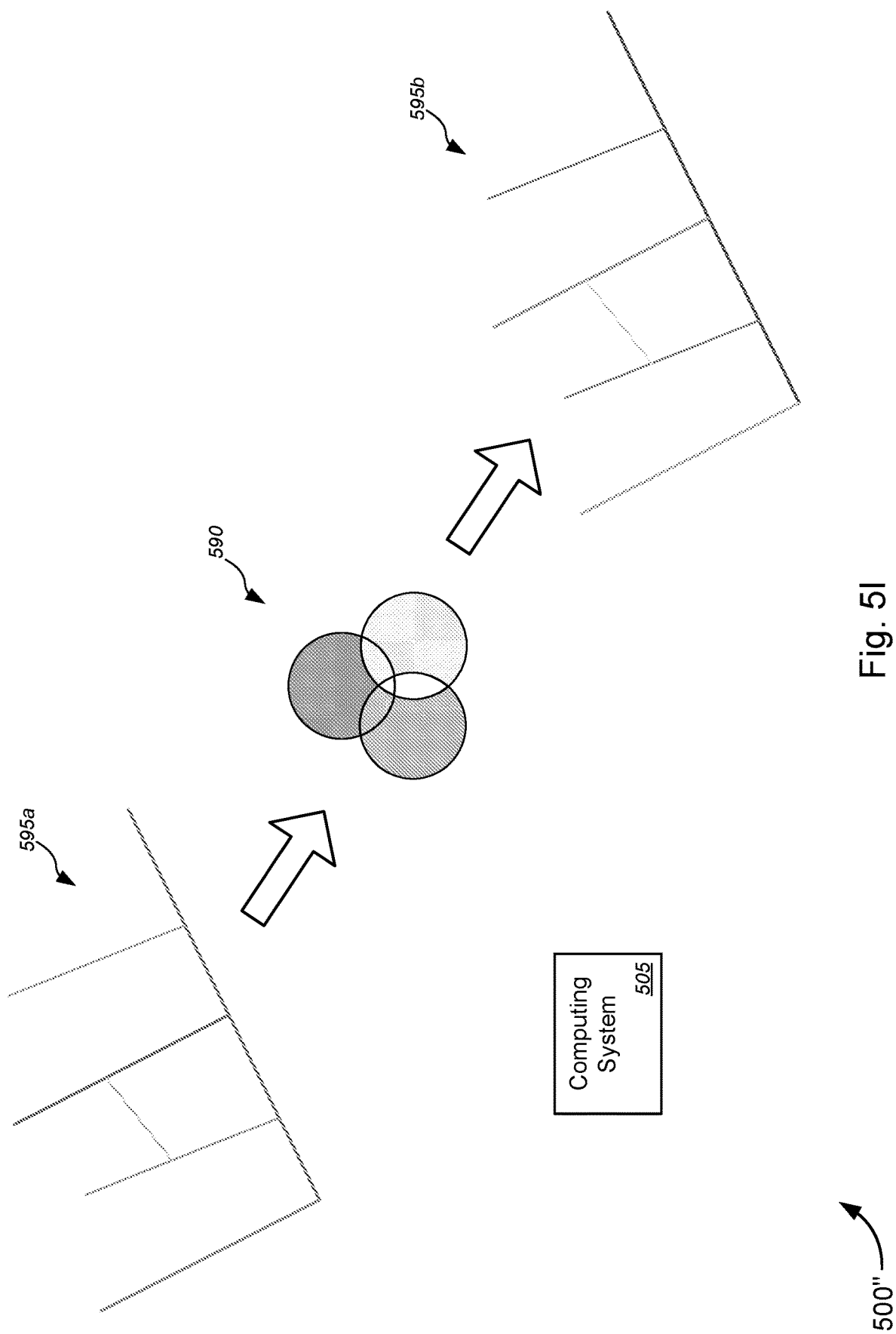

INTENT-BASED ORCHESTRATION USING NETWORK PARSIMONY TREES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network services orchestration, and, more particularly, to methods, systems, and apparatuses for implementing intent-based multi-tiered orchestration and automation and/or implementing intent-based orchestration using network parsimony trees.

BACKGROUND

In typical network resource allocation schemes, a customer might provide a request for network services from a set list of network services, which might include, among other things, information regarding one or more of specific hardware, specific hardware type, specific location, and/or specific network for providing network services, or the like. The customer might select the particular hardware, hardware type, location, and/or network based on stated or estimated performance metrics for these components or generic versions of these components, but might not convey the customer's specific desired performance parameters. The service provider then allocates network resources based on the selected one or more of specific hardware, specific hardware type, specific location, or specific network for providing network services, as indicated in the request.

Such specific requests, however, do not necessarily provide the service provider with the intent or expectations of the customer. Accordingly, the service provider will likely make network resource reallocation decisions based on what is best for the network from the perspective of the service provider, but not necessarily what is best for the customer. Importantly, these conventional systems do not utilize metadata in resource inventory databases for implementing intent-based service configuration, service conformance, and/or service auditing.

Further certain networks do not provide for automated or automatic reallocation of network resources based on performance metrics of the network and/or components or elements of the network. Accordingly, such networks cannot automatically reallocate network resources based on both performance metrics of the network and/or components or elements of the network and based on intent-based requests from a customer.

Hence, there is a need for more robust and scalable solutions for implementing network services orchestration, and, more particularly, to methods, systems, and apparatuses for implementing intent-based multi-tiered orchestration and automation and/or implementing intent-based orchestration using network parsimony trees.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 5A-5I is a schematic diagram illustrating various implementations for intent-based orchestration using network parsimony trees, in accordance with various embodiments.

DETAILED DESCRIPTION OF CERTAIN EMBODIMENTS

Overview

Figure 1:
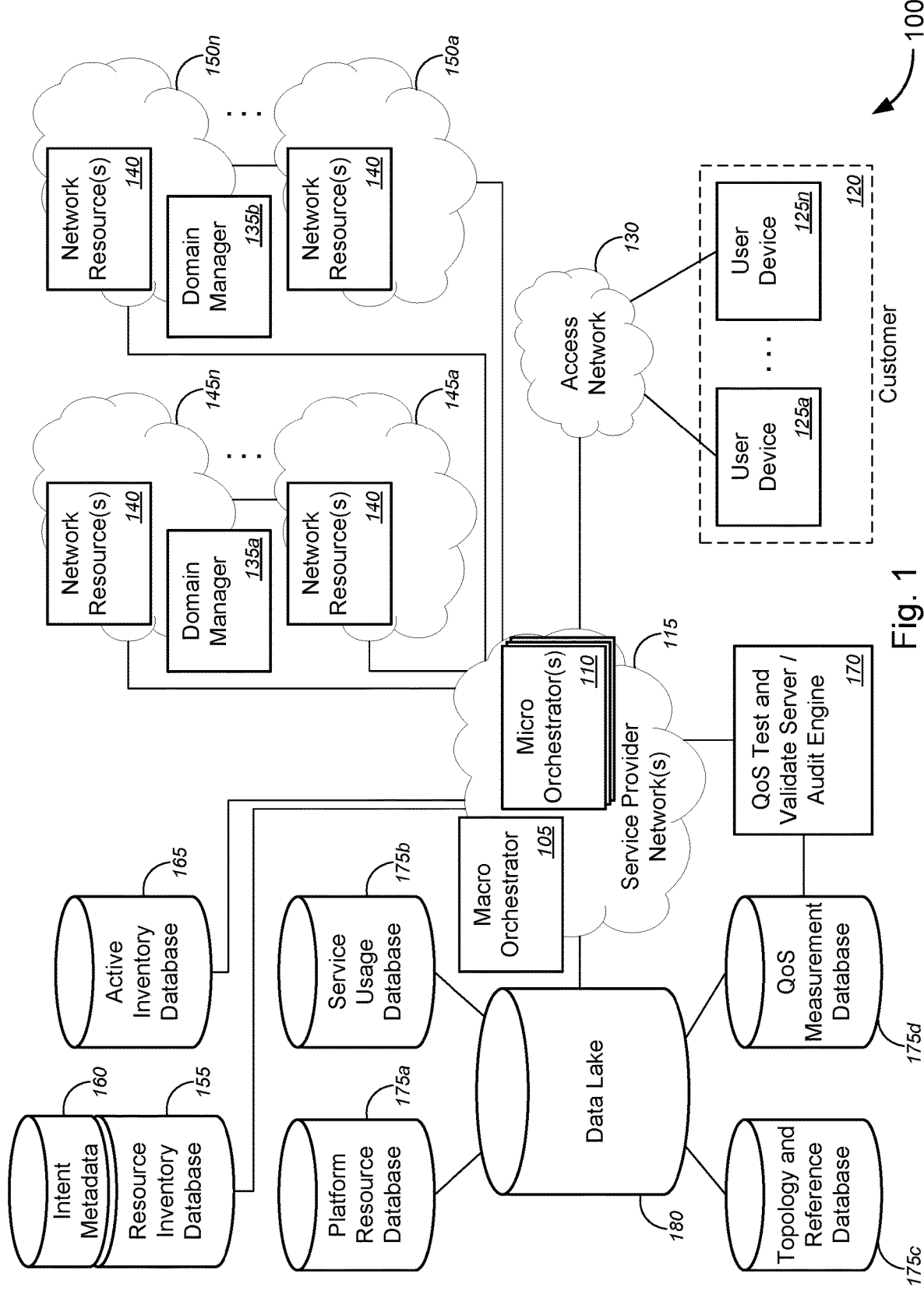
FIG. 1 is a schematic diagram illustrating a system for implementing intent-based multi-tiered orchestration and automation and/or implementing intent-based orchestration using network parsimony trees, in accordance with various embodiments.

Various embodiments provide tools and techniques for implementing network services orchestration, and, more particularly, to methods, systems, and apparatuses for implementing intent-based multi-tiered orchestration and automation and/or implementing intent-based orchestration using network parsimony trees.

In various embodiments, a macro orchestrator might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator might send, to a first micro orchestrator among a plurality of micro orchestrators, the received request for network services, where the macro orchestrator automates, manages, or controls each of the plurality of micro orchestrators, while each micro orchestrator automates, manages, or controls at least one of a plurality of domain managers or a plurality of network resources.

In response to receiving the request for network services, the first micro orchestrator might identify one or more first network resources among a first plurality of network resources for providing the requested network services, based at least in part on the desired characteristics and performance parameters, and based at least in part on a determination that the one or more network resources are capable of providing network services having the desired characteristics and performance parameters. The first micro orchestrator might allocate at least one first network resource among the identified one or more first network resources for providing the requested network services.

In some embodiments, the first micro orchestrator might (continually, occasionally, randomly, or in response to a request for data, or the like) receive, from one or more first domain managers among a first plurality of domain managers in communication with the first micro orchestrator, data regarding the first plurality of network resources that are automated, managed, or controlled by each of the one or more first domain managers. In such cases, identifying, with the first micro orchestrator, one or more first network resources among a first plurality of network resources for providing the requested network services might comprise identifying, with the first micro orchestrator, one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

According to some embodiments, allocating, with the first micro orchestrator, at least one first network resource among the identified one or more first network resources for providing the requested network services might comprise: sending, with the first micro orchestrator, commands to at least one first domain manager among the one or more first domain managers that automate, manage, or control the at least one first network resource; and in response to receiving the commands from the first micro orchestrator: determining, with the at least one first domain manager, an intent based at least in part on the desired characteristics and performance parameters as comprised in the request for network services; generating and sending, with the at least one first domain manager, device language instructions for allocating the at least one first network resource; and implementing, with the at least one first domain manager, the at least one first network resource on the user device associated with the customer, to provide the requested network services.

In some embodiments, one of the macro orchestrator or the first micro orchestrator might update a resource database with information indicating that the at least one first network resource has been allocated for providing the requested network services and with information indicative of the desired characteristics and performance parameters as comprised in the request for network services. In some cases, an audit engine might determine whether each of the identified one or more first network resources conforms with the desired characteristics and performance parameters. In some instances, determining whether each of the identified one or more first network resources conforms with the desired characteristics and performance parameters might comprise determining, with the audit engine, whether each of the identified one or more first network resources conforms with the desired characteristics and performance parameters on a periodic basis or in response to a request to perform an audit. Alternatively, or additionally, determining whether each of the identified one or more first network resources conforms with the desired characteristics and performance parameters might comprise determining, with the audit engine, whether each of the identified one or more first network resources conforms with the desired characteristics and performance parameters, by: measuring one or more network performance metrics of each of the identified one or more first network resources; comparing, with the audit engine, the measured one or more network performance metrics of each of the identified one or more first network resources with the desired performance parameters; determining characteristics of each of the identified one or more first network resources; and comparing, with the audit engine, the determined characteristics of each of the identified one or more first network resources with the desired characteristics.

In such cases, each of the one or more network performance metrics might include, without limitation, at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

According to some embodiments, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, the first micro orchestrator either might reconfigure the at least one identified network resource to provide the desired characteristics and performance parameters; or might reallocate at least one other identified network resources among the identified one or more first network resources for providing the requested network services.

In some aspects, each intent might be a goal for the service. These are not policy related. Intents might typically be performance related, or service component quantum oriented, which might mean delay, jitter, packet loss (performance), or service component (asset or path) types, geography, color, attribute, etc. might be considered. This means that the state engines in the service conformance (which might be on a control plane) must monitor and/or store those in local profiles for the bearer and/or service plane in order to make intent-based assignment decisions. These will require closed loop implementation, and the system might implement auditing to ensure that the state is tracked appropriately and that the network resources that are used for fulfilling requested network resources.

Importantly, the various systems utilize metadata in resource inventory databases (e.g., in resource inventory database, intent metadata database, or an active inventory database, or the like) as well a multi-tiered orchestration system for implementing intent-based multi-tiered orchestration and automation, which may also provide for implementation of intent-based services orchestration, as described in greater detail in the '095, '244, and '884 Applications (which have already been incorporated herein by reference in their entirety for all purposes), implementation of intent-based service configuration, service conformance, and/or service auditing, as described in greater detail in the '634 and '498 Applications (which have already been incorporated herein by reference in their entirety for all purposes), and/or implementation of disaggregated and distributed composable infrastructure, as described in greater detail in the '308 Application (which has already been incorporated herein by reference in its entirety for all purposes).

In some aspects, one or more parsimony trees might be generated, based on network telemetry data of one or more networks, where each parsimony tree might be a graphical representation of characteristics and performance parameters based on the network telemetry data of the one or more networks, and the system might perform network orchestration and automation based on the generated one or more parsimony trees. In particular, a macro orchestrator and/or a computing system might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator and/or the computing system might send, to a first micro orchestrator among a plurality of micro orchestrators, the received request for network services, where the macro orchestrator automates, manages, or controls each of the plurality of micro orchestrators, while each micro orchestrator automates, manages, or controls at least one of a plurality of domain managers or a plurality of network resources. In response to receiving the request for network services, the first micro orchestrator and/or the computing system might generate a first request-based parsimony tree based at least in part on the desired characteristics and performance parameters contained in the request for network services.

According to some embodiments, the first request-based parsimony tree might be a graphical representation including, without limitation, an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services, and/or the like. In some cases, the plurality of micro orchestrators might each include, but is not limited to, one of a server computer over a network, a cloud-based computing system over a network, or a distributed computing system, and/or the like.

The first micro orchestrator and/or the computing system might access, from a datastore, a plurality of first network-based parsimony trees, each of the plurality of first network-based parsimony trees being generated based on measured network metrics. In some embodiments, each first network-based parsimony tree might be a graphical representation including, but not limited to, an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

According to some embodiments, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

According to some embodiments, the first micro orchestrator and/or the computing system might compare the first request-based parsimony tree with one or more first network-based parsimony trees among the plurality of first network-based parsimony trees to determine a fitness score for each first network-based parsimony tree. In some instances, each fitness score might be a value indicative of a level of heuristic matching (in some cases, embodied as a percentage match) between the first request-based parsimony tree with one of the one or more first network-based parsimony trees. In some embodiments, comparing the first request-based parsimony tree with one or more first network-based parsimony trees might comprise comparing the first request-based parsimony tree with one or more first network-based parsimony trees using one or more GPUs, or the like.

Merely by way of example, in some cases, the first micro orchestrator and/or the computing system might identify a best-fit network-based parsimony tree among the one or more first network-based parsimony trees based on the fitness scores of the one or more first network-based parsimony trees; might identify one or more first network resources among a first plurality of network resources for providing the requested network services, based at least in part on network resources represented within the identified best-fit network-based parsimony tree; and might allocate at least one first network resource among the identified one or more first network resources for providing the requested network services. According to some embodiments, identifying the best-fit network-based parsimony tree might comprise identifying the most parsimonious first network-based parsimony tree for providing the requested network resources. That is, the first micro orchestrator and/or the computing system might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one ML system, at least one AI systems, or at least one NN system, and/or the like.

In some embodiments, the first micro orchestrator and/or the computing system might apply a first filter to at least one first network-based parsimony tree among the one or more first network-based parsimony trees to filter out one or more characteristics or one or more sub-characteristics, prior to comparing the first request-based parsimony tree with the one or more first network-based parsimony trees. According to some embodiments, the characteristics of the third and fourth portions might include color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, alternative or additional to applying the first filter, the first micro orchestrator and/or the computing system might apply a second filter to at least one first network-based parsimony tree among the one or more first network-based parsimony trees to change the color temperature based on changes in measured network metrics.

According to some embodiments, the first micro orchestrator and/or the computing system might receive updated measured network metrics; might, in response to receiving the updated measured network metrics, generate a plurality of updated first network-based parsimony trees; and might replace the plurality of first network-based parsimony trees in the datastore with the plurality of updated first network-based parsimony trees. In some embodiments, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file (e.g., .jpg file, .tiff file, .gif file, .bmp file, .png file, .dwf file, .dwg file, .drw file, .stl file, .pdf file, .svg file, .cgm file, etc.).

In some embodiments, rather than a single request-based parsimony tree being generated in response to receiving the request for network services, the first micro orchestrator and/or the computing system might generate a plurality of first request-based parsimony trees, each representing a desired characteristic or performance parameter, and the subsequent functions performed by the first orchestrator and/or the computing system might be performed on this plurality of first request-based parsimony trees rather than the single request-based parsimony tree.

Importantly, the use of parsimony trees for implementing intent-based orchestration and automation of network functionalities, especially coupled with the use of GPUs and/or intelligent systems (e.g., machine learning, AI, neural networks, etc.), results in less computationally intense determination of intent compared with using CPUs or the like (with or without using intelligent systems), and thus enables more efficient (or improved) intent-based orchestration and automation of network functionalities.

These and other functions of the system and method are described in greater detail above with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network configuration technology, network resource allocation technology, and/or the like. In other aspects, certain embodiments, can improve the functioning of a computer or network system itself (e.g., computing devices or systems that form parts of the network, computing devices or systems, network elements or the like for performing the functionalities described below, etc.), for example, by receiving, with a computing system, a request for network services from a user device associated with a customer, the request for network services comprising desired characteristics and performance parameters for the requested network services, without information regarding any of specific hardware, specific hardware type, specific location, or specific network for providing the requested network services; in response to receiving the request for network services, generating, with the computing system, a first request-based parsimony tree based at least in part on the desired characteristics and performance parameters contained in the request for network services, the first request-based parsimony tree being a graphical representation comprising an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services; accessing, with the computing system and from a datastore, a plurality of first network-based parsimony trees, each of the plurality of first network-based parsimony trees being generated based on measured network metrics, each first network-based parsimony tree being a graphical representation comprising an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics; comparing, with the computing system, the first request-based parsimony tree with one or more first network-based parsimony trees among the plurality of first network-based parsimony trees to determine a fitness score for each first network-based parsimony tree, each fitness score being a value indicative of a level of heuristic matching between the first request-based parsimony tree with one of the one or more first network-based parsimony trees; identifying, with the computing system, a best-fit network-based parsimony tree among the one or more first network-based parsimony trees based on the fitness scores of the one or more first network-based parsimony trees; identifying, with the computing system, one or more first network resources among a first plurality of network resources for providing the requested network services, based at least in part on network resources represented within the identified best-fit network-based parsimony tree; and allocating, with the computing system, at least one first network resource among the identified one or more first network resources for providing the requested network services; and/or the like.

In particular, to the extent any abstract concepts are present in the various embodiments, those concepts can be implemented as described herein by devices, software, systems, and methods that involve specific novel functionality (e.g., steps or operations), such as, in response to receiving a request for network services that comprises desired characteristics and performance parameters for the requested network services without information regarding specific hardware, hardware type, location, or network, generating, with a computing system, a request-based parsimony tree based on the desired characteristics and performance parameters; accessing, with the computing system and from a datastore, a plurality of network-based parsimony trees that are each generated based on measured network metrics; comparing, with the computing system, the request-based parsimony tree with each of one or more network-based parsimony trees to determine a fitness score for each network-based parsimony tree; identifying, with the computing system, a best-fit network-based parsimony tree based on the fitness scores; identifying and allocating, with the computing system, network resources based on the identified best-fit network-based parsimony tree, for providing the requested network services; and/or the like, to name a few examples, that extend beyond mere conventional computer processing operations. These functionalities can produce tangible results outside of the implementing computer system, including, merely by way of example, ability to improve network functions, network resource allocation and utilization, network orchestration and automation, and/or the like, in various embodiments based on the intent-driven requests that are tagged as metadata or the like in resource databases for network resources used to fulfill network service requests by customers, and based on the multi-tiered orchestration and automation of such intent-driven requests, which may be observed or measured by customers and/or service providers. Further, the use of parsimony trees for implementing intent-based orchestration and automation of network functionalities, especially coupled with the use of GPUs and/or intelligent systems (e.g., machine learning, AI, neural networks, etc.), results in less computationally intense determination of intent compared with using CPUs or the like (with or without using intelligent systems), and thus enables more efficient (or improved) intent-based orchestration and automation of network functionalities.

In an aspect, a method might comprise receiving, with a macro orchestrator over a network, a request for network services from a user device associated with a customer, the request for network services comprising desired characteristics and performance parameters for the requested network services, without information regarding any of specific hardware, specific hardware type, specific location, or specific network for providing the requested network services; sending, with the macro orchestrator and to a first micro orchestrator among a plurality of micro orchestrators, the received request for network services, wherein the macro orchestrator automates, manages, or controls each of the plurality of micro orchestrators, while each micro orchestrator automates, manages, or controls at least one of a plurality of domain managers or a plurality of network resources; in response to receiving the request for network services, identifying, with the first micro orchestrator, one or more first network resources among a first plurality of network resources for providing the requested network services, based at least in part on the desired characteristics and performance parameters, and based at least in part on a determination that the one or more network resources are capable of providing network services having the desired characteristics and performance parameters; and allocating, with the first micro orchestrator, at least one first network resource among the identified one or more first network resources for providing the requested network services.

In some embodiments, the macro orchestrator and the plurality of micro orchestrators might each comprise one of a server computer over a network, a cloud-based computing system over a network, or a distributed computing system, and/or the like. In some cases, the desired performance parameters might comprise at least one of a maximum latency, a maximum jitter, a maximum packet loss, or a maximum number of hops, and/or the like. In some instances, the desired characteristics might comprise at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

According to some embodiments, the method might further comprise receiving, with the first micro orchestrator and from one or more first domain managers among a first plurality of domain managers in communication with the first micro orchestrator, data regarding the first plurality of network resources that are automated, managed, or controlled by each of the one or more first domain managers. In such cases, identifying, with the first micro orchestrator, one or more first network resources among a first plurality of network resources for providing the requested network services might comprise identifying, with the first micro orchestrator, one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

In some embodiments, allocating, with the first micro orchestrator, at least one first network resource among the identified one or more first network resources for providing the requested network services might comprise: sending, with the first micro orchestrator, commands to at least one first domain manager among the one or more first domain managers that automate, manage, or control the at least one first network resource; and in response to receiving the commands from the first micro orchestrator: determining, with the at least one first domain manager, an intent based at least in part on the desired characteristics and performance parameters as comprised in the request for network services; generating and sending, with the at least one first domain manager, device language instructions for allocating the at least one first network resource; and implementing, with the at least one first domain manager, the at least one first network resource on the user device associated with the customer, to provide the requested network services.

According to some embodiments, the macro orchestrator might comprise a business orchestrator, wherein the first micro orchestrator might comprise a network resource orchestrator, wherein the first plurality of domain managers each might comprise one of a physical network function ("PNF") domain manager or a virtual network function ("VNF") domain manager, wherein the first plurality of domain managers each automates, manages, or controls each of a plurality of network resources located on one or more network devices in the network. Alternatively, or additionally, the macro orchestrator might comprise a business orchestrator, wherein the first micro orchestrator might comprise a compute resource orchestrator, wherein the identified one or more first network resources might comprise a plurality of compute resources, wherein the first plurality of domain managers each might comprise one of a compute domain manager, a memory domain manager, or a storage domain manager, and/or the like, wherein the first plurality of domain managers each automates, manages, or controls each of the plurality of compute resources located on at least one of one or more central processing unit ("CPU") pools, one or more graphics processing unit ("GPU") pools, one or more random access memory ("RAM") pools, or one or more data storage pools, and/or the like. In some cases, the data regarding the first plurality of network resources might be analyzed after being received by the first micro orchestrator in response to one of a pull data distribution instruction, a push data distribution instruction, or a hybrid push-pull data distribution instruction, and/or the like.

In some embodiments, the method might further comprise updating, with one of the macro orchestrator or the first micro orchestrator, a resource database with information indicating that the at least one first network resource has been allocated for providing the requested network services and with information indicative of the desired characteristics and performance parameters as comprised in the request for network services.

According to some embodiments, the method might further comprise determining, with an audit engine, whether each of the identified one or more first network resources conforms with the desired characteristics and performance parameters. In some instances, determining whether each of the identified one or more first network resources conforms with the desired characteristics and performance parameters might comprise determining, with the audit engine, whether each of the identified one or more first network resources conforms with the desired characteristics and performance parameters on a periodic basis or in response to a request to perform an audit. Alternatively, or additionally, determining whether each of the identified one or more first network resources conforms with the desired characteristics and performance parameters might comprise determining, with the audit engine, whether each of the identified one or more first network resources conforms with the desired characteristics and performance parameters, by: measuring one or more network performance metrics of each of the identified one or more first network resources; comparing, with the audit engine, the measured one or more network performance metrics of each of the identified one or more first network resources with the desired performance parameters; determining characteristics of each of the identified one or more first network resources; and comparing, with the audit engine, the determined characteristics of each of the identified one or more first network resources with the desired characteristics.

In such cases, each of the one or more network performance metrics might comprise at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

In some embodiments, the method might further comprise, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, performing one of: reconfiguring, with the first micro orchestrator, the at least one identified network resource to provide the desired characteristics and performance parameters; or reallocating, with the first micro orchestrator, at least one other identified network resources among the identified one or more first network resources for providing the requested network services.

In another aspect, a system might comprise a macro orchestrator and a first micro orchestrator among a plurality of micro orchestrators. The macro orchestrator might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the macro orchestrator to: receive, over a network, a request for network services from a user device associated with a customer, the request for network services comprising desired characteristics and performance parameters for the requested network services, without information regarding any of specific hardware, specific hardware type, specific location, or specific network for providing the requested network services; and send, to the first micro orchestrator among the plurality of micro orchestrators, the received request for network services, wherein the macro orchestrator automates, manages, or controls each of the plurality of micro orchestrators, while each micro orchestrator automates, manages, or controls at least one of a plurality of domain managers or a plurality of network resources.

The first micro orchestrator among the plurality of micro orchestrators might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the first micro orchestrator to: receive the request for network services from the macro orchestrator; in response to receiving the request for network services, identify one or more first network resources among a first plurality of network resources for providing the requested network services, based at least in part on the desired characteristics and performance parameters, and based at least in part on a determination that the one or more network resources are capable of providing network services having the desired characteristics and performance parameters; and allocate at least one first network resource among the identified one or more first network resources for providing the requested network services.

In some embodiments, the macro orchestrator and the plurality of micro orchestrators each might comprise one of a server computer over a network, a cloud-based computing system over a network, or a distributed computing system, and/or the like. In some cases, the desired performance parameters might comprise at least one of a maximum latency, a maximum jitter, a maximum packet loss, or a maximum number of hops, and/or the like. In some instances, the desired characteristics might comprise at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

According to some embodiments, the system might further comprise one or more first domain managers among a first plurality of domain managers in communication with the first micro orchestrator. The second set of instructions, when executed by the at least one second processor, might further cause the first micro orchestrator to: receive, from the one or more first domain managers, data regarding the first plurality of network resources that are automated, managed, or controlled by each of the one or more first domain managers. In such cases, identifying one or more first network resources among a first plurality of network resources for providing the requested network services might comprise identifying one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

In some embodiments, the second set of instructions, when executed by the at least one second processor, might further cause the first micro orchestrator to: update a resource database with information indicating that the at least one first network resource has been allocated for providing the requested network services and with information indicative of the desired characteristics and performance parameters as comprised in the request for network services.

According to some embodiments, the system might further comprise an audit engine configured to determine whether each of the identified one or more first network resources conforms with the desired characteristics and performance parameters. In such cases, the second set of instructions, when executed by the at least one second processor, might further cause the first micro orchestrator to: based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, perform one of: reconfiguring the at least one identified network resource to provide the desired characteristics and performance parameters; or reallocating at least one other identified network resources among the identified one or more first network resources for providing the requested network services.

In an aspect, a method might comprise receiving, with a computing system, a request for network services from a user device associated with a customer, the request for network services comprising desired characteristics and performance parameters for the requested network services, without information regarding any of specific hardware, specific hardware type, specific location, or specific network for providing the requested network services; and in response to receiving the request for network services, generating, with the computing system, a first request-based parsimony tree based at least in part on the desired characteristics and performance parameters contained in the request for network services, the first request-based parsimony tree being a graphical representation comprising an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services. The method might also comprise accessing, with the computing system and from a datastore, a plurality of first network-based parsimony trees, each of the plurality of first network-based parsimony trees being generated based on measured network metrics, each first network-based parsimony tree being a graphical representation comprising an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

The method might further comprise comparing, with the computing system, the first request-based parsimony tree with one or more first network-based parsimony trees among the plurality of first network-based parsimony trees to determine a fitness score for each first network-based parsimony tree, each fitness score being a value indicative of a level of heuristic matching between the first request-based parsimony tree with one of the one or more first network-based parsimony trees; identifying, with the computing system, a best-fit network-based parsimony tree among the one or more first network-based parsimony trees based on the fitness scores of the one or more first network-based parsimony trees; identifying, with the computing system, one or more first network resources among a first plurality of network resources for providing the requested network services, based at least in part on network resources represented within the identified best-fit network-based parsimony tree; and allocating, with the computing system, at least one first network resource among the identified one or more first network resources for providing the requested network services.

In some embodiments, the computing system might comprise one of a server computer over a network, one or more graphics processing units ("GPUs"), a cloud-based computing system over a network, or a distributed computing system, and/or the like. In some cases, the desired performance parameters might comprise at least one of a maximum latency, a maximum jitter, a maximum packet loss, a maximum cost, or a maximum number of hops, and/or the like. In some instances, the desired characteristics might comprise at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

According to some embodiments, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk.

In some embodiments, the characteristics of the first and second portions and the characteristics of the third and fourth portions might comprise at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

According to some embodiments, the method might further comprise applying, with the computing system, a first filter to at least one first network-based parsimony tree among the one or more first network-based parsimony trees to filter out one or more characteristics or one or more sub-characteristics, prior to comparing the first request-based parsimony tree with the one or more first network-based parsimony trees. Alternatively, or additionally, the characteristics of the third and fourth portions might comprise color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, the method might further comprise applying, with the computing system, a second filter to at least one first network-based parsimony tree among the one or more first network-based parsimony trees to change the color temperature based on changes in measured network metrics.

In some embodiments, generating the first request-based parsimony tree might comprise generating a plurality of first request-based parsimony trees, each representing a desired characteristic or performance parameter. In some cases, the plurality of first network-based parsimony trees might comprise a plurality of first network-based parsimony trees corresponding to each of the desired characteristics and performance parameters, each of the plurality of first network-based parsimony trees being generated based on measured network metrics. In some instances, comparing the first request-based parsimony tree with one or more first network-based parsimony trees among the plurality of first network-based parsimony trees might comprise comparing, with the computing system, each first request-based parsimony tree representing one of the desired characteristics and performance parameters with a corresponding plurality of first network-based parsimony trees. In some cases, identifying the best-fit network-based parsimony tree might comprise identifying, with the computing system, the best-fit network-based parsimony tree corresponding to each of the desired characteristics and performance parameters. In some instances, identifying the one or more first network resources might be based at least in part on the network resources represented within the identified best-fit network-based parsimony trees.

According to some embodiments, comparing the first request-based parsimony tree with one or more first network-based parsimony trees might comprise comparing the first request-based parsimony tree with one or more first network-based parsimony trees using one or more graphics processing units ("GPUs"). Merely by way of example, in some cases, each portion of each first network-based parsimony tree might be represented by a second network-based parsimony tree among a plurality of second network-based parsimony tree that is indicative of characteristics and performance parameters of that portion, wherein each portion of each second network-based parsimony tree might be represented by a third network-based parsimony tree among a plurality of third network-based parsimony tree that is indicative of characteristics and performance parameters of that portion.

In some embodiments, the method might further comprise receiving, with the computing system, updated measured network metrics; and in response to receiving the updated measured network metrics, generating, with the computing system, a plurality of updated first network-based parsimony trees, and replacing, with the computing system, the plurality of first network-based parsimony trees in the datastore with the plurality of updated first network-based parsimony trees. In some instances, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file.

According to some embodiments, identifying the best-fit network-based parsimony tree might comprise identifying the most parsimonious first network-based parsimony tree for providing the requested network resources. Merely by way of example, in some cases, at least one of generating first network-based parsimony trees, comparing the first request-based parsimony tree with the one or more first network-based parsimony tree, identifying the best-fit network-based parsimony tree, or identifying the one or more first network resources might be performed using one or more of at least one machine learning ("ML") system, at least one artificial intelligence ("AI") systems, or at least one neural network ("NN") system, and/or the like.

In some embodiments, receiving the request for network services from the user device associated with the customer might comprise receiving, with a macro orchestrator over a network, a request for network services from a user device associated with a customer. In some instances, generating the first request-based parsimony tree might comprise generating, with a first micro orchestrator among a plurality of micro orchestrators, a first request-based parsimony tree. In some cases, accessing the plurality of first network-based parsimony trees from the datastore might comprise accessing, with the first micro orchestrator and from the datastore, a plurality of first network-based parsimony trees. In some instances, comparing the first request-based parsimony tree with the one or more first network-based parsimony trees might comprise comparing, with the first micro orchestrator, the first request-based parsimony tree with one or more first network-based parsimony trees. In some cases, identifying the best-fit network-based parsimony tree among the one or more first network-based parsimony trees might comprise identifying, with the first micro orchestrator, a best-fit network-based parsimony tree among the one or more first network-based parsimony trees. In some instances, identifying the one or more first network resources for providing the requested network services might comprise identifying, with the first micro orchestrator, one or more first network resources among a first plurality of network resources for providing the requested network services. In some cases, allocating the at least one first network resource among the identified one or more first network resources for providing the requested network services might comprise allocating, with the first micro orchestrator, at least one first network resource among the identified one or more first network resources for providing the requested network services In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a request for network services from a user device associated with a customer, the request for network services comprising desired characteristics and performance parameters for the requested network services, without information regarding any of specific hardware, specific hardware type, specific location, or specific network for providing the requested network services; in response to receiving the request for network services, generate a first request-based parsimony tree based at least in part on the desired characteristics and performance parameters contained in the request for network services, the first request-based parsimony tree being a graphical representation comprising an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services; access, from a datastore, a plurality of first network-based parsimony trees, each of the plurality of first network-based parsimony trees being generated based on measured network metrics, each first network-based parsimony tree being a graphical representation comprising an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics; compare the first request-based parsimony tree with one or more first network-based parsimony trees among the plurality of first network-based parsimony trees to determine a fitness score for each first network-based parsimony tree, each fitness score being a value indicative of a level of heuristic matching between the first request-based parsimony tree with one of the one or more first network-based parsimony trees; identify a best-fit network-based parsimony tree among the one or more first network-based parsimony trees based on the fitness scores of the one or more first network-based parsimony trees; identify one or more first network resources among a first plurality of network resources for providing the requested network services, based at least in part on network resources represented within the identified best-fit network-based parsimony tree; and allocate at least one first network resource among the identified one or more first network resources for providing the requested network services.

In some embodiments, the computing system comprises one of a server computer over a network, one or more graphics processing units ("GPUs"), a cloud-based computing system over a network, or a distributed computing system, and/or the like.

In yet another aspect, a method might comprise generating, with a computing system, one or more parsimony trees, based on network telemetry data of one or more networks, wherein each parsimony tree is a graphical representation of characteristics and performance parameters based on the network telemetry data of the one or more networks; and performing, with the computing system, network orchestration and automation based on the generated one or more parsimony trees.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-8 illustrate some of the features of the method, system, and apparatus for implementing network services orchestration, and, more particularly, to methods, systems, and apparatuses for implementing intent-based multi-tiered orchestration and automation and/or implementing intent-based orchestration using network parsimony trees, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing intent-based multi-tiered orchestration and automation and/or implementing intent-based orchestration using network parsimony trees, in accordance with various embodiments.

In the non-limiting embodiment of FIG. 1, system 100 might comprise a macro orchestrator 105 and one or more micro orchestrators in service provider network(s) 115. In some embodiments, the macro orchestrator and the one or more micro orchestrators might each include, but is not limited to, one of a server computer over a network, a cloud-based computing system over a network, or a distributed computing system, and/or the like. The macro orchestrator 105 might receive (either via wired or wireless connection) a request for network services from a customer 120, via one or more user devices 125a-125n (collectively, "user devices 125" or the like), via access network 130. The one or more user devices 125 might include, without limitation, at least one of a smart phone, a mobile phone, a tablet computer, a laptop computer, a desktop computer, and/or the like. The request for network services might include desired characteristics and performance parameters for the requested network services, without information regarding any of specific hardware, specific hardware type, specific location, or specific network for providing the requested network services.

The desired performance parameters, in some embodiments, might include, but is not limited to, at least one of a maximum latency, a maximum jitter, a maximum packet loss, or a maximum number of hops, and/or the like. The desired characteristics, according to some embodiments, might include, without limitation, at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

System 100 might further comprise one or more domain managers 135 and network resources 140 that may be disposed, and/or communicatively coupled to, networks 145a-145n (collectively, "networks 145" or the like) and/or networks 150a-150n (collectively, "networks 150" or the like). The one or more domain managers 135 might, in some cases, include domain managers 135a in network(s) 145 or domain managers 135b in network(s) 150, or the like. In some embodiments, the macro orchestrator 105 might include, without limitation, a business orchestrator, or the like. In some instances, the one or more micro orchestrators 110 might each include, but is not limited to, one of a network resource orchestrator(s), a compute resource orchestrator(s), a billing resource orchestrator(s), or an order orchestrator(s), or the like. In some cases, the one or more domain managers might each include, without limitation, one of a physical network function ("PNF") domain manager(s), a virtual network function ("VNF") domain manager(s), a compute domain manager(s), a memory domain manager(s), or a storage domain manager(s), and/or the like.

The macro orchestrator 105 might automate, manage, and/or control each of the one or more micro orchestrators 110, while each micro orchestrator 110 might automate, manage, and/or control at least one of a plurality of domain managers or a plurality of network resources. For instance, a network resource orchestrator might automate, manage, and/or control one or more of at least one PNF domain manager or at least one VNF domain manager, while the at least one PNF domain manager might automate, manage, and/or control each of a plurality of physical network resources located in devices in networks under its control, and the at least one VNF domain manager might automate, manage, and/or control each of a plurality of virtual network resources located in devices in networks under its control. Similarly, a compute resource orchestrator might automate, manage, and/or control one or more of at least one compute domain manager, at least one memory domain manager, or at least one storage domain manager, while the at least one compute domain manager might automate, manage, and/or control each of a plurality of compute resources in one or more compute pools (e.g., central processing unit ("CPU") pools, graphics processing unit ("GPU") pools, or the like), and the at least one memory domain manager might automate, manage, and/or control each of a plurality of memory resources in one or more memory pools (e.g., random access memory ("RAM") pools, or the like), while the at least one storage domain manager might automate, manage, and/or control each of a plurality of storage resources in one or more storage pools, or the like.

The micro orchestrator(s) 110 might analyze first metadata regarding resource attributes and characteristics of a plurality of unassigned network resources to identify one or more network resources 140 among the plurality of unassigned network resources for providing the requested network services, the first metadata having been striped to entries of the plurality of unassigned network resources in a resource database, which might include, without limitation, resource inventory database 155, intent metadata database 160, data lake 180, and/or the like. Based on the analysis, the micro orchestrator(s) 110 might allocate at least one identified network resource 140 among the identified one or more network resources 140 for providing the requested network services. The micro orchestrator(s) 110 might stripe the entry with second metadata indicative of the desired characteristics and performance parameters as comprised in the request for network services. In some cases, striping the entry with the second metadata might comprise striping the entry in the resource inventory database 155. Alternatively, striping the entry with the second metadata might comprise striping or adding an entry in the intent metadata inventory 160, which might be part of resource inventory database 155 or might be physically separate (or logically partitioned) from the resource inventory database 155, or the like. In some cases, the first metadata might be analyzed after being received by the computing system in response to one of a pull data distribution instruction, a push data distribution instruction, or a hybrid push-pull data distribution instruction, and/or the like.

Once the at least one identified network resource 140 has been allocated or assigned, the micro orchestrator(s) 110 might update an active inventory database 165 with such information—in some cases, by adding an entry in the active inventory database 165 with information indicating that the at least one identified network resource 140 has been allocated to provide particular requested network service(s) to customer 120. In some embodiments, the micro orchestrator(s) 110 might stripe the added entry in the active inventory database 165 with a copy of the second metadata indicative of the desired characteristics and performance parameters as comprised in the request for network services. In some instances, the resource inventory database 155 might store an equipment record that lists every piece of inventory that is accessible by the micro orchestrator(s) 110 (either already allocated for fulfillment of network services to existing customers or available for allocation for fulfillment of new network services to existing or new customers). The active inventory database 165 might store a circuit record listing the active inventory that are being used for fulfilling network services. The data lake 180 might store a customer record that lists the service record of customer, and/or the like.

According to some embodiments, system 100 might further comprise quality of service test and validate server or audit engine 170, which performs measurement and/or collection of network performance metrics for at least one of the one or more network resources 140 and/or the one or more networks 145 and/or 150, and/or which performs auditing to determine whether each of the identified one or more network resources 140 conforms with the desired characteristics and performance parameters. In some cases, network performance metrics might include, without limitation, at least one of quality of service ("QoS") measurement data, platform resource data and metrics, service usage data, topology and reference data, historical network data, or network usage trend data, and/or the like. Alternatively, or additionally, network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like, which are described in greater detail in the '095, '244, and '884 applications, which have already been incorporated herein by reference in their entirety. Also described in greater detail in the '095, '244, and '884 applications is how the intent-based system allocates or reallocates resources based on a determination that existing resources are no longer able to provide the desired characteristics and performance parameters.

In some embodiments, micro orchestrator(s) 110 might allocate one or more network resources 140 from one or more first networks 145a-145n of a first set of networks 145 and/or from one or more second networks 150a-150n of a second set of networks 150 for providing the requested network services, based at least in part on the desired performance parameters and/or based at least in part on a determination that the one or more first networks is capable of providing network resources each having the desired performance parameters. According to some embodiments, determination that the one or more first networks is capable of providing network resources each having the desired performance parameters is based on one or more network performance metrics of the one or more first networks at the time that the request for network services from a customer is received.

System 100 might further comprise one or more databases, including, but not limited to, a platform resource database 175a, a service usage database 175b, a topology and reference database 175c, a QoS measurement database 175d, and/or the like. The platform resource database 175a might collect and store data related or pertaining to platform resource data and metrics, or the like, while the service usage database 175b might collect and store data related or pertaining to service usage data or service profile data, and the topology and reference database 175c might collect and store data related or pertaining to topology and reference data. The QoS measurement database 175d might collect and store QoS data, network performance metrics, and/or results of the QoS test and validate process. Data stored in each of at least one of the platform resource database 175a, the service usage database 175b, the topology and reference database 175c, the QoS measurement database 175d, and/or the like, collected in data lake 180, and the collective data or selected data from the data lake 180 are used to perform optimization of network resource allocation (both physical and/or virtual) using the micro orchestrator(s) 110 (and, in some cases, using an orchestration optimization engine (e.g., orchestration optimization engine 275 of FIG. 2 of the '244 and '884 applications), or the like).

In some embodiments, determining whether each of the identified one or more network resources conforms with the desired characteristics and performance parameters might comprise determining, with the audit engine 170, whether each of the identified one or more network resources conforms with the desired characteristics and performance parameters on a periodic basis or in response to a request to perform an audit. Alternatively, or additionally, determining whether each of the identified one or more network resources conforms with the desired characteristics and performance parameters might comprise determining, with the audit engine, whether each of the identified one or more network resources conforms with the desired characteristics and performance parameters, by: measuring one or more network performance metrics of each of the identified one or more network resources; comparing, with the audit engine, the measured one or more network performance metrics of each of the identified one or more network resources with the desired performance parameters; determining characteristics of each of the identified one or more network resources; and comparing, with the audit engine, the determined characteristics of each of the identified one or more network resources with the desired characteristics.

Based on a determination that at least one identified network resource among the identified one or more network resources fails to conform with the desired performance parameters within first predetermined thresholds or based on a determination that the determined characteristics of the at least one identified network resource fails to conform with the desired characteristics within second predetermined thresholds, the micro orchestrator(s) 110 might perform one of: reconfiguring the at least one identified network resource to provide the desired characteristics and performance parameters; or reallocating at least one other identified network resources among the identified one or more network resources for providing the requested network services. In some cases, the micro orchestrator(s) 110 might perform one of reconfiguring the at least one identified network resource or reallocating at least one other identified network resources, based on a determination that the measured one or more network performance metrics of each of the identified one or more network resources fails to match the desired performance parameters within third predetermined thresholds or based on a determination that the measured one or more network performance metrics of each of the identified one or more network resources fails to match the desired performance parameters within fourth predetermined thresholds.

According to some aspects, the macro orchestrator 105 might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator 105 might send, to a first micro orchestrator among a plurality of micro orchestrators (e.g., the one or more micro orchestrators 110, or the like), the received request for network services, where the macro orchestrator automates, manages, or controls each of the plurality of micro orchestrators, while each micro orchestrator automates, manages, or controls at least one of a plurality of domain managers (e.g., the one or more domain managers 135, or the like) or a plurality of network resources (e.g., network resources 140, or the like). In response to receiving the request for network services, the first micro orchestrator might identify one or more first network resources among a first plurality of network resources for providing the requested network services, based at least in part on the desired characteristics and performance parameters, and based at least in part on a determination that the one or more network resources are capable of providing network services having the desired characteristics and performance parameters. The first micro orchestrator might allocate at least one first network resource among the identified one or more first network resources for providing the requested network services.

In some embodiments, the first micro orchestrator might (continually, occasionally, randomly, or in response to a request for data, or the like) receive, from one or more first domain managers among a first plurality of domain managers in communication with the first micro orchestrator, data regarding the first plurality of network resources that are automated, managed, or controlled by each of the one or more first domain managers. In such cases, identifying, with the first micro orchestrator, one or more first network resources among a first plurality of network resources for providing the requested network services might comprise identifying, with the first micro orchestrator, one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

According to some embodiments, allocating, with the first micro orchestrator, at least one first network resource among the identified one or more first network resources for providing the requested network services might comprise: sending, with the first micro orchestrator, commands to at least one first domain manager among the one or more first domain managers that automate, manage, or control the at least one first network resource; and in response to receiving the commands from the first micro orchestrator: determining, with the at least one first domain manager, an intent based at least in part on the desired characteristics and performance parameters as comprised in the request for network services; generating and sending, with the at least one first domain manager, device language instructions for allocating the at least one first network resource; and implementing, with the at least one first domain manager, the at least one first network resource on the user device associated with the customer, to provide the requested network services.

In some embodiments, one of the macro orchestrator or the first micro orchestrator might update a resource database (e.g., resource inventory database 155, intent metadata database 160, active inventory database 165, and/or data lake 180, or the like) with information indicating that the at least one first network resource has been allocated for providing the requested network services and with information indicative of the desired characteristics and performance parameters as comprised in the request for network services. In some cases, an audit engine (e.g., audit engine 170, or the like) might determine whether each of the identified one or more first network resources conforms with the desired characteristics and performance parameters. In some instances, determining whether each of the identified one or more first network resources conforms with the desired characteristics and performance parameters might comprise determining, with the audit engine, whether each of the identified one or more first network resources conforms with the desired characteristics and performance parameters on a periodic basis or in response to a request to perform an audit. Alternatively, or additionally, determining whether each of the identified one or more first network resources conforms with the desired characteristics and performance parameters might comprise determining, with the audit engine, whether each of the identified one or more first network resources conforms with the desired characteristics and performance parameters, by: measuring one or more network performance metrics of each of the identified one or more first network resources; comparing, with the audit engine, the measured one or more network performance metrics of each of the identified one or more first network resources with the desired performance parameters; determining characteristics of each of the identified one or more first network resources; and comparing, with the audit engine, the determined characteristics of each of the identified one or more first network resources with the desired characteristics.

In such cases, each of the one or more network performance metrics might include, without limitation, at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

According to some embodiments, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, the first micro orchestrator either might reconfigure the at least one identified network resource to provide the desired characteristics and performance parameters; or might reallocate at least one other identified network resources among the identified one or more first network resources for providing the requested network services.

In some aspects, intent might further include, without limitation, path intent, location intent, performance intent, and/or the like. Path intent, for example, might include a requirement that network traffic must be routed through a first particular geophysical location (e.g., a continent, a country, a region, a state, a province, a city, a town, a mountain range, etc.) and/or a requirement that network traffic must not be routed through a second particular geophysical location, or the like. In such cases, a service commission engine might either add (and/or mark as required) all paths through the first particular geophysical location and all network resources that indicate that they are located in the first particular geophysical location, or remove (and/or mark as excluded) all paths through the second particular geophysical location and all network resources that indicate that they are located in the second particular geophysical location. The service commission engine might use the required or non-excluded paths and network resources to identify which paths and network resources to allocate to fulfill requested network services. In some embodiments, the active inventory might be marked so that any fix or repair action is also restricted and that policy audits might be implemented to ensure no violations of path intent actually occur.

Location intent, for instance, might include a requirement that network resources that are used for fulfilling the requested network services are located in specific geographical locations (which are more specific compared to the general geophysical locations described above). In such cases, the inventory is required to include the metadata for the intent, then the service engine can perform the filtering and selection. Monitoring and/or restricting assets being reassigned may be performed using location intent policy markings (or metadata) on the service.

Performance intent, for example, might include a requirement that the requested services satisfy particular performance parameters or metrics—which might include, without limitation, maximum latency or delay, maximum jitter, maximum packet loss, maximum number of hops, minimum bandwidth, nodal connectivity, minimum amount of compute resources for each allocated network resource, minimum amount of storage resources for each allocated network resource, minimum memory capacity for each allocated network resource, fastest possible path, and/or the like. In such cases, service conformance engine might use the performance metrics (as measured by one or more nodes in the network, which in some cases might include the allocated network resource itself, or the like) between points (or network nodes) for filtering the compliant inventory options, and/or might propose higher levels of service to satisfy the customer and/or cost level alignment, or the like. Once the assignment portion of the engine has been performed, the active inventory might be marked with the appropriate performance intent policy.

In some embodiments, a SS7 advanced intelligence framework (which might have a local number portability dip to get instructions from an external advanced intelligence function) can be adapted with intent-based orchestration (as described herein) by putting a trigger (e.g., an external data dip, or the like) on the orchestrator between the requesting device or node (where the intent and intent criteria might be sent) and the source of the external function, which might scrape the inventory database to make its instructions and/or solution sets for the fulfillment engine and then stripe metadata, and/or returns that to the normal fulfillment engine.

In some aspects, one or more parsimony trees might be generated, based on network telemetry data of one or more networks, where each parsimony tree might be a graphical representation of characteristics and performance parameters based on the network telemetry data of the one or more networks, and the system might perform network orchestration and automation based on the generated one or more parsimony trees. In particular, the macro orchestrator 105 might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator 105 might send, to a first micro orchestrator among a plurality of micro orchestrators (e.g., the one or more micro orchestrators 110, or the like), the received request for network services, where the macro orchestrator automates, manages, or controls each of the plurality of micro orchestrators, while each micro orchestrator automates, manages, or controls at least one of a plurality of domain managers (e.g., the one or more domain managers 135, or the like) or a plurality of network resources (e.g., network resources 140, or the like). In response to receiving the request for network services, the first micro orchestrator might generate a first request-based parsimony tree based at least in part on the desired characteristics and performance parameters contained in the request for network services.

According to some embodiments, the first request-based parsimony tree might be a graphical representation including, without limitation, an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services, and/or the like. In some cases, the plurality of micro orchestrators might each include, but is not limited to, one of a server computer over a network, a cloud-based computing system over a network, or a distributed computing system, and/or the like.

The first micro orchestrator might access, from a datastore, a plurality of first network-based parsimony trees, each of the plurality of first network-based parsimony trees being generated based on measured network metrics. In some embodiments, each first network-based parsimony tree might be a graphical representation including, but not limited to, an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

According to some embodiments, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

According to some embodiments, the first micro orchestrator might compare the first request-based parsimony tree with one or more first network-based parsimony trees among the plurality of first network-based parsimony trees to determine a fitness score for each first network-based parsimony tree. In some instances, each fitness score might be a value indicative of a level of heuristic matching (in some cases, embodied as a percentage match) between the first request-based parsimony tree with one of the one or more first network-based parsimony trees. In some embodiments, comparing the first request-based parsimony tree with one or more first network-based parsimony trees might comprise comparing the first request-based parsimony tree with one or more first network-based parsimony trees using one or more GPUs, or the like.

Merely by way of example, in some cases, the first micro orchestrator might identify a best-fit network-based parsimony tree among the one or more first network-based parsimony trees based on the fitness scores of the one or more first network-based parsimony trees; might identify one or more first network resources among a first plurality of network resources for providing the requested network services, based at least in part on network resources represented within the identified best-fit network-based parsimony tree; and might allocate at least one first network resource among the identified one or more first network resources for providing the requested network services. According to some embodiments, identifying the best-fit network-based parsimony tree might comprise identifying the most parsimonious first network-based parsimony tree for providing the requested network resources. That is, the first micro orchestrator might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one ML system, at least one AI systems, or at least one NN system, and/or the like.

In some embodiments, the first micro orchestrator might apply a first filter to at least one first network-based parsimony tree among the one or more first network-based parsimony trees to filter out one or more characteristics or one or more sub-characteristics, prior to comparing the first request-based parsimony tree with the one or more first network-based parsimony trees. According to some embodiments, the characteristics of the third and fourth portions might include color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, alternative or additional to applying the first filter, the first micro orchestrator might apply a second filter to at least one first network-based parsimony tree among the one or more first network-based parsimony trees to change the color temperature based on changes in measured network metrics.

According to some embodiments, the first micro orchestrator might receive updated measured network metrics; might, in response to receiving the updated measured network metrics, generate a plurality of updated first network-based parsimony trees; and might replace the plurality of first network-based parsimony trees in the datastore with the plurality of updated first network-based parsimony trees. In some embodiments, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file (e.g., .jpg file, .tiff file, .gif file, .bmp file, .png file, .dwf file, .dwg file, .drw file, .stl file, .pdf file, .svg file, .cgm file, etc.).

In some embodiments, rather than a single request-based parsimony tree being generated in response to receiving the request for network services, the first micro orchestrator might generate a plurality of first request-based parsimony trees, each representing a desired characteristic or performance parameter, and the subsequent functions performed by the first orchestrator might be performed on this plurality of first request-based parsimony trees rather than the single request-based parsimony tree.

These and other functions of the system 100 (and its components) are described in greater detail below with respect to FIGS. 2-4.

Figure 2A:
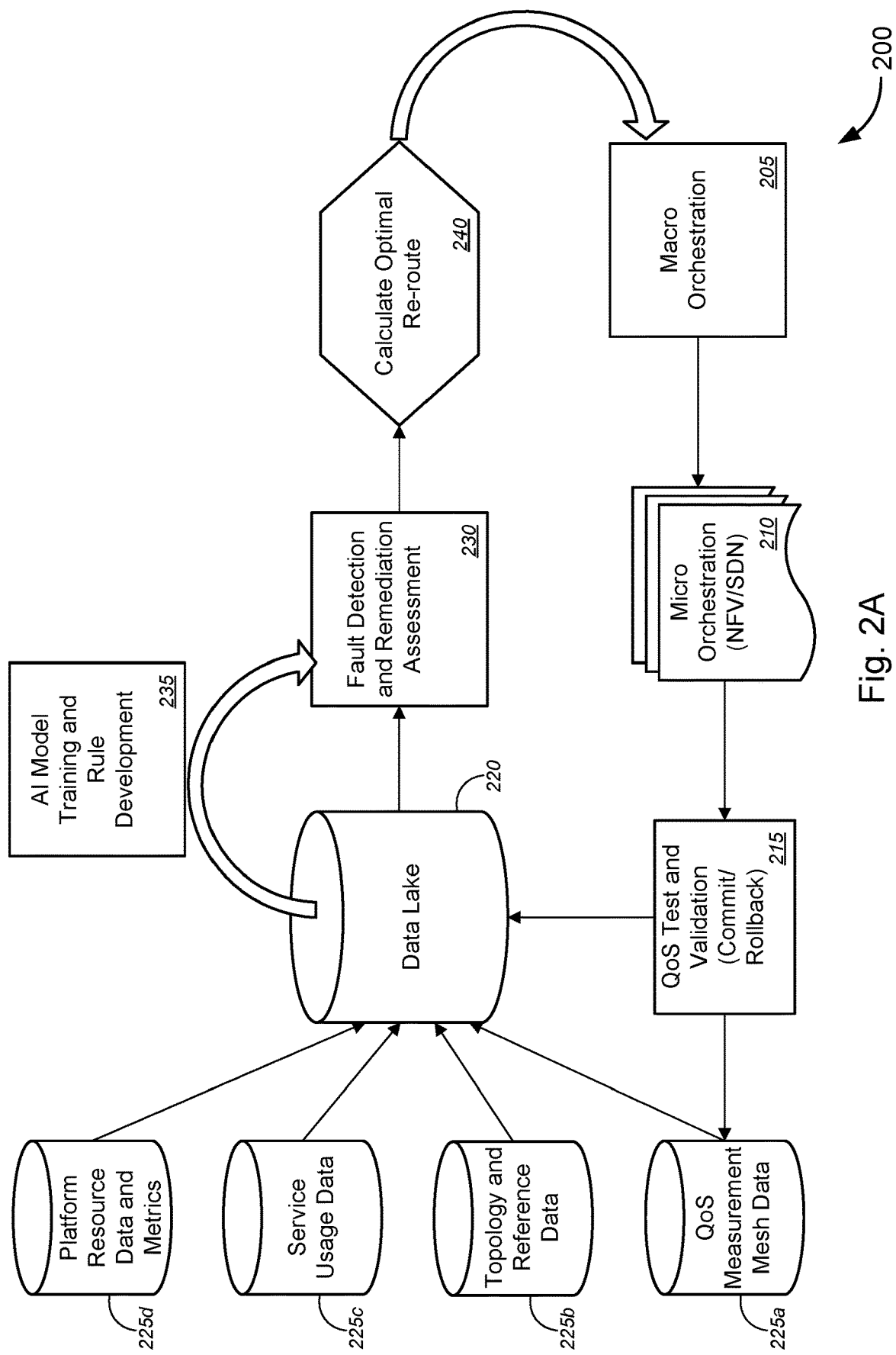
FIGS. 2A and 2B are block diagrams illustrating various methods for implementing intent-based multi-tiered orchestration and automation, in accordance with various embodiments.
Figure 2B:
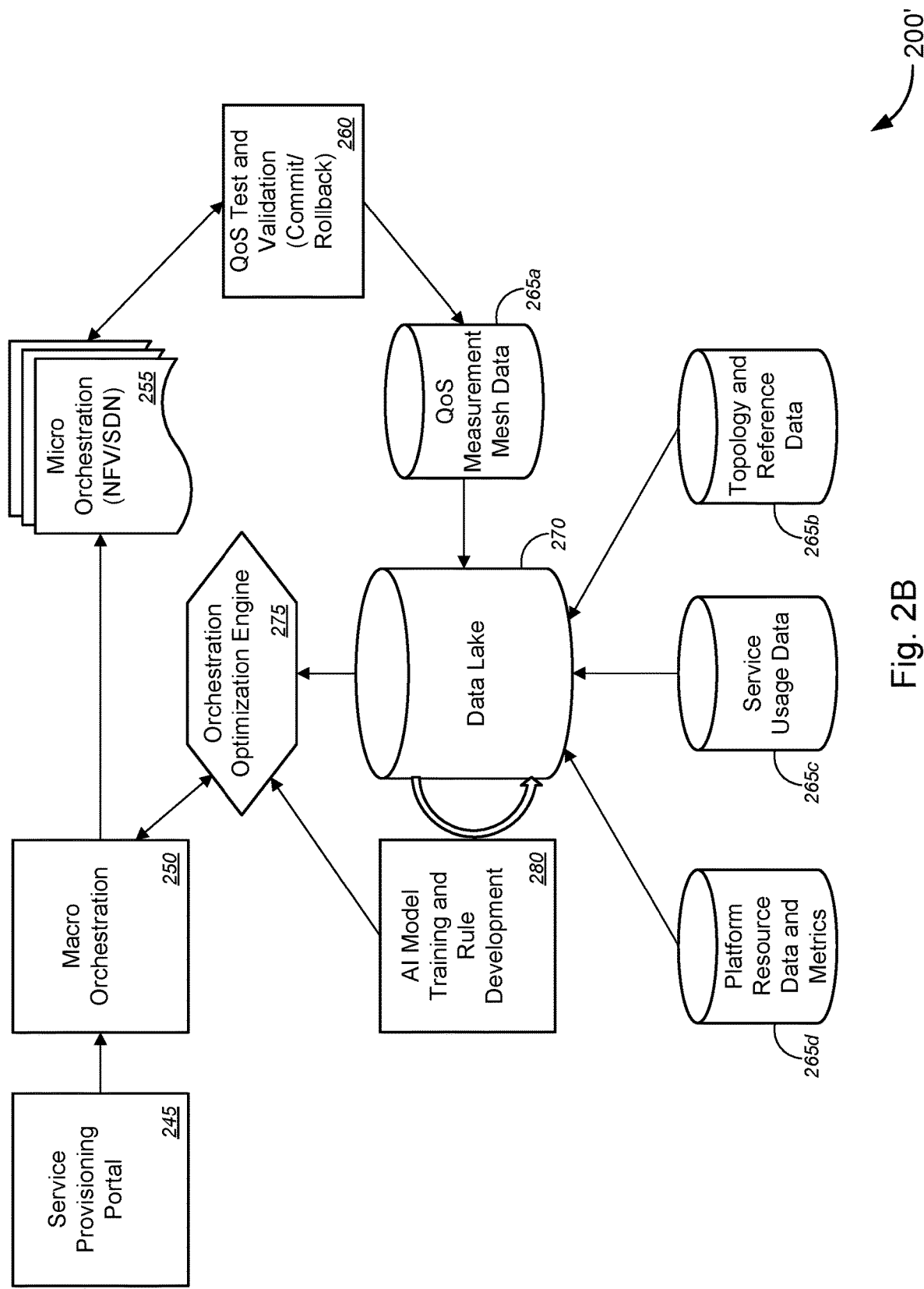

FIGS. 2A and 2B (collectively, "FIG. 2") are block diagrams illustrating various methods 200 and 200' for implementing intent-based multi-tiered orchestration and automation, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by or with (and, in some cases, are described below with respect to) the system 100 of FIG. 1, respectively (or components thereof), such methods may also be implemented using any suitable hardware (or software) implementation. Similarly, while system 100 of FIG. 1 (or components thereof) can operate according to the method illustrated by FIG. 2 (e.g., by executing instructions embodied on a computer readable medium), the system 100 of FIG. 1 can each also operate according to other modes of operation and/or perform other suitable procedures.

With reference to FIG. 2A, after receiving a request for network services from a customer (not shown)—the request for network services comprising desired performance parameters for the requested network services, without information regarding any of specific hardware, specific hardware type, specific location, or specific network for providing the requested network services [i.e., an "intent-based" request]—or to generally manage various networks (and optimization of such various networks), method 200 might comprise macro orchestration (at block 205) that manages micro orchestration (at block 210) that utilizes Network Functions Virtualization ("NFV"), software defined networks ("SDNs"), and/or the like to determine what physical and/or virtual network resources to allocate that meet the "intent" for network resources having the desired performance parameters, for use by the customer, and/or to generally manage and/or optimize the various networks (that are under the control of the macro orchestrator or micro orchestrator(s)).

Method 200 might further comprise performing quality of service ("QoS") testing and validation (at block 215) to commit to, or rollback from, the allocated network resources. The results of the QoS testing and validation (from block 215) are subsequently stored in data lake 220, as well as in QoS measurement mesh data database 225a. Data stored in each of at least one of the QoS measurement mesh data database 225a, topology and reference data database 225b, service usage data database 225c, and platform resource data and metrics database 225d are collected in data lake 220, and the collective data or selected data from the data lake 220 may be used to perform fault detection and remediation assessment (at block 230). In some cases, the collective data or selected data from the data lake 220 are used by an artificial intelligence ("AI") model training and rule development process (at block 235) as a way to detect fault and to assess remediation. Method 200 might further comprise calculating optimal re-routing taking into account one or more of the collected data, the AI model training and rule development, the fault detection and remediation assessment, and/or the QoS testing and validation results. Method 200 subsequently loops back to macro orchestration (at block 205), and the processes at blocks 205-240 repeat continually in a feedback loop-driven process to optimize allocation of network resources for meeting the desired performance parameters, as set out by the customer's "intent-based" request for network services, and/or for generally managing and/or optimizing the various networks.

In some embodiments, the service aware optimized orchestration as depicted in FIG. 2A may be implemented using collected feedback data that are processed in batches. Alternatively, the service aware optimized orchestration as depicted in FIG. 2A may be implemented using real-time streams of collected feedback data that are processed in real-time.

FIG. 2B depicts an alternative method 200' for implementing intent-based multi-tiered orchestration and automation. In FIG. 2B, method 200' comprises providing a customer with access to a service provisioning portal (e.g., via software application ("app") that can be installed and run on a user device (including, but not limited to, a smart phone, a mobile phone, a laptop computer, a tablet computer, a desktop computer, and/or the like) that is associated with the user, via a web portal, and/or the like), and receiving, via the service provisioning portal, a request for network services from a customer (at block 245) [i.e., "activation" process]. The request for network services, as in the embodiment of FIG. 2A, might comprise desired performance parameters for the requested network services, without information regarding any of specific hardware, specific hardware type, specific location, or specific network for providing the requested network services [i.e., an "intent-based" request].

Method 200' might comprise macro orchestration (at block 250) that manages micro orchestration (at block 255) that utilizes Network Functions Virtualization ("NFV"), software defined networks ("SDNs"), and/or the like to determine what physical and/or virtual network resources to allocate that meet the "intent" for network resources having the desired performance parameters, for use by the customer, and/or to generally manage and/or optimize the various networks (that are under the control of the macro orchestrator or micro orchestrator(s)). In some embodiments, macro orchestration (at block 250) might utilize orchestration optimization engine 275 to optimize management of micro orchestration.

Method 200' might further comprise performing quality of service ("QoS") testing and validation (at block 260) to commit to or rollback the allocated network resources. According to some embodiments, micro orchestration (at block 255) might utilize the results of the QoS testing and validation (from block 260) to immediately determine what physical and/or virtual network resources to allocate (or re-allocate) that meet the "intent" for network resources having the desired performance parameters, and/or to generally manage and/or optimize the various networks (that are under the control of the macro orchestrator or micro orchestrator(s)).

In general, the results of the QoS testing and validation (from block 260) are subsequently stored in QoS measurement mesh data database 265a. Data stored in each of at least one of the QoS measurement mesh data database 265a, topology and reference data database 265b, service usage data database 265c, and platform resource data and metrics database 265d are collected in data lake 270, and the collective data or selected data from the data lake 270 are used to perform optimization of network resource allocation (both physical and/or virtual) using orchestration optimization engine 275. In some cases, the collective data or selected data from the data lake 270 are used by an AI model training and rule development process (at block 280) as a way to perform optimization of network resource allocation (both physical and/or virtual) using orchestration optimization engine 275. The AI model training and rule development process (at block 280) uses data from the data lake 270 to improve the AI model training and rule development, in a continuous feedback loop. Method 200' subsequently loops back to macro orchestration (at block 250), and the processes at blocks 250-280 repeat continually in a feedback loop-driven process to optimize allocation of network resources (both physical and/or virtual) for meeting the desired performance parameters, as set out by the customer's "intent-based" request for network services.

In some embodiments, the service aware optimized orchestration as depicted in FIG. 2B may be implemented using collected feedback data that are processed in batches. Alternatively, the service aware optimized orchestration as depicted in FIG. 2B may be implemented using real-time streams of collected feedback data that are processed in real-time.

Figure 3:
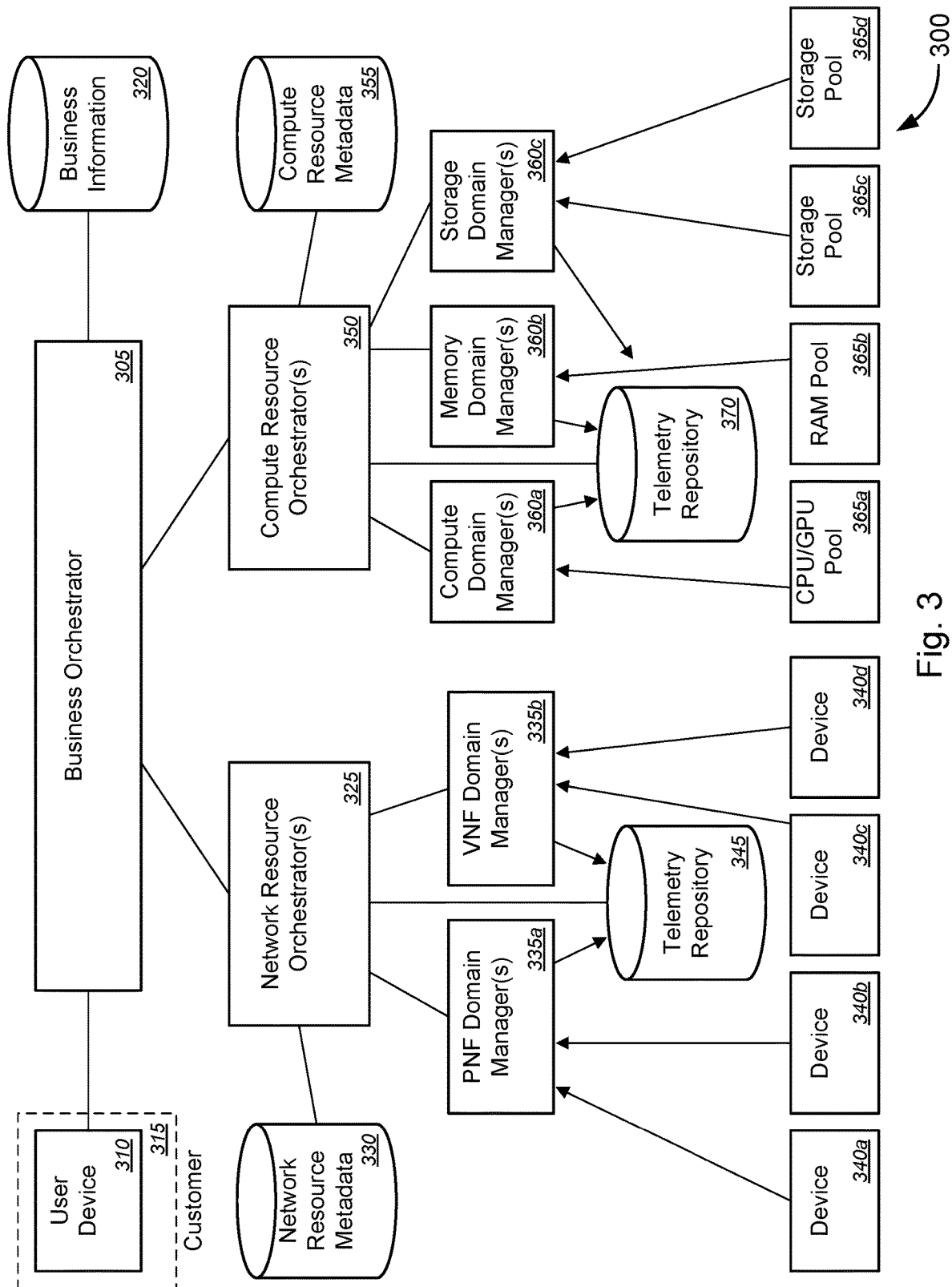
FIG. 3 is a schematic diagram illustrating another system for implementing intent-based multi-tiered orchestration and automation, in accordance with various embodiments.

FIG. 3 is a schematic diagram illustrating another system 300 for implementing intent-based multi-tiered orchestration and automation, in accordance with various embodiments. For simplifying illustration, FIG. 3 shows a non-limiting example with one user device associated with a single customer sending a request for network services. In practice, multiple devices associated with multiple customers would send requests for network services, and the system 300 would handle intent-based multi-tiered orchestration and automation for all such requests simultaneously or concurrently, taking into account all aspects of the requests to ensure optimal operation of the network and optimal allocation of resources to provide the requested services to each of the requesting user devices.

With reference to the non-limiting embodiment of FIG. 3, system 300 might comprise a business orchestrator 305 (i.e., a macro orchestrator), a user device 310 associated with a customer 315, a business information database 320, a network resource orchestrator(s) 325 (i.e., a micro orchestrator), a network resource metadata database 330, a plurality of network resource domain managers 335 (including, but not limited to, a physical network function ("PNF") domain manager(s), a virtual network function ("VNF") domain manager(s), and/or the like), a plurality of network devices 340 (including, without limitation, devices 340a-340d that each hosts at least one of one or more physical network resources or one or more virtual network resources, or the like), a network resource telemetry repository 345, a compute resource orchestrator(s) 350 (i.e., a micro orchestrator), a compute resource metadata database 355, a plurality of compute resource domain managers 360 (including, but not limited to, a compute domain manager(s) 360a, a memory domain manager(s) 360b, a storage domain manager(s) 360c, and/or the like), a plurality of compute resource pools 365 (including, without limitation, one or more compute pools 365a (e.g., central processing unit ("CPU") pools, graphics processing unit ("GPU") pools, or the like), one or more memory pools 365b (e.g., random access memory ("RAM") pools, or the like), one or more storage pools 365c, or the like), a compute resource telemetry repository 370, and/or the like.

The macro orchestrator or business orchestrator 305 might automate, manage, or control each of the plurality of micro orchestrators (e.g., network resource orchestrator(s) 325, compute resource orchestrator(s) 350, billing resource orchestrator(s) (not shown), or order orchestrator(s) (not shown), and/or the like), while each micro orchestrator automates, manages, or controls at least one of a plurality of domain managers (e.g., PNF domain manager(s) 335a, VNF domain manager(s) 335b, compute domain manager(s) 360a, memory domain manager(s) 360b, or storage domain manager(s) 360c, and/or the like) or a plurality of network resources (e.g., network resources 140 of FIG. 1, or the like) that may be located or hosted (physically or virtually) on devices 340a-340d, CPU or GPU pool(s) 365a, RAM pool(s) 365b, or storage pool(s) 365c or 365d, and/or the like. For instance, a network resource orchestrator 325 might automate, manage, and/or control one or more of at least one PNF domain manager 335a or at least one VNF domain manager 335b, while the at least one PNF domain manager 335a might automate, manage, and/or control each of a plurality of physical network resources located in devices 340a and/or 340b under its control, and the at least one VNF domain manager 335b might automate, manage, and/or control each of a plurality of virtual network resources located in devices 340c and/or 340d under its control. Similarly, a compute resource orchestrator 350 might automate, manage, and/or control one or more of at least one compute domain manager 360a, at least one memory domain manager 360b, or at least one storage domain manager 360c, while the at least one compute domain manager 360a might automate, manage, and/or control each of a plurality of compute resources in one or more compute pools (e.g., CPU and/or GPU pool(s) 365a, or the like), and the at least one memory domain manager 360b might automate, manage, and/or control each of a plurality of memory resources in one or more memory pools (e.g., RAM pool(s) 365b, or the like), while the at least one storage domain manager 360c might automate, manage, and/or control each of a plurality of storage resources in one or more storage pools 365c or 365d, or the like.

In some embodiments, a billing resource orchestrator and an order orchestrator might automate, manage, and/or control one or more of at least one PNF domain manager 335*a* or at least one VNF domain manager 335*b*, at least one compute domain manager 360*a*, at least one memory domain manager 360*b*, at least one storage domain manager 360*c*, or at least one other domain manager (not shown), while the at least one PNF domain manager 335*a* might automate, manage, and/or control each of a plurality of physical network resources located in devices 340*a* and/or 340*b* under its control, and the at least one VNF domain manager 335*b* might automate, manage, and/or control each of a plurality of virtual network resources located in devices 340*c* and/or 340*d* under its control, and while the at least one compute domain manager 360*a* might automate, manage, and/or control each of a plurality of compute resources in one or more compute pools (e.g., CPU and/or GPU pool(s) 365*a*, or the like), and the at least one memory domain manager 360*b* might automate, manage, and/or control each of a plurality of memory resources in one or more memory pools (e.g., RAM pool(s) 365*b*, or the like), while the at least one storage domain manager 360*c* might automate, manage, and/or control each of a plurality of storage resources in one or more storage pools 365*c* or 365*d*, or the like, and while the at least one other domain manager might automate, manage, and/or control resources in its domain. The billing resource orchestrator might automate, manage, and/or control the domain managers within its domain, and ultimately the resources under the domain managers' domain, to perform automated billing-related tasks, while the order orchestrator might automate, manage, and/or control the domain managers within its domain, and ultimately the resources under the domain managers' domain, to perform automated order (or order-fulfillment) tasks.

In operation, a macro orchestrator (e.g., the business orchestrator 305, or the like) might receive, over a network (e.g., network(s) 115 and/or 130 of FIG. 1, or the like), a request for network services from a user device (e.g., user device 310, or the like) associated with a customer (e.g., customer 315), the request for network services comprising desired characteristics and performance parameters for the requested network services, without information regarding any of specific hardware, specific hardware type, specific location, or specific network for providing the requested network services. In some cases, the macro orchestrator might query a business information database (e.g., business information database 320, or the like) to determine whether the request for network services falls under business parameters of the service provider, whether the request for network services falls under a service level agreement ("SLA") between the customer and the service provider, and/or whether the request for network services is financially and/or operationally feasible for the service provider, and/or the like. If no for any of these determinations (where applicable), then the macro orchestrator might respond to the user device 310 with errors and/or requests for additional information or authentication, or the like. If yes for each of these determinations (where applicable), then the macro orchestrator might initiate the multi-tiered orchestration and automation, as described in detail below.

The macro orchestrator might send, to a first micro orchestrator among a plurality of micro orchestrators (e.g., at least one of network resource orchestrator(s) 325 and/or compute resource orchestrator(s) 350), or the like), the received request for network services. In response to receiving the request for network services, the first micro orchestrator might identify one or more first network resources among a first plurality of network resources for providing the requested network services, based at least in part on the desired characteristics and performance parameters, and based at least in part on a determination that the one or more network resources are capable of providing network services having the desired characteristics and performance parameters. The first micro orchestrator might allocate at least one first network resource among the identified one or more first network resources for providing the requested network services.

In some embodiments, the first micro orchestrator might (continually, occasionally, randomly, or in response to a request for data, or the like) receive, from one or more first domain managers among a first plurality of domain managers in communication with the first micro orchestrator, data regarding the first plurality of network resources that are automated, managed, or controlled by each of the one or more first domain managers (where the data regarding the first plurality of network resources might be sent (continually, occasionally, randomly, or in response to a request for data, or the like) from the network devices (e.g., devices 340*a*-340*d*, or the like; as depicted by arrows from devices 340*a*-340*d* to PNF domain manager(s) 335*a* or VNF domain manager(s) 335*b* in FIG. 3, or the like) and/or from compute resource pools (e.g., CPU/GPU pool(s) 365*a*, RAM pool(s) 365*b*, or storage pool(s) 365*c*, or the like; as depicted by arrows from CPU/GPU pool(s) 365*a*, RAM pool(s) 365*b*, and storage pool(s) 365*c* to compute domain manager(s) 360*a*, a memory domain manager(s) 360*b*, and a storage domain manager(s) 360*c* in FIG. 3, or the like)). In such cases, identifying, with the first micro orchestrator, one or more first network resources among a first plurality of network resources for providing the requested network services might comprise identifying, with the first micro orchestrator, one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

According to some embodiments, allocating, with the first micro orchestrator, at least one first network resource among the identified one or more first network resources for providing the requested network services might comprise: sending, with the first micro orchestrator, commands to at least one first domain manager among the one or more first domain managers that automate, manage, or control the at least one first network resource; and in response to receiving the commands from the first micro orchestrator: determining, with the at least one first domain manager, an intent based at least in part on the desired characteristics and performance parameters as comprised in the request for network services; generating and sending, with the at least one first domain manager, device language instructions for allocating the at least one first network resource; and implementing, with the at least one first domain manager, the at least one first network resource on the user device associated with the customer, to provide the requested network services.

In some embodiments, one of the macro orchestrator or the first micro orchestrator might update a resource database (e.g., network resource metadata database(s) 330 and/or compute resource metadata database(s) 355, or the like) with information indicating that the at least one first network resource has been allocated for providing the requested network services and with information indicative of the desired characteristics and performance parameters as comprised in the request for network services. According to some embodiments, network telemetry data might be collected by the PNF domain manager(s) 335*a* and/or the VNF domain manager(s) 335*b*, which might store the network telemetry data in network telemetry repository 345. Similarly, compute telemetry data might be collected by the compute domain manager(s) 360*a*, the memory domain manager(s) 360*b*, and/or the storage domain manager(s) 360*c*, which might store the compute telemetry data in compute telemetry repository 370.

In some cases, an audit engine (e.g., audit engine 170 of FIG. 1, or the like) might determine whether each of the identified one or more first network resources conforms with the desired characteristics and performance parameters, e.g., based on the collected network or compute telemetry data stored in network telemetry repository 345 or compute telemetry repository 370, respectively. In some instances, determining whether each of the identified one or more first network resources conforms with the desired characteristics and performance parameters might comprise determining, with the audit engine, whether each of the identified one or more first network resources conforms with the desired characteristics and performance parameters on a periodic basis or in response to a request to perform an audit. Alternatively, or additionally, determining whether each of the identified one or more first network resources conforms with the desired characteristics and performance parameters might comprise determining, with the audit engine, whether each of the identified one or more first network resources conforms with the desired characteristics and performance parameters, by: measuring one or more network performance metrics of each of the identified one or more first network resources (as stored in network telemetry repository 345 or compute telemetry repository 370, or the like); comparing, with the audit engine, the measured one or more network performance metrics of each of the identified one or more first network resources with the desired performance parameters; determining characteristics of each of the identified one or more first network resources (in some cases, as stored in network telemetry repository 345 or compute telemetry repository 370, or the like); and comparing, with the audit engine, the determined characteristics of each of the identified one or more first network resources with the desired characteristics.

In such cases, each of the one or more network performance metrics might include, without limitation, at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

According to some embodiments, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, the first micro orchestrator either might reconfigure the at least one identified network resource to provide the desired characteristics and performance parameters; or might reallocate at least one other identified network resources among the identified one or more first network resources for providing the requested network services.

FIGS. 4A-4D (collectively, "FIG. 4") are flow diagrams illustrating a method 400 for implementing intent-based multi-tiered orchestration and automation, in accordance with various embodiments. Method 400 of FIG. 4A continues onto FIG. 4C following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', and 300 of FIGS. 1, 2A, 2B, and 3, respectively (or components thereof), such methods may also be implemented using any suitable hardware (or software) implementation. Similarly, while each of the systems, examples, or embodiments 100, 200, 200', and 300 of FIGS. 1, 2A, 2B, and 3, respectively (or components thereof), can operate according to the method 400 illustrated by FIG. 4 (e.g., by executing instructions embodied on a computer readable medium), the systems, examples, or embodiments 100, 200, 200', and 300 of FIGS. 1, 2A, 2B, and 3 can each also operate according to other modes of operation and/or perform other suitable procedures.

Figure 4A:
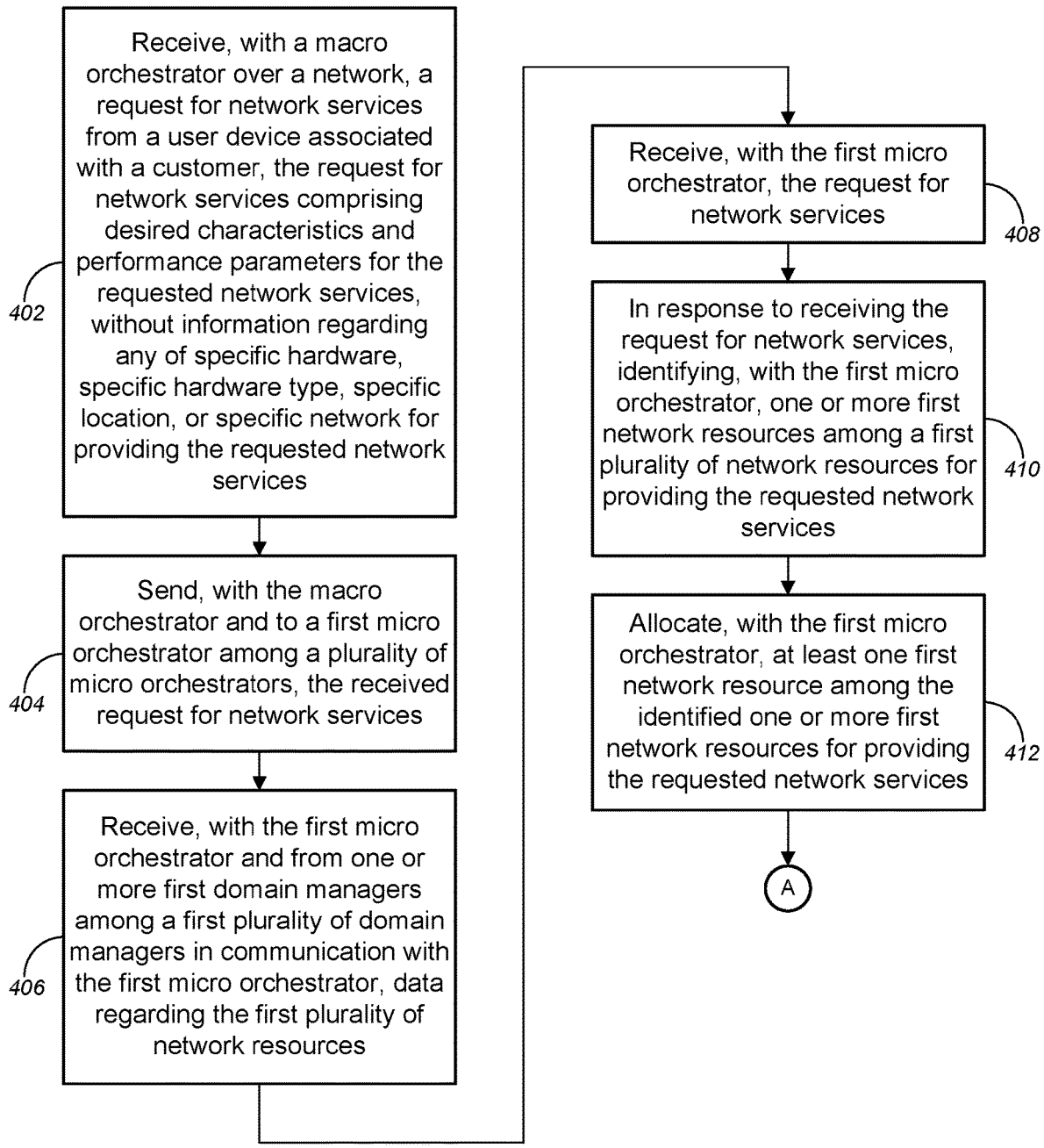
FIGS. 4A-4D are flow diagrams illustrating a method for implementing intent-based multi-tiered orchestration and automation, in accordance with various embodiments.

In the non-limiting embodiment of FIG. 4A, method 400, at block 402, might comprise receiving, with a macro orchestrator over a network, a request for network services from a user device associated with a customer, the request for network services comprising desired characteristics and performance parameters for the requested network services, without information regarding any of specific hardware, specific hardware type, specific location, or specific network for providing the requested network services.

In some instances, the desired performance parameters might include, without limitation, at least one of a maximum latency, a maximum jitter, a maximum packet loss, or a maximum number of hops, and/or the like. In some cases, the desired characteristics might include, but are not limited to, at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

At block 404, method 400 might comprise sending, with the macro orchestrator and to a first micro orchestrator among a plurality of micro orchestrators, the received request for network services. In some cases, the macro orchestrator might automate, manage, or control each of the plurality of micro orchestrators, while each micro orchestrator might automate, manage, or control at least one of a plurality of domain managers or a plurality of network resources. In some embodiments, the macro orchestrator and the plurality of micro orchestrators might each include, without limitation, one of a server computer over a network, a cloud-based computing system over a network, or a distributed computing system, and/or the like.

Method 400 might further comprise, at block 406, receiving, with the first micro orchestrator and from one or more first domain managers among a first plurality of domain managers in communication with the first micro orchestrator, data regarding the first plurality of network resources that are automated, managed, or controlled by each of the one or more first domain managers.

Method 400 might further comprise receiving, with the first micro orchestrator, the request for network services (block 408). At block 410, method 400 might comprise, in response to receiving the request for network services, identifying, with the first micro orchestrator, one or more first network resources among a first plurality of network resources for providing the requested network services, based at least in part on the desired characteristics and performance parameters, based at least in part on a determination that the one or more network resources are capable of providing network services having the desired characteristics and performance parameters, and, in some cases, based at least in part on the data regarding the one or more first network resources (received at block 406). In FIG. 4, although the process of receiving the data regarding the first plurality of network resources is shown to occur between sending the received request for network services to the first micro orchestrator and the first micro orchestrator receiving the request for network services, the various embodiments are not so limited, and the data regarding the first plurality of network resources may be received by the first micro orchestrator continually, occasionally, randomly, or in response to a request for data, or the like, as appropriate or as desired.

Method 400, at block 412, might comprise allocating, with the first micro orchestrator, at least one first network resource among the identified one or more first network resources for providing the requested network services.

Figure 4B:
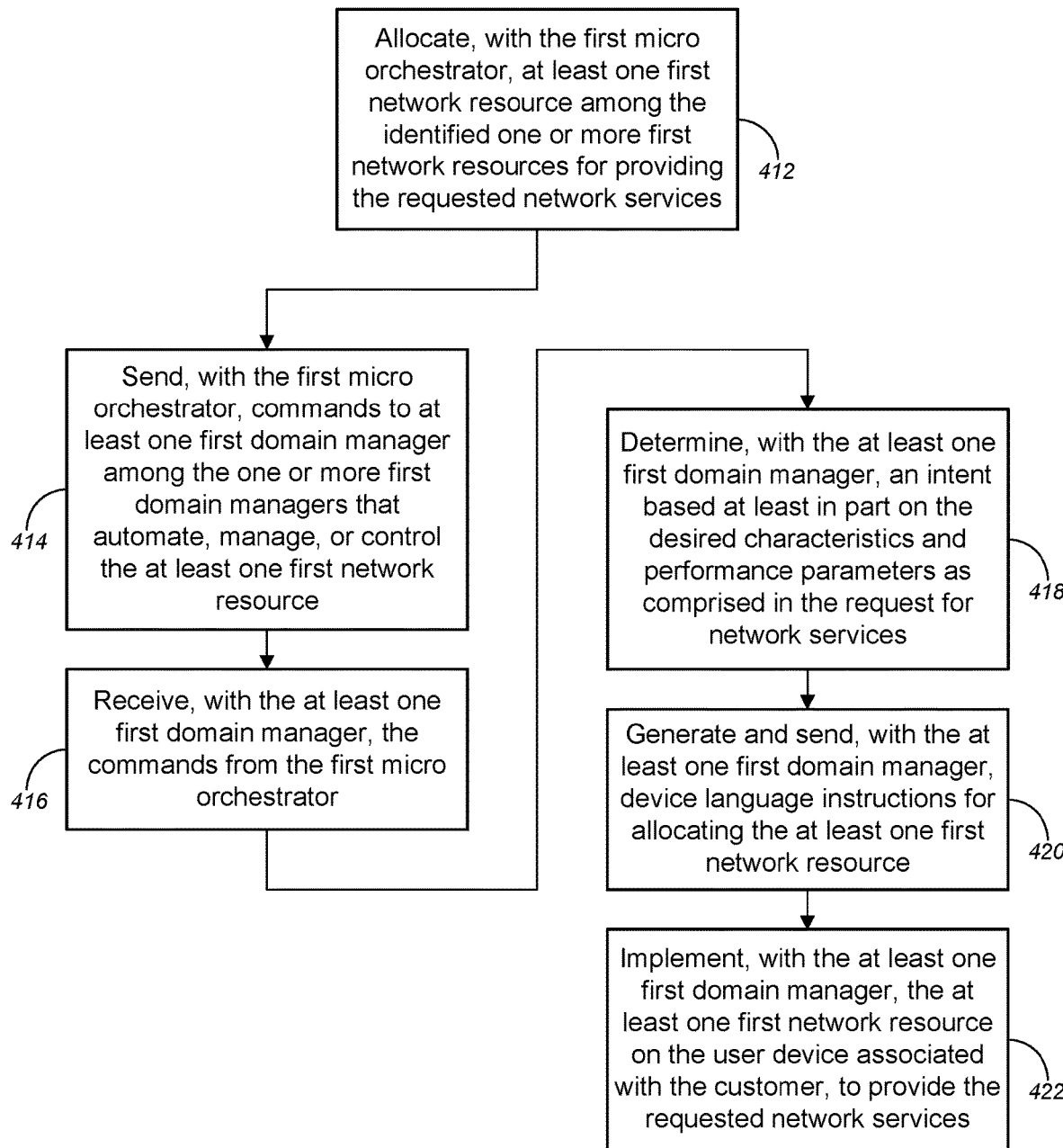
Figure 4C:
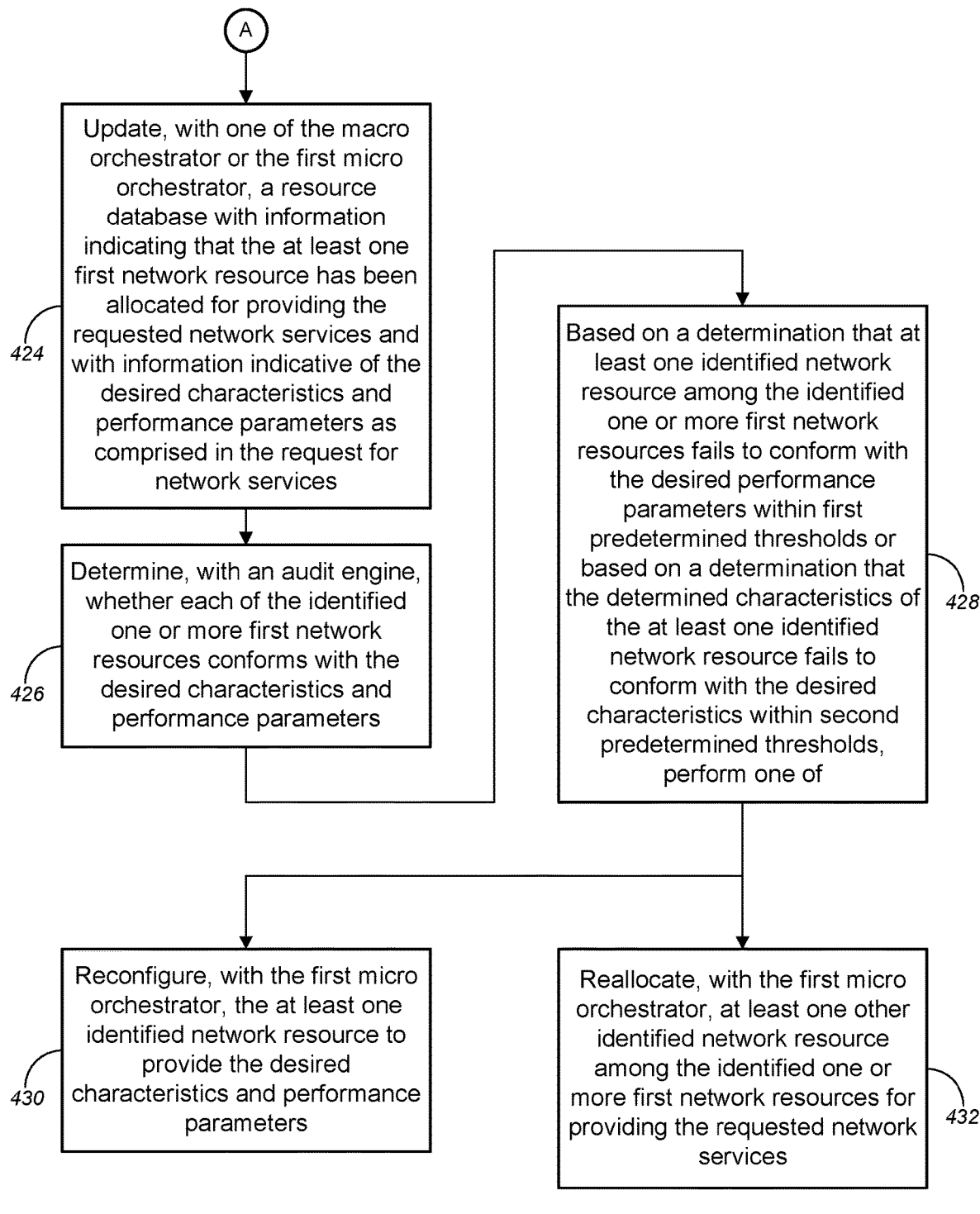

Method 400 might continue from FIG. 4A onto the process at block 424 in FIG. 4C following the circular marker denoted, "A."

With reference to FIG. 4B, allocating, with the first micro orchestrator, at least one first network resource among the identified one or more first network resources for providing the requested network services (at block 412) might comprise: sending, with the first micro orchestrator, commands to at least one first domain manager among the one or more first domain managers that automate, manage, or control the at least one first network resource (block 414); and receiving, with the at least one first domain manager, the commands form the first micro orchestrator (block 416). Method 400 might further comprise, in response to receiving the commands from the first micro orchestrator: determining, with the at least one first domain manager, an intent based at least in part on the desired characteristics and performance parameters as comprised in the request for network services (block 418); generating and sending, with the at least one first domain manager, device language instructions for allocating the at least one first network resource (block 420); and implementing, with the at least one first domain manager, the at least one first network resource on the user device associated with the customer, to provide the requested network services (block 422).

At block 424 in FIG. 4C (following the circular marker denoted, "A," from FIG. 4A), method 400 might comprise updating, with one of the macro orchestrator or the first micro orchestrator, a resource database with information indicating that the at least one first network resource has been allocated for providing the requested network services and with information indicative of the desired characteristics and performance parameters as comprised in the request for network services. At block 426, method 400 might comprise determining, with an audit engine, whether each of the identified one or more first network resources conforms with the desired characteristics and performance parameters.

Method 400 might further comprise, at block 428, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, performing one of: reconfiguring, with the first micro orchestrator, the at least one identified network resource to provide the desired characteristics and performance parameters (block 430); or reallocating, with the first micro orchestrator, at least one other identified network resource among the identified one or more first network resources for providing the requested network services (block 432).

Figure 4D:
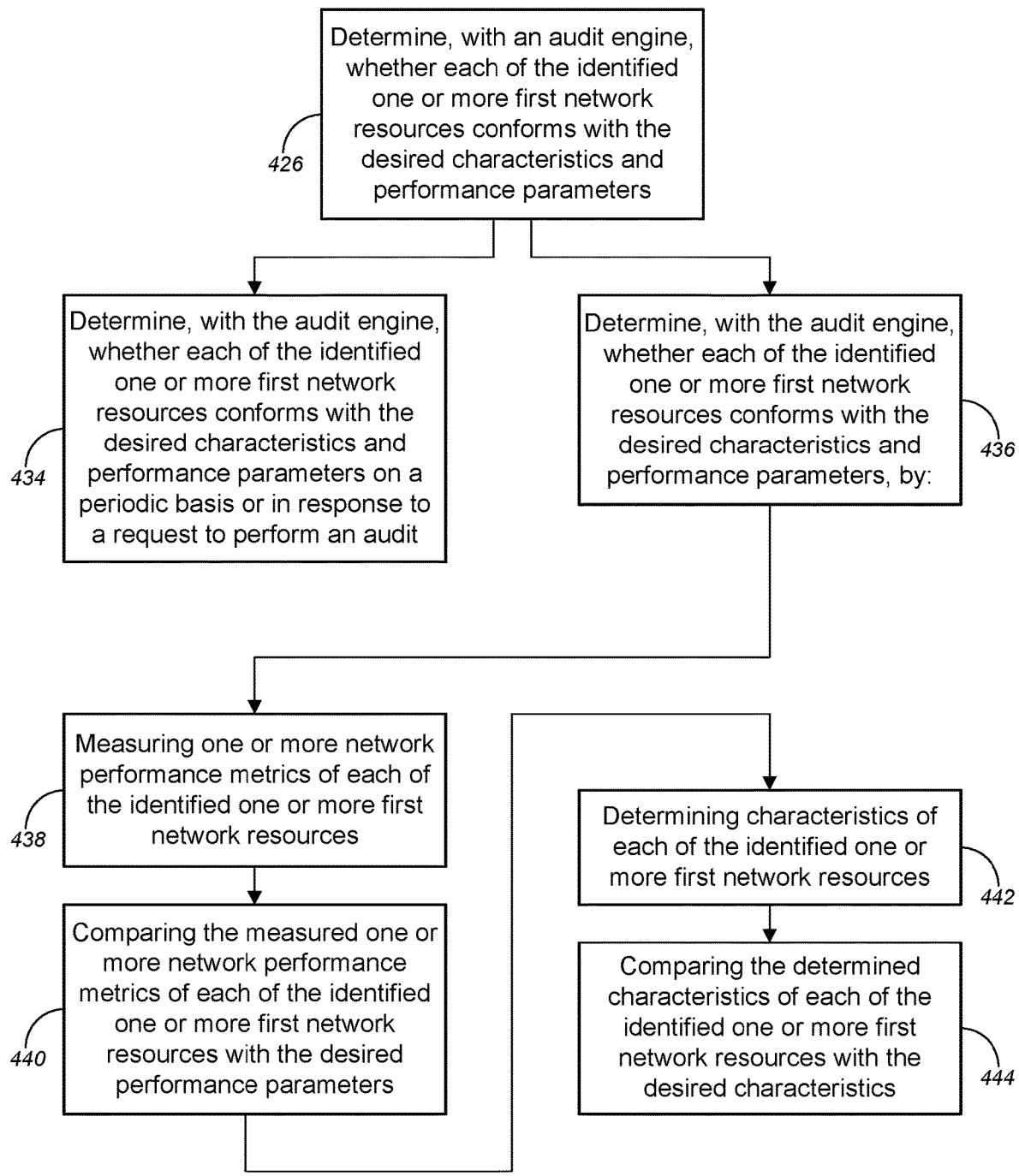

Turning to FIG. 4D, determining whether each of the identified one or more first network resources conforms with the desired characteristics and performance parameters (at block 426) might comprise determining, with the audit engine, whether each of the identified one or more first network resources conforms with the desired characteristics and performance parameters on a periodic basis or in response to a request to perform an audit (block 434).

Alternatively, or additionally, FIG. 4D, determining whether each of the identified one or more first network resources conforms with the desired characteristics and performance parameters (at block 426) might comprise, at block 436, determining, with the audit engine, whether each of the identified one or more first network resources conforms with the desired characteristics and performance parameters, by: measuring one or more network performance metrics of each of the identified one or more first network resources (block 438); comparing, with the audit engine, the measured one or more network performance metrics of each of the identified one or more first network resources with the desired performance parameters (block 440); determining characteristics of each of the identified one or more first network resources (block 442); and comparing, with the audit engine, the determined characteristics of each of the identified one or more first network resources with the desired characteristics (block 444).

In some embodiments, each of the one or more network performance metrics might include, but is not limited to, at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

FIG. 5A-5I (collectively, "FIG. 5") is a schematic diagram illustrating examples 500, 500', and 500" of various implementations for intent-based orchestration using network parsimony trees, in accordance with various embodiments.

Figure 5A:
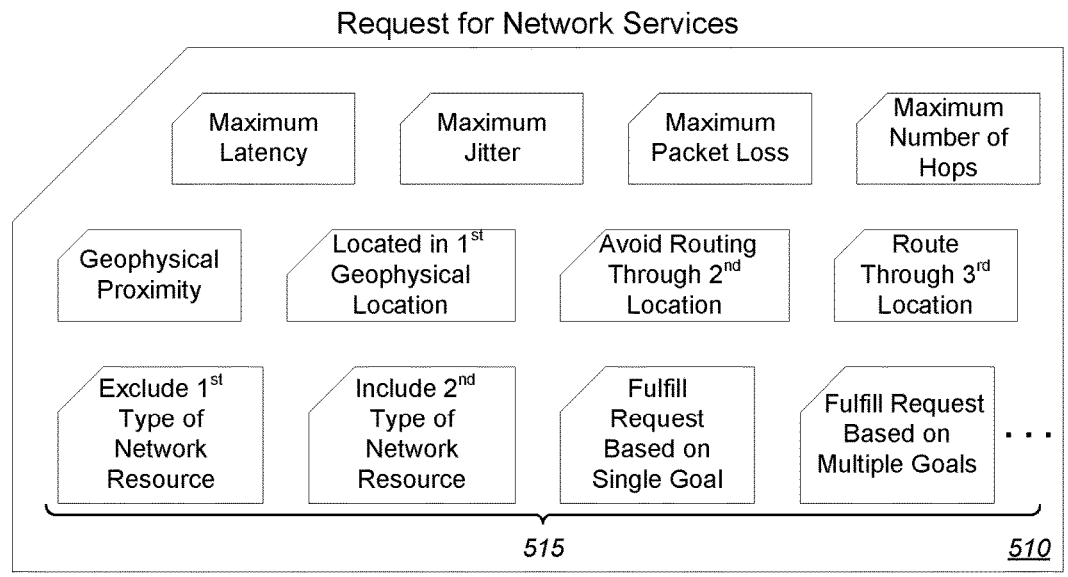
Figure 5A:
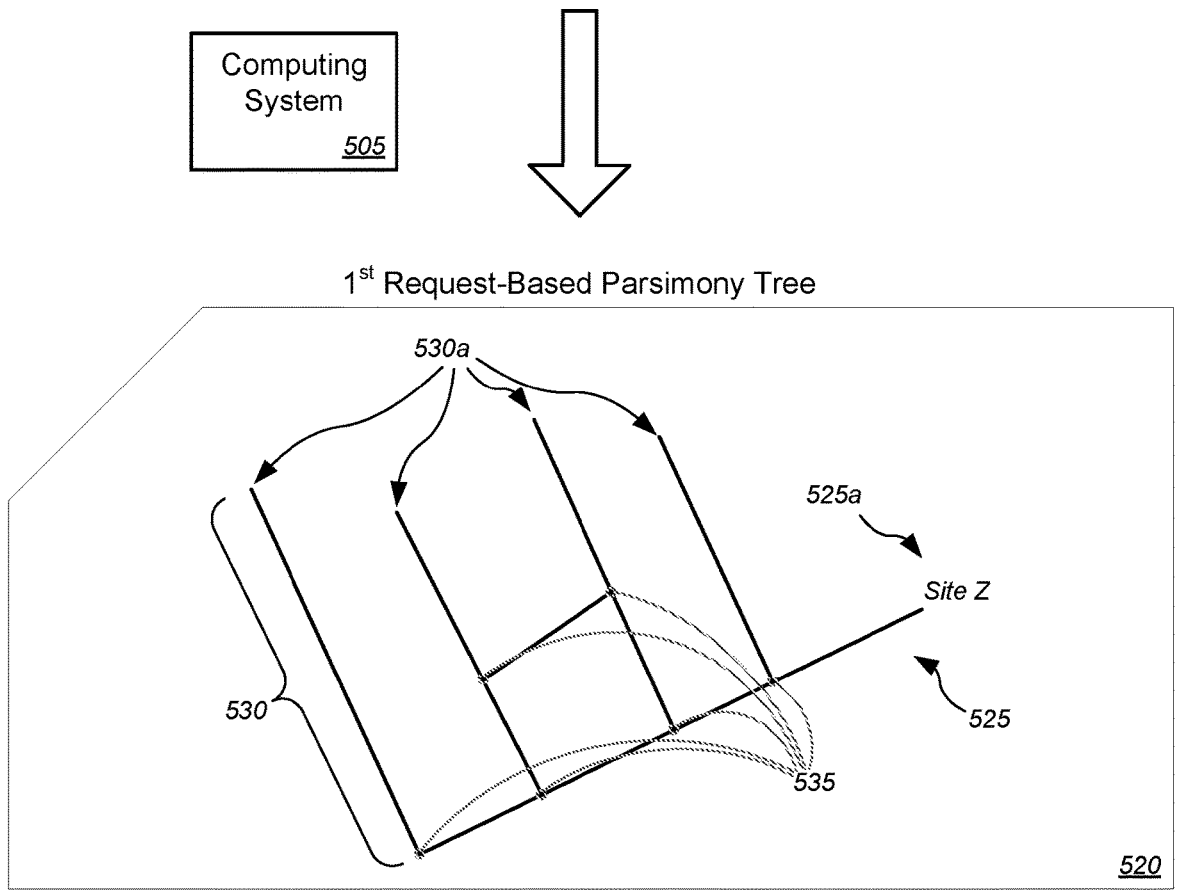
Figure 5B:
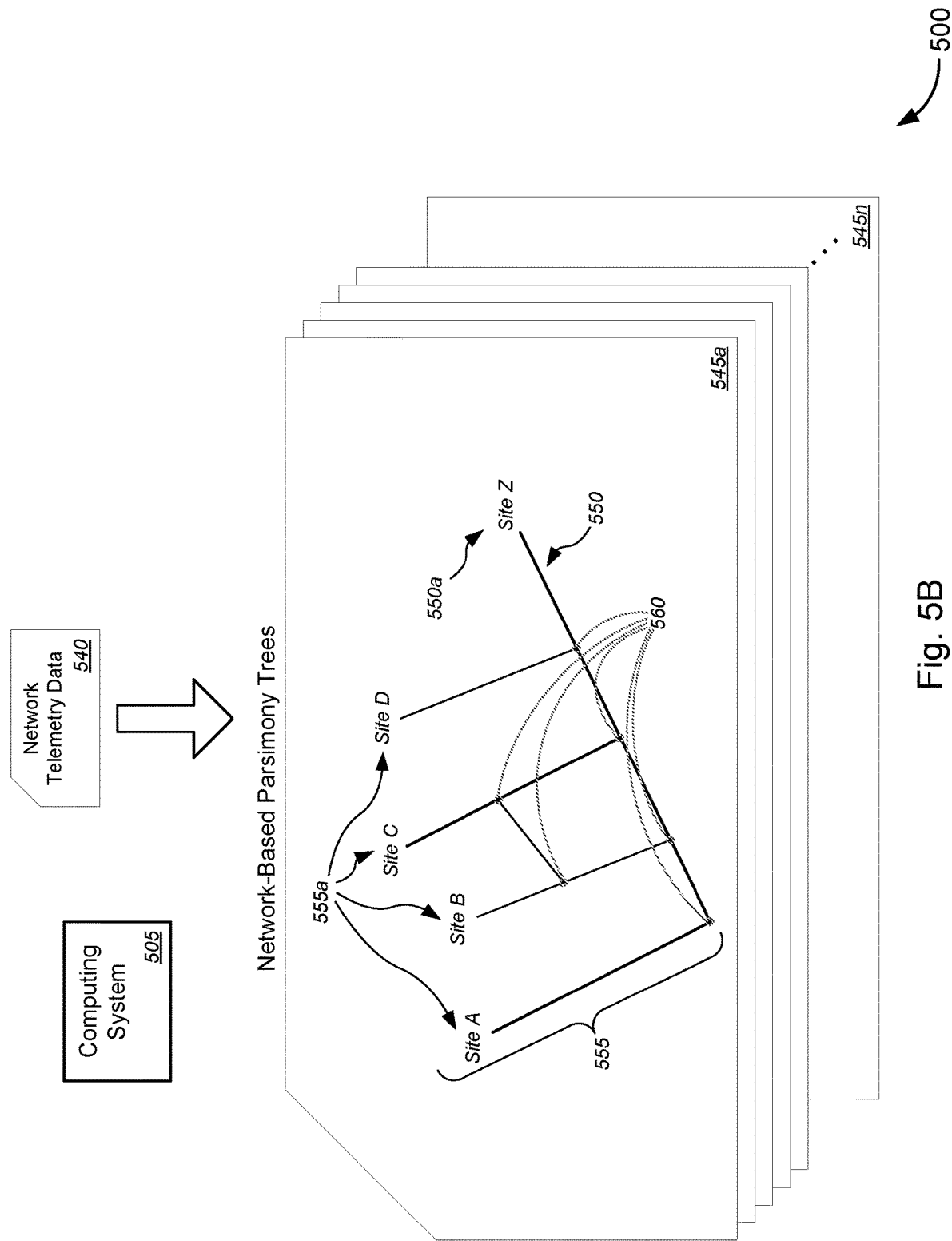
Figure 5D:
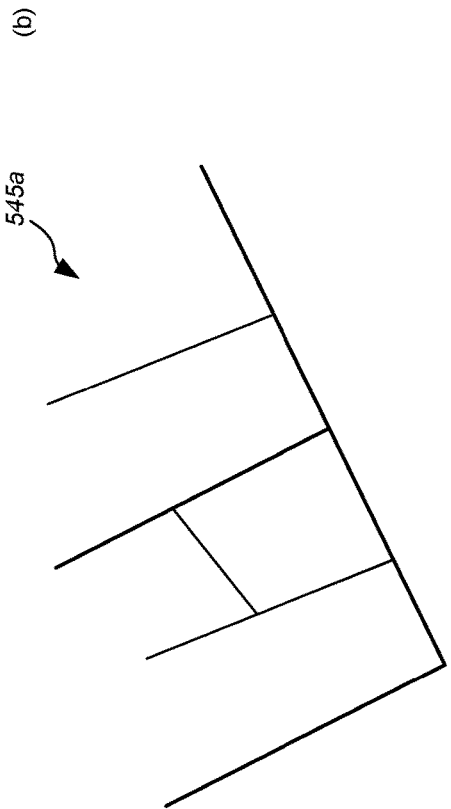
Figure 5D:
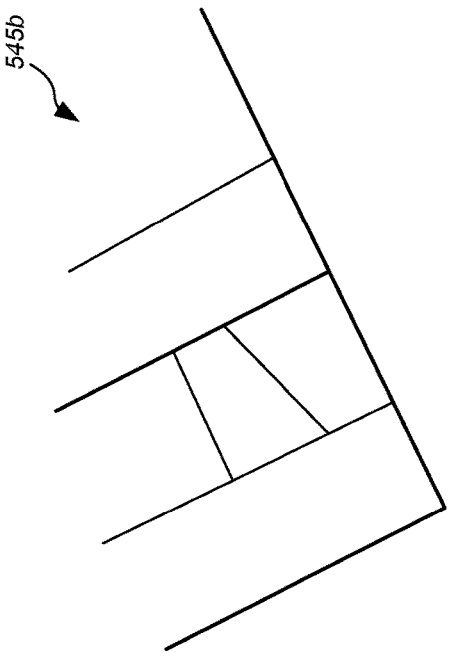
Figure 5D:
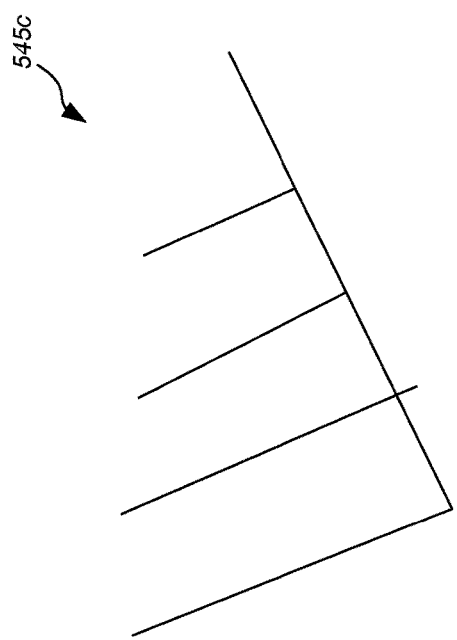
Figure 5D:
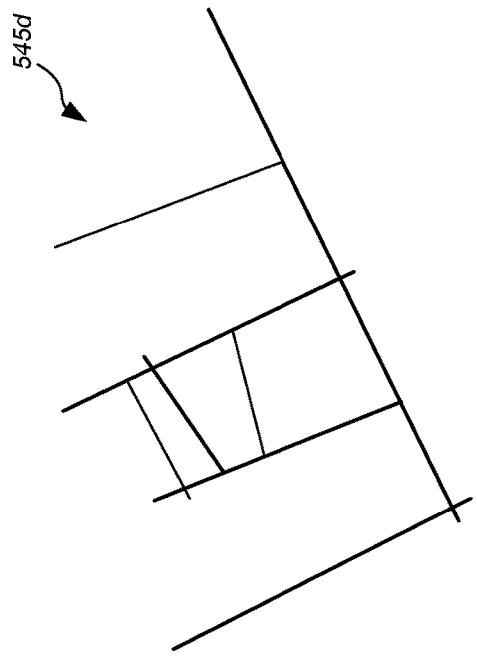
Figure 5E:
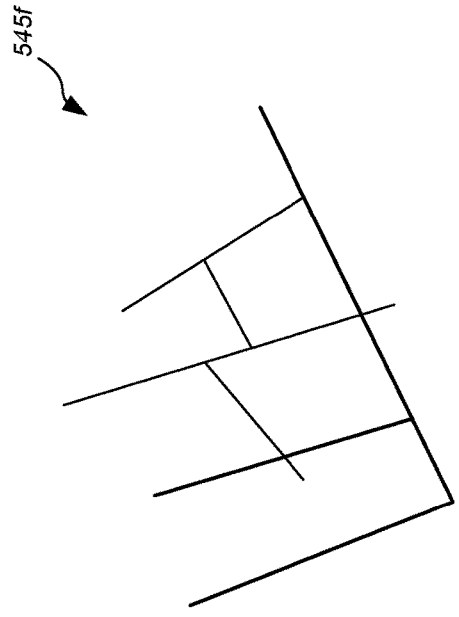
Figure 5E:
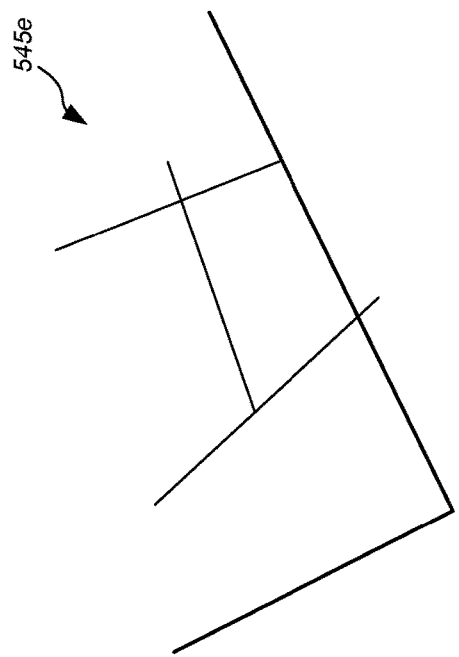
Figure 5E:
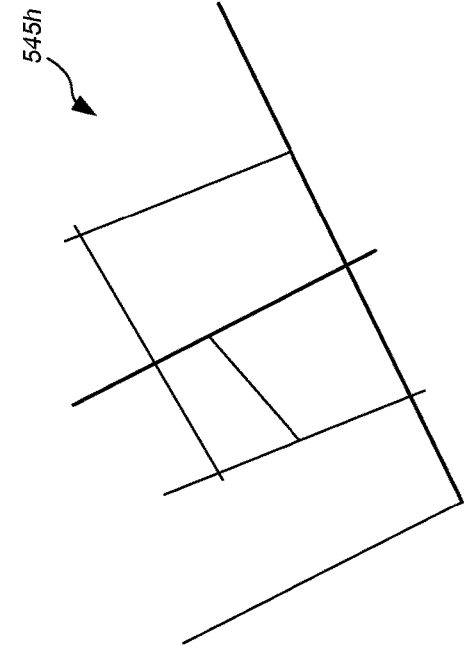
Figure 5E:
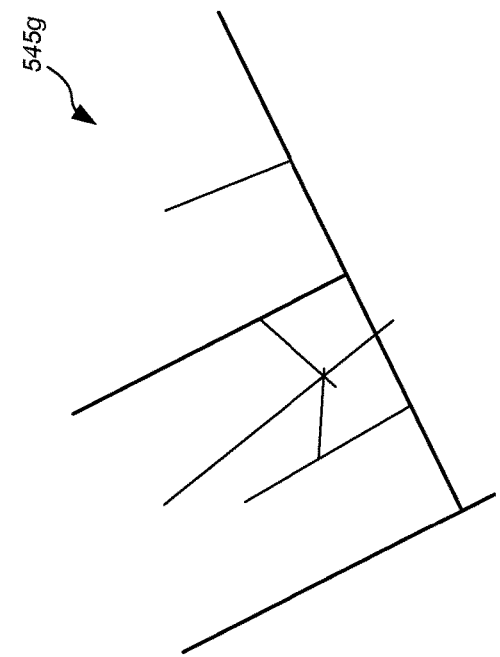
Figure 5G:
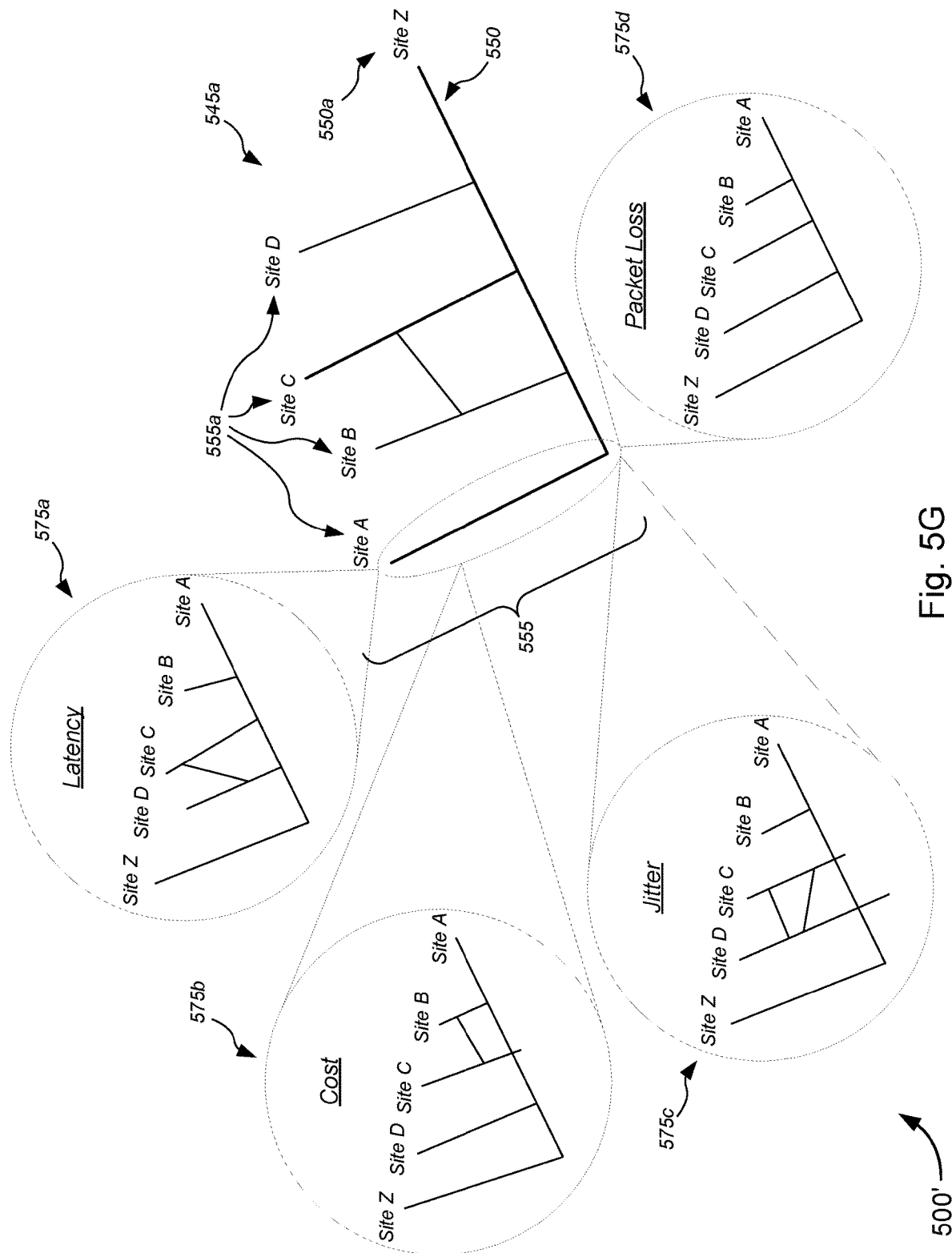
Figure 5H:
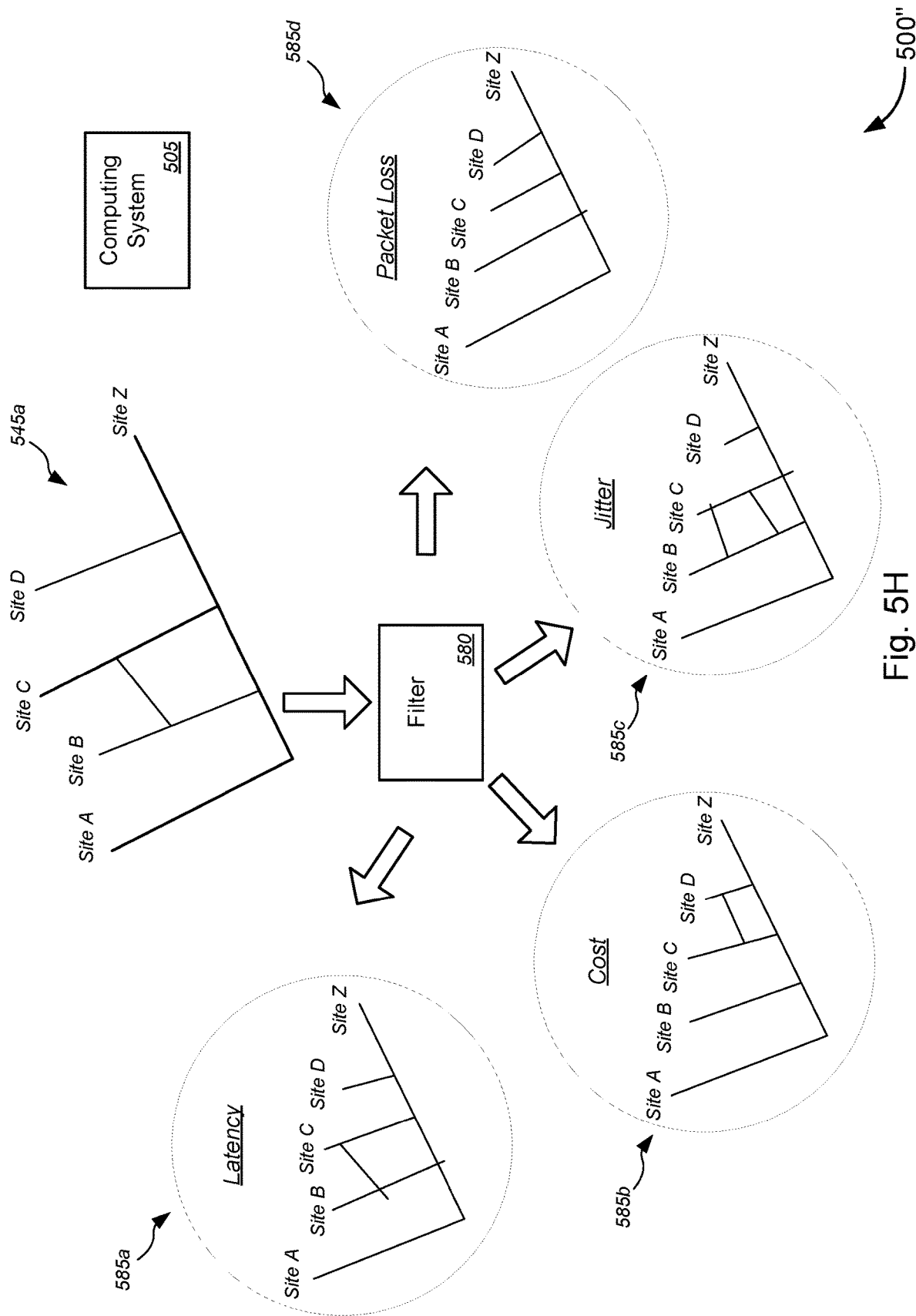

FIGS. 5A-5E depict non-limiting examples 500 of general implementation for intent-based orchestration using network parsimony trees, while FIGS. 5F and 5G depict non-limiting examples 500' of embedded parsimony trees within portions of parsimony trees, and FIG. 5H or 5I depicts non-limiting examples 500" of use of filters to filter out one or more characteristics or one or more sub-characteristics and/or to change the color temperature—in the case that color-codes embodied as a color temperature or range of colors indicative of characteristics or performance parameters including one or more of latency, jitter, packet loss, number of hops, bandwidth, utilization, capacity, or proximity, and/or the like, are used for portions of parsimony trees—based on changes in measured network metrics. In the non-limiting embodiments of FIG. 5, one or more parsimony trees might be generated, based on network telemetry data of one or more networks, where each parsimony tree might be a graphical representation of characteristics and performance parameters based on the network telemetry data of the one or more networks, and the system might perform network orchestration and automation based on the generated one or more parsimony trees.

With reference to the non-limiting embodiment of FIGS. 5A-5C, as shown in FIG. 5A, a computing system 505 might receive, over a network, a request 510 for network services from a user device associated with a customer, the request 510 for network services comprising desired characteristics and performance parameters 515 for the requested network services, without information regarding any of specific hardware, specific hardware type, specific location, or specific network for providing the requested network services. In some embodiments, the desired characteristics and performance parameters 515 might include, without limitation, at least one of a maximum latency, a maximum jitter, a maximum packet loss, a maximum cost, a maximum number of hops, requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

In response to receiving the request 510 for network services, the computing system 505 might generate a first request-based parsimony tree 520 based at least in part on the desired characteristics and performance parameters contained in the request for network services. According to some embodiments, the first request-based parsimony tree 520 might be a graphical representation including, without limitation, an end-point 525a of a first portion 525 representing delivery location of the requested network services (in this case, "Site Z," which might be a customer premises associated with the customer or with the user device associated with the customer, or the like), an endpoint 530a of each of one or more second portions 530 that connect with the first portion 525 representing a service provider site, each intersection 535 between two or more second portions or between the first portion and one of the second portions representing a network resource node, and characteristics of the first and second portions representing the desired characteristics and performance parameters contained in the request for network services, and/or the like.

Turning to FIG. 5B, the computing system 505 might access, from a datastore, a plurality of first network-based parsimony trees 545a-545n (collectively, "first network-based parsimony trees 545," or the like), each of the plurality of first network-based parsimony trees 545 being generated based on measured network metrics 540. In some embodiments, each first network-based parsimony tree 545 might be a graphical representation including, but not limited to, an end-point 550a of a third portion 550 representing the delivery location (in this case, "Site Z," which might be a customer premises associated with the customer or with the user device associated with the customer, or the like) of the requested network services, an endpoint 555a of each of one or more fourth portions 555 that connect with the third portion representing a service provider site (in this case, one of Sites A through D, or the like), each intersection 560 between two or more fourth portions or between the third portion and one of the fourth portions representing a network resource node, and characteristics of the third and fourth portions representing measured characteristics and performance parameters based on the measured network metrics.

According to some embodiments, the first portion 525 of the first request-based parsimony tree 520 and the third portion 550 of each first network-based parsimony tree 545 might each be represented by a trunk, while the one or more second portions 530 of the first request-based parsimony tree 520 and the one or more fourth portions 555 of each first network-based parsimony tree 545 might each be represented by a branch, and, in each parsimony tree 520 or 545, one or more branches might connect with the trunk. In some cases, in each of at least one parsimony tree, two or more branches might connect with each other via one or more connector branches and via the trunk, or the like.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

According to some embodiments, as shown in FIG. 5C, the first computing system 505 might compare the first request-based parsimony tree 520 with one or more first network-based parsimony trees (e.g., first network-based parsimony tree 545a, or the like) among the plurality of first network-based parsimony trees 545 to determine a fitness score (in this case, 560a) for each first network-based parsimony tree 545. Although FIG. 5C depicts comparison with one network-based parsimony tree 545a, the various embodiments are not so limited, and any suitable number (if not all) of the plurality of network-based parsimony trees 545a-545n may be compared with the first request-based parsimony tree 520, resulting in a fitness score 560 for each network-based parsimony tree 545 (e.g., a fitness score 560*a* for network-based parsimony tree 545*a*, a fitness score 560*b* for network-based parsimony tree 545*b*, and so on). In some instances, each fitness score 560 might be a value indicative of a level of heuristic matching (in some cases, embodied as a percentage match) between the first request-based parsimony tree 520 with one of the one or more first network-based parsimony trees 545. In some embodiments, comparing the first request-based parsimony tree 520 with one or more first network-based parsimony trees 545 might comprise comparing the first request-based parsimony tree 520 with one or more first network-based parsimony trees 545 using one or more GPUs, or the like.

Merely by way of example, in some cases, the first computing system 505 might identify a best-fit network-based parsimony tree among the one or more first network-based parsimony trees 545 based on the fitness scores 560 of the one or more first network-based parsimony trees; might identify one or more first network resources among a first plurality of network resources for providing the requested network services, based at least in part on network resources represented within the identified best-fit network-based parsimony tree; and might allocate at least one first network resource among the identified one or more first network resources for providing the requested network services. According to some embodiments, identifying the best-fit network-based parsimony tree might comprise identifying the most parsimonious first network-based parsimony tree for providing the requested network resources. That is, the first computing system 505 might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one ML system, at least one AI systems, or at least one NN system, and/or the like.

According to some embodiments, the first computing system 505 might receive updated measured network metrics; might, in response to receiving the updated measured network metrics, generate a plurality of updated first network-based parsimony trees; and might replace the plurality of first network-based parsimony trees in the datastore with the plurality of updated first network-based parsimony trees. In some embodiments, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file (e.g., .jpg file, .tiff file, .gif file, .bmp file, .png file, .dwf file, .dwg file, .drw file, .stl file, .pdf file, .svg file, .cgm file, etc.).

In some embodiments, rather than a single request-based parsimony tree being generated in response to receiving the request for network services, the first computing system 505 might generate a plurality of first request-based parsimony trees, each representing a desired characteristic or performance parameter, and the subsequent functions performed by the first orchestrator might be performed on this plurality of first request-based parsimony trees rather than the single request-based parsimony tree.

FIGS. 5D and 5E depict non-limiting examples of network parsimony trees that may correspond to one or more first network-based parsimony trees 545*a*-545*h* that collectively show differences in thickness of lines corresponding to the third and fourth portions 550 and 555, the differences in angles between each fourth portion 555 and corresponding third portion 550, differences in angles between connecting portions between two fourth portions 555 (where such connecting portions might represent ring network configurations or the like), the differences in the number of connecting portions between two fourth portion 555, the differences in terms of whether the third portion extends past the intersection with the first of the fourth portions, the differences in terms of whether particular fourth portions extend past the corresponding intersections with the third portion, the differences in terms of whether a connecting portion extends beyond one or both of the fourth portions that it connects, the differences in the length of the third portion, the differences in the length of each corresponding fourth portion, the differences in terms of the number of fourth portions connected to the third portion, the differences in terms of whether a connecting portion connects more than two fourth portions, and/or the like. Although particular examples of first network-based parsimony trees 545*a*-545*h* are shown in FIGS. 5D and 5E, the various embodiments are not so limited, and any suitable network-based parsimony trees may be used or generated having any suitable number or type of characteristics, including, but not limited to, at least one of thickness of each portion, length of each portion from the delivery location of the requested network services, number of network resource nodes on each portion, color-code of each portion, number of fourth portions, angle of each fourth portion relative to the third portion, number of any connector portions between two or more fourth portions, relative location of any connector portions between two or more fourth portions, length of any connector portions between two or more fourth portions, or angle of any connector portions between two or more fourth portions, and/or the like. Such characteristics of the third and fourth portions may represent one or more of latency, jitter, packet loss, number of hops, bandwidth, utilization, capacity, or proximity, and/or the like. Similar numbers or types of characteristics may also apply to generation of the request-based parsimony tree(s). In some cases, thickness of lines representing portions of each parsimony tree might be indicative of bandwidth, utilization, and/or capacity, while length of such lines might be indicative of proximity, and/or the like, although the various embodiments are not so limited, and the thickness and length may be used to represent other characteristics, while other features of the lines may represent bandwidth, utilization, capacity, and/or proximity.

With reference to the non-limiting embodiment 500' of FIG. 5F, in some instances, each portion 550 or 555 of each first network-based parsimony tree 545 might be represented by a second network-based parsimony tree (e.g., one of second network-based parsimony trees 565*a*-565*z*, or the like) among a plurality of second network-based parsimony tree 565 that is indicative of characteristics and performance parameters of that portion, where each portion of each second network-based parsimony tree 565 might be represented by a third network-based parsimony tree 570 among a plurality of third network-based parsimony tree 570 that is indicative of characteristics and performance parameters of that portion, and so on in a fractal-like manner.

Turning to the non-limiting embodiment 500' of FIG. 5G, alternative, or additional, to the fractal-like embedding of network-based parsimony tree within portions of network-based parsimony trees, each network-based parsimony tree or portions thereof may have embedded therein one or more network-characteristic parsimony trees 575, including, but not limited to, parsimony trees that are representative of latency (e.g., parsimony tree 575a, or the like), parsimony trees that are representative of cost (e.g., parsimony tree 575b, or the like), parsimony trees that are representative of jitter (e.g., parsimony tree 575c, or the like), parsimony trees that are representative of packet loss (e.g., parsimony tree 575d, or the like), and so on.

Referring to the non-limiting embodiment 500" of FIG. 5H, in some embodiments, the first computing system 505 might apply a first filter 580 to at least one first network-based parsimony tree (e.g., first network-based parsimony tree 545a, or the like) among the one or more first network-based parsimony trees 545 to filter out one or more characteristics or one or more sub-characteristics, in some cases, represented by network-characteristic parsimony trees 585. For example, the first filter 580 might filter first network-based parsimony tree 545a to produce one or more of network-characteristic parsimony trees 585a (representative of latency), network-characteristic parsimony trees 585b (representative of cost), network-characteristic parsimony trees 585c (representative of jitter), or network-characteristic parsimony trees 585d (representative of packet loss), and/or the like. And such filtering may be performed prior to comparing the first request-based parsimony tree with the one or more first network-based parsimony trees, as shown in FIG. 5C, or the like.

According to some embodiments, the characteristics of the third and fourth portions might include color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, alternative or additional to applying the first filter, the first computing system 505 might apply a second filter 590 to at least one first network-based parsimony tree 595a among the one or more first network-based parsimony trees to change the color temperature based on changes in measured network metrics to produce at least one fourth network-based parsimony tree 595b. The second filter 590 might perform one of the following: (i) apply a static filter that passes particular colors (which might represent characteristics of the network); (ii) apply a static filter that blocks particular colors; (iii) apply a dynamic filter that passes a particular shift in color temperature (thereby apply the same amount of shift for each color, as shown in FIG. 5I); (iv) apply a dynamic filter that blocks a particular shift in color temperature; and/or the like). In some embodiments, the computing system 505, in some cases aided by at least one of machine learning, AI, and/or neural network functionalities, may apply the first filter 580 and/or the second filter 590 as necessary or as appropriate to ensure optimized intent-based orchestration and automation.

FIGS. 6A-6E (collectively, "FIG. 6") are flow diagrams illustrating a method 600 for implementing intent-based orchestration using network parsimony trees, in accordance with various embodiments. Method 600 of FIG. 6A, 6D, or 6E continues onto FIG. 6B following the circular marker denoted, "A," and returns to FIG. 6A, 6D, or 6E following the circular marker denoted, "B." Method 600 of FIG. 6A, 6D, or 6E continues onto FIG. 6C following the circular marker denoted, "C," and returns to FIG. 6A, 6D, or 6E following the circular marker denoted, "D."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200, 200', 300, 500, 500', and 500" of FIGS. 1, 2A, 2B, 3, 5A-5E, 5F-5G, and 5H-5I, respectively (or components thereof), such methods may also be implemented using any suitable hardware (or software) implementation. Similarly, while each of the systems, examples, or embodiments 100, 200, 200', 300, 500, 500', and 500" of FIGS. 1, 2A, 2B, 3, 5A-5E, 5F-5G, and 5H-5I, respectively (or components thereof), can operate according to the method 600 illustrated by FIG. 6 (e.g., by executing instructions embodied on a computer readable medium), the systems, examples, or embodiments 100, 200, 200', 300, 500, 500', and 500" of FIGS. 1, 2A, 2B, 3, 5A-5E, 5F-5G, and 5H-5I can each also operate according to other modes of operation and/or perform other suitable procedures.

Figure 6A:
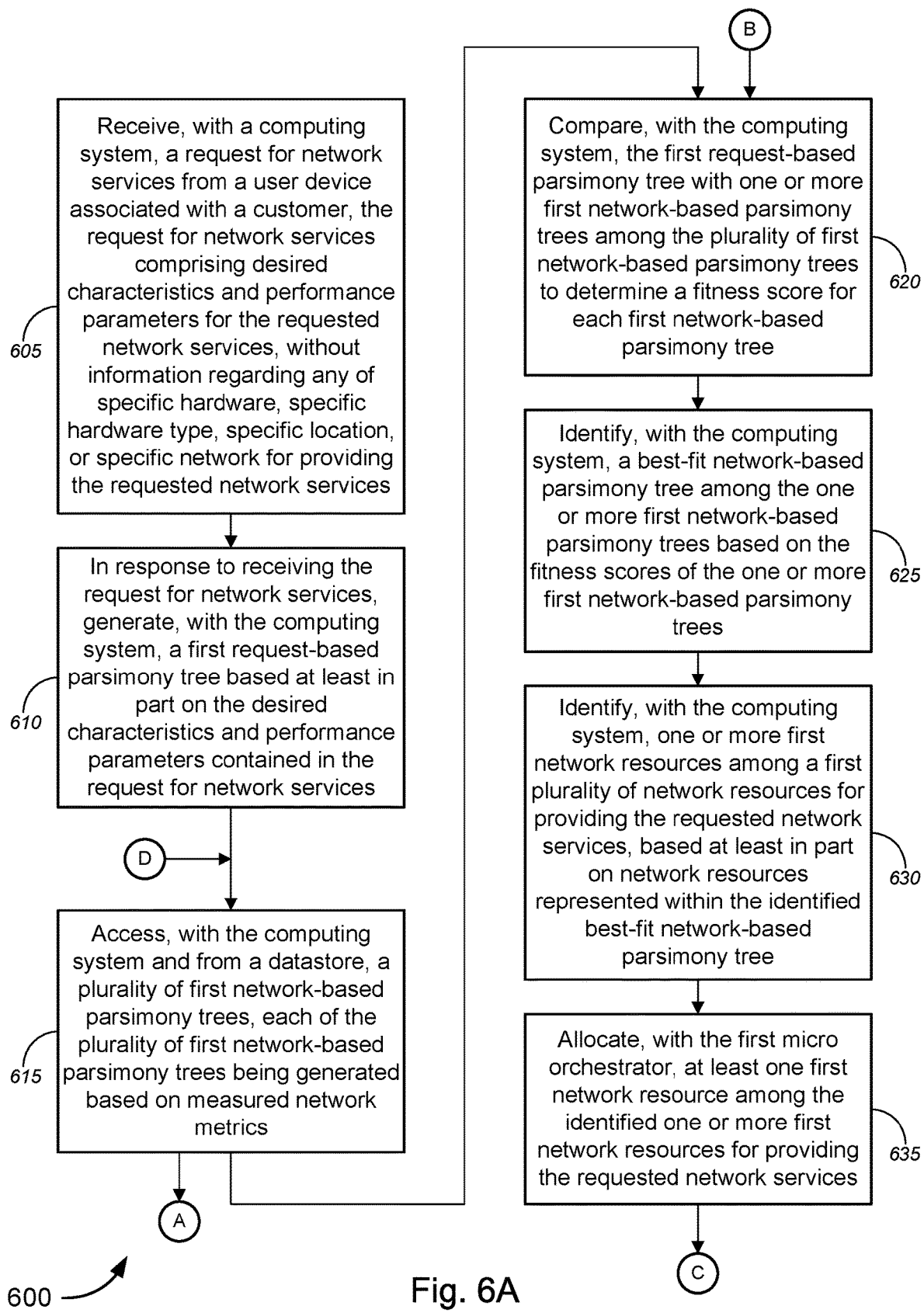
FIGS. 6A-6E are flow diagrams illustrating a method for implementing intent-based orchestration using network parsimony trees, in accordance with various embodiments.

In the non-limiting embodiment of FIG. 6A, method 600, at block 605, might comprise receiving, with a computing system, a request for network services from a user device associated with a customer, the request for network services comprising desired characteristics and performance parameters for the requested network services, without information regarding any of specific hardware, specific hardware type, specific location, or specific network for providing the requested network services.

In some embodiments, the computing system might include, but is not limited to, one of a server computer over a network, one or more graphics processing units ("GPUs"), a cloud-based computing system over a network, or a distributed computing system, and/or the like. In some instances, the desired performance parameters might include, without limitation, at least one of a maximum latency, a maximum jitter, a maximum packet loss, or a maximum number of hops, and/or the like. In some cases, the desired characteristics might include, but are not limited to, at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

At block 610, method 600 might comprise, in response to receiving the request for network services, generating, with the computing system, a first request-based parsimony tree based at least in part on the desired characteristics and performance parameters contained in the request for network services. According to some embodiments, the first request-based parsimony tree might be a graphical representation including, without limitation, an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services, and/or the like.

Method 600 might further comprise, at block 615, accessing, with the computing system and from a datastore, a plurality of first network-based parsimony trees, each of the plurality of first network-based parsimony trees being generated based on measured network metrics. In some embodiments, each first network-based parsimony tree might be a graphical representation including, but not limited to, an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

According to some embodiments, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

Figure 6B:
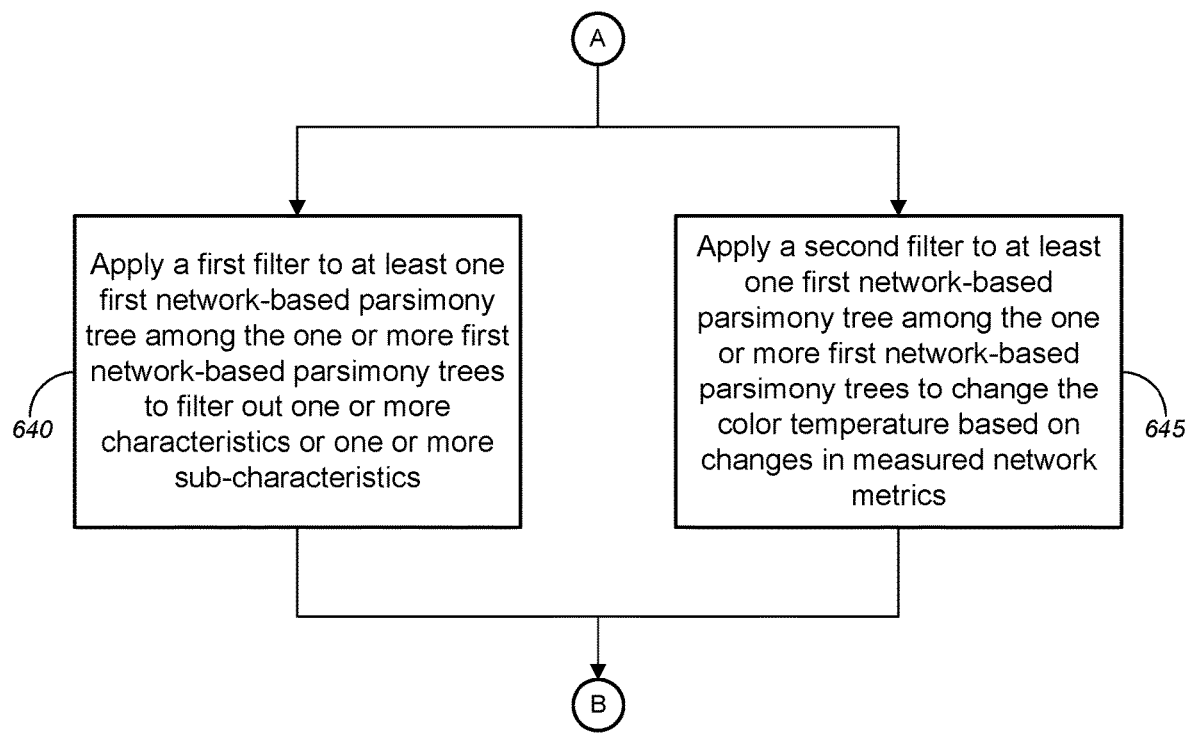

Method 600 either might continue onto the process at block 620 or might continue onto the process at block 640 or block 645 in FIG. 6B, following the circular marker denoted, "A."

At block 640 in FIG. 6B (following the circular marker denoted, "A"), method 600 might comprise applying a first filter to at least one first network-based parsimony tree among the one or more first network-based parsimony trees to filter out one or more characteristics or one or more sub-characteristics, prior to comparing the first request-based parsimony tree with the one or more first network-based parsimony trees. Method 600 might continue onto the process at block 620 in FIG. 6A, following the circular marker denoted, "B."

According to some embodiments, the characteristics of the third and fourth portions might include color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, alternative to the process at block 640, method 600, at block 645 in FIG. 6B (following the circular marker denoted, "A"), might comprise applying a second filter to at least one first network-based parsimony tree among the one or more first network-based parsimony trees to change the color temperature based on changes in measured network metrics. Method 600 might continue onto the process at block 620 in FIG. 6A, following the circular marker denoted, "B."

At block 620 in FIG. 6A (either continuing from the process at block 615 or following the circular marker denoted, "B," from the process at block 640 or at block 645 in FIG. 6B), method 600 might comprise comparing, with the computing system, the first request-based parsimony tree with one or more first network-based parsimony trees among the plurality of first network-based parsimony trees to determine a fitness score for each first network-based parsimony tree. In some instances, each fitness score might be a value indicative of a level of heuristic matching (in some cases, embodied as a percentage match) between the first request-based parsimony tree with one of the one or more first network-based parsimony trees. In some embodiments, comparing the first request-based parsimony tree with one or more first network-based parsimony trees might comprise comparing the first request-based parsimony tree with one or more first network-based parsimony trees using one or more graphics processing units ("GPUs"), or the like. GPUs are ideal for such comparison work, as a single GPU is analogous to an army of millions of kindergarteners, and are thus more suited to trying to perform tasks analogous to fitting a million different shaped pegs into a million different shaped holes, whereas a central processing unit ("CPU") is analogous to a person with a PhD per core (with each CPU having multiple cores (e.g., 12 cores per machine, or the like)) and is thus suitable for solving complex mathematical problems.

Method 600 might further comprise identifying, with the computing system, a best-fit network-based parsimony tree among the one or more first network-based parsimony trees based on the fitness scores of the one or more first network-based parsimony trees (block 625); identifying, with the computing system, one or more first network resources among a first plurality of network resources for providing the requested network services, based at least in part on network resources represented within the identified best-fit network-based parsimony tree (block 630); and allocating, with the computing system, at least one first network resource among the identified one or more first network resources for providing the requested network services (block 635). According to some embodiments, identifying the best-fit network-based parsimony tree might comprise identifying the most parsimonious first network-based parsimony tree for providing the requested network resources. That is, the computing system might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one machine learning ("ML") system, at least one artificial intelligence ("AI") systems, or at least one neural network ("NN") system, and/or the like.

Figure 6C:
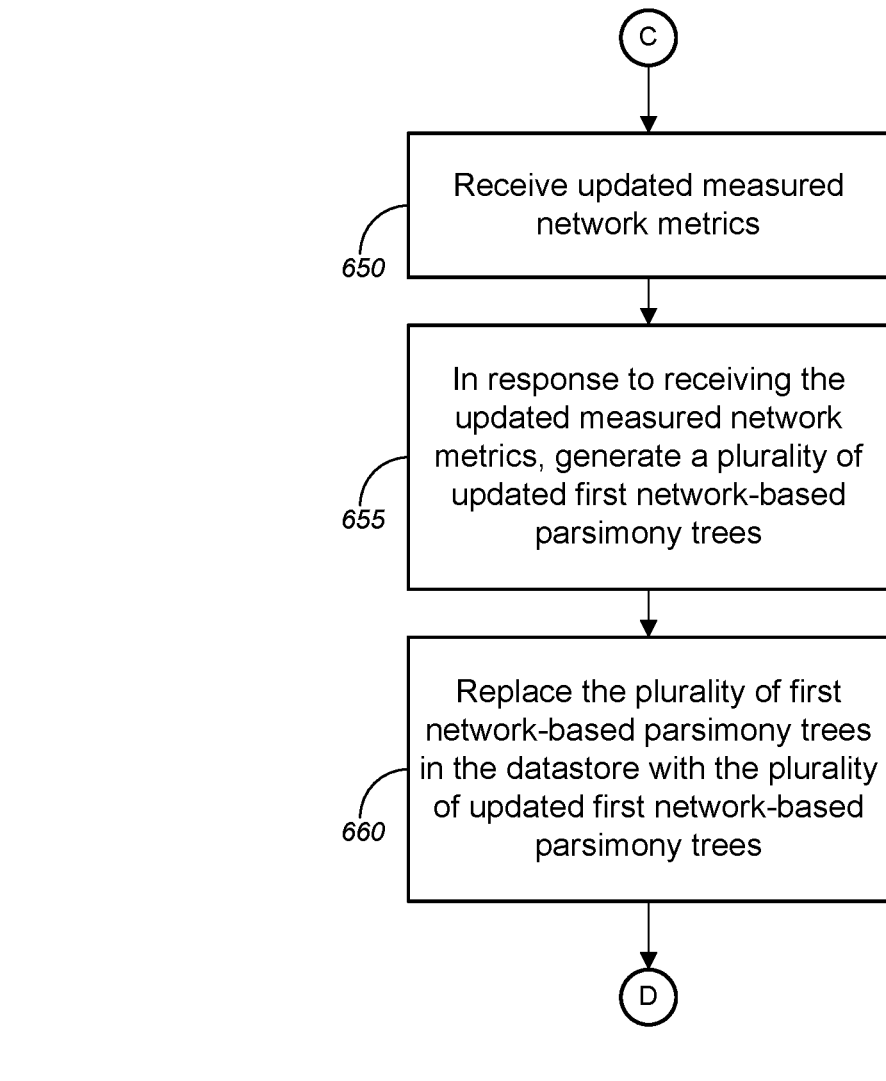

Method 600 might continue onto the process at block 650 in FIG. 6C, following the circular marker denoted, "C."

At block 650 in FIG. 6C (following the circular marker denoted, "C"), method 600 might comprise receiving updated measured network metrics. Method 600 might further comprise, in response to receiving the updated measured network metrics, generating a plurality of updated first network-based parsimony trees (block 655), and replacing the plurality of first network-based parsimony trees in the datastore with the plurality of updated first network-based parsimony trees (block 660). According to some embodiments, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file (e.g., .jpg file, .tiff file, .gif file, .bmp file, .png file, .dwf file, .dwg file, .drw file, .stl file, .pdf file, .svg file, .cgm file, etc.). Method 600 might return to the process at block 615 in FIG. 6A, following the circular marker denoted, "D."

Figure 6D:
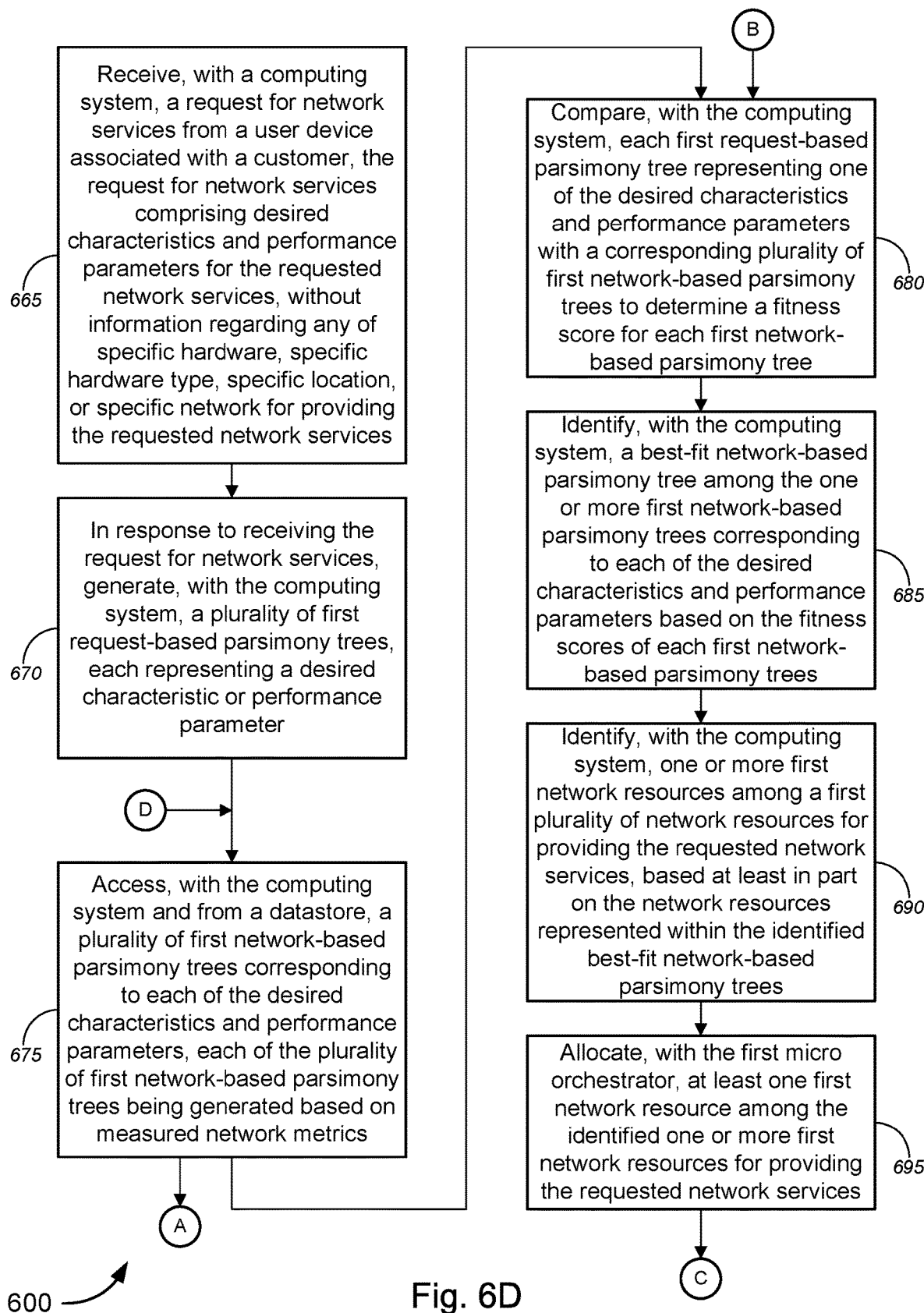

Alternative to the embodiment of FIG. 6A, in the non-limiting embodiment of FIG. 6D, method 600, at block 665, might comprise receiving, with a computing system, a request for network services from a user device associated with a customer, the request for network services comprising desired characteristics and performance parameters for the requested network services, without information regarding any of specific hardware, specific hardware type, specific location, or specific network for providing the requested network services.

In some embodiments, like in the embodiment of FIG. 6A, the computing system might include, but is not limited to, one of a server computer over a network, one or more graphics processing units ("GPUs"), a cloud-based computing system over a network, or a distributed computing system, and/or the like. In some instances, the desired performance parameters might include, without limitation, at least one of a maximum latency, a maximum jitter, a maximum packet loss, or a maximum number of hops, and/or the like. In some cases, the desired characteristics might include, but are not limited to, at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

At block 670, method 600 might comprise, in response to receiving the request for network services, generating, with the computing system, a plurality of first request-based parsimony trees based at least in part on the desired characteristics and performance parameters contained in the request for network services. According to some embodiments, each first request-based parsimony tree among the plurality of first request-based parsimony trees might represent a desired characteristic or performance parameter, or the like.

Method 600 might further comprise, at block 675, accessing, with the computing system and from a datastore, a plurality of first network-based parsimony trees, each of the plurality of first network-based parsimony trees being generated based on measured network metrics. In some embodiments, each first network-based parsimony tree might correspond to each of the desired characteristics and performance parameters, each of the plurality of first network-based parsimony trees being generated based on measured network metrics (or network telemetry data, or the like).

According to some embodiments, like in the embodiment of FIG. 6A, the first portion of each first request-based parsimony tree and the third portion of each first network-based parsimony tree might each be represented by a trunk, while the one or more second portions of each first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

Method 600 either might continue onto the process at block 680 or might continue onto the process at block 640 or block 645 in FIG. 6B, following the circular marker denoted, "A." The processes at blocks 640 and 645 may be as described in detail above, where after the process at block 640 or at block 645, method 600 might continue onto the process at block 680 in FIG. 6D, following the circular marker denoted, "B."

At block 680 in FIG. 6D (either continuing from the process at block 675 or following the circular marker denoted, "B," from the process at block 640 or at block 645 in FIG. 6B), method 600 might comprise comparing, with the computing system, each first request-based parsimony tree representing one of the desired characteristics and performance parameters with a corresponding plurality of first network-based parsimony trees to determine a fitness score for each first network-based parsimony tree. In some instances, as in the embodiment of FIG. 6A, each fitness score might be a value indicative of a level of heuristic matching (in some cases, embodied as a percentage match) between each first request-based parsimony tree with one of the one or more first network-based parsimony trees. In some embodiments, comparing each first request-based parsimony tree with one or more first network-based parsimony trees might comprise comparing each first request-based parsimony tree with one or more first network-based parsimony trees using one or more GPUs, or the like.

Method 600 might further comprise identifying, with the computing system, the best-fit network-based parsimony tree corresponding to each of the desired characteristics and performance parameters based on the fitness scores of the one or more first network-based parsimony trees (block 685); identifying, with the computing system, one or more first network resources among a first plurality of network resources for providing the requested network services, based at least in part on the network resources represented within the identified best-fit network-based parsimony trees (block 690); and allocating, with the computing system, at least one first network resource among the identified one or more first network resources for providing the requested network services (block 695). According to some embodiments, identifying the one or more best-fit network-based parsimony tree might comprise identifying the one or more most parsimonious first network-based parsimony tree for providing the requested network resources. In some embodiments, at least one of generating the plurality of first network-based parsimony trees, comparing each first request-based parsimony tree representing one of the desired characteristics and performance parameters with a corresponding plurality of first network-based parsimony trees, identifying the best-fit network-based parsimony tree, or identifying the one or more first network resources may be performed using one or more of at least one ML system, at least one AI systems, or at least one NN system, and/or the like.

Method 600 might continue onto the process at block 650 in FIG. 6C, following the circular marker denoted, "C." The processes at blocks 650-660 in FIG. 6C (following the circular marker denoted, "C") may be as described in detail above, where after the process at block 660, method 600 might return to the process at block 675 in FIG. 6D, following the circular marker denoted, "D."

Figure 6E:
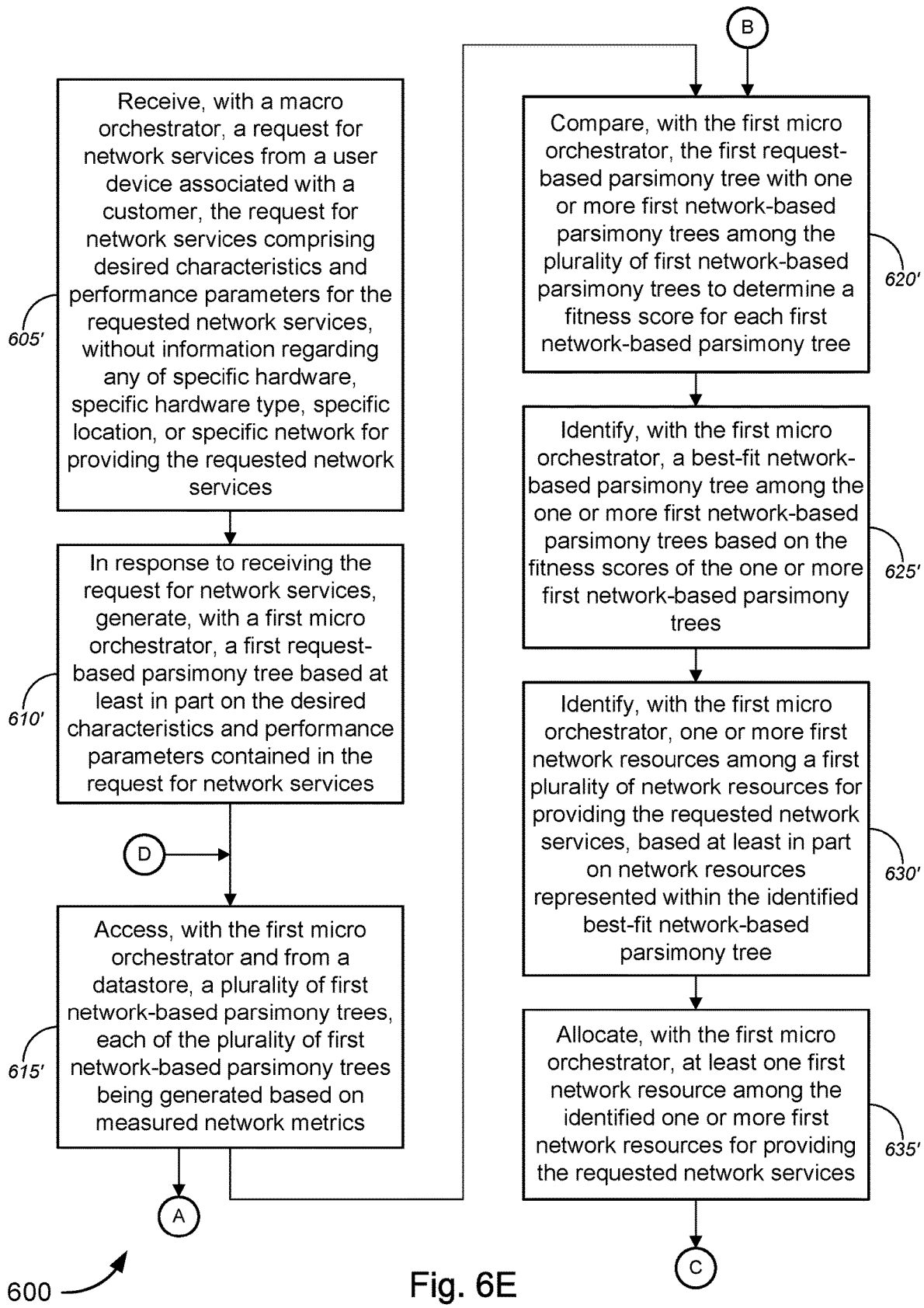

Alternative to each of the embodiment of FIG. 6A or the embodiment of FIG. 6D, in the non-limiting embodiment of FIG. 6E, method 600, at block 605', might comprise receiving, with a macro orchestrator over a network, a request for network services from a user device associated with a customer, the request for network services comprising desired characteristics and performance parameters for the requested network services, without information regarding any of specific hardware, specific hardware type, specific location, or specific network for providing the requested network services.

In some embodiments, the macro orchestrator might include, without limitation, one of a server computer over a network, a cloud-based computing system over a network, or a distributed computing system, and/or the like. In some instances, the desired performance parameters might include, without limitation, at least one of a maximum latency, a maximum jitter, a maximum packet loss, or a maximum number of hops, and/or the like. In some cases, the desired characteristics might include, but are not limited to, at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer, and/or the like.

At block 610', method 600 might comprise, in response to receiving the request for network services, generating, with a first micro orchestrator among a plurality of micro orchestrators, a first request-based parsimony tree based at least in part on the desired characteristics and performance parameters contained in the request for network services. According to some embodiments, the first request-based parsimony tree might be a graphical representation including, without limitation, an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services, and/or the like. In some cases, the plurality of micro orchestrators might each include, but is not limited to, one of a server computer over a network, a cloud-based computing system over a network, or a distributed computing system, and/or the like. The macro orchestrator and the plurality of micro orchestrators may be similar, if not identical, to the macro orchestrator 105, 205, 250, and/or 305 and the plurality of micro orchestrators 110, 210, 255, 325, and/or 350 of systems 100, 200, 200', and 300 of FIGS. 1, 2A, 2B, and 3, as described in detail above, at least in terms of structure and/or function.

Method 600 might further comprise, at block 615', accessing, with the first micro orchestrator and from a datastore, a plurality of first network-based parsimony trees, each of the plurality of first network-based parsimony trees being generated based on measured network metrics. In some embodiments, each first network-based parsimony tree might be a graphical representation including, but not limited to, an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

According to some embodiments, like in the embodiment of FIG. 6A, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

Method 600 either might continue onto the process at block 620' or might continue onto the process at block 640 or block 645 in FIG. 6B, following the circular marker denoted, "A." The processes at blocks 640 and 645 may be as described in detail above, where after the process at block 640 or at block 645, method 600 might continue onto the process at block 620' in FIG. 6E, following the circular marker denoted, "B."

At block 620' in FIG. 6E (either continuing from the process at block 615' or following the circular marker denoted, "B," from the process at block 640 or at block 645 in FIG. 6B), method 600 might comprise comparing, with the first micro orchestrator, the first request-based parsimony tree with one or more first network-based parsimony trees among the plurality of first network-based parsimony trees to determine a fitness score for each first network-based parsimony tree. In some instances, as in the embodiment of FIG. 6A, each fitness score might be a value indicative of a level of heuristic matching (in some cases, embodied as a percentage match) between the first request-based parsimony tree with one of the one or more first network-based parsimony trees. In some embodiments, comparing the first request-based parsimony tree with one or more first network-based parsimony trees might comprise comparing the first request-based parsimony tree with one or more first network-based parsimony trees using one or more GPUs, or the like.

Method 600 might further comprise identifying, with the first micro orchestrator, a best-fit network-based parsimony tree among the one or more first network-based parsimony trees based on the fitness scores of the one or more first network-based parsimony trees (block 625'); identifying, with the first micro orchestrator, one or more first network resources among a first plurality of network resources for providing the requested network services, based at least in part on network resources represented within the identified best-fit network-based parsimony tree (block 630'); and allocating, with the first micro orchestrator, at least one first network resource among the identified one or more first network resources for providing the requested network services (block 635'). According to some embodiments, identifying the best-fit network-based parsimony tree might comprise identifying the most parsimonious first network-based parsimony tree for providing the requested network resources. That is, the first micro orchestrator might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one ML system, at least one AI systems, or at least one NN system, and/or the like.

Method 600 might continue onto the process at block 650 in FIG. 6C, following the circular marker denoted, "C." The processes at blocks 650-660 in FIG. 6C (following the circular marker denoted, "C") may be as described in detail above, where after the process at block 660, method 600 might return to the process at block 615' in FIG. 6E, following the circular marker denoted, "D."

Exemplary System and Hardware Implementation

Figure 7:
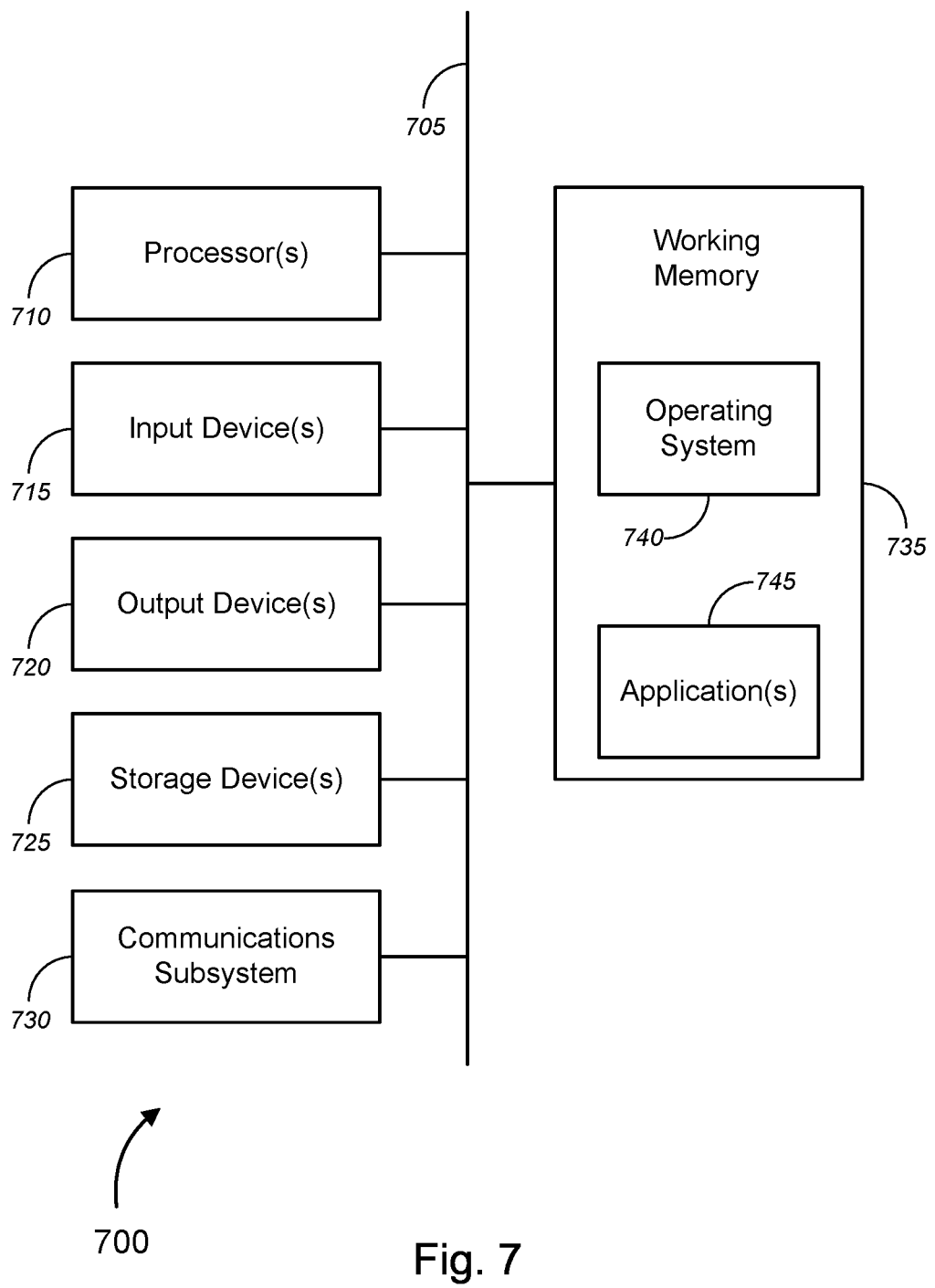
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., macro orchestrators 105 and 305, micro orchestrators 110, 325, and 350, user devices 125a-125n and 310, domain managers 135a, 135b, 335a, 335b, 360a-360c, network resources or devices or pools 140, 340a-340d, and 365a-365d, audit engine 170, and computing system 505, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., macro orchestrators 105 and 305, micro orchestrators 110, 325, and 350, user devices 125*a*-125*n* and 310, domain managers 135*a*, 135*b*, 335*a*, 335*b*, 360*a*-360*c*, network resources or devices or pools 140, 340*a*-340*d*, 365*a*-365*d*, and audit engine 170, and computing system 505, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
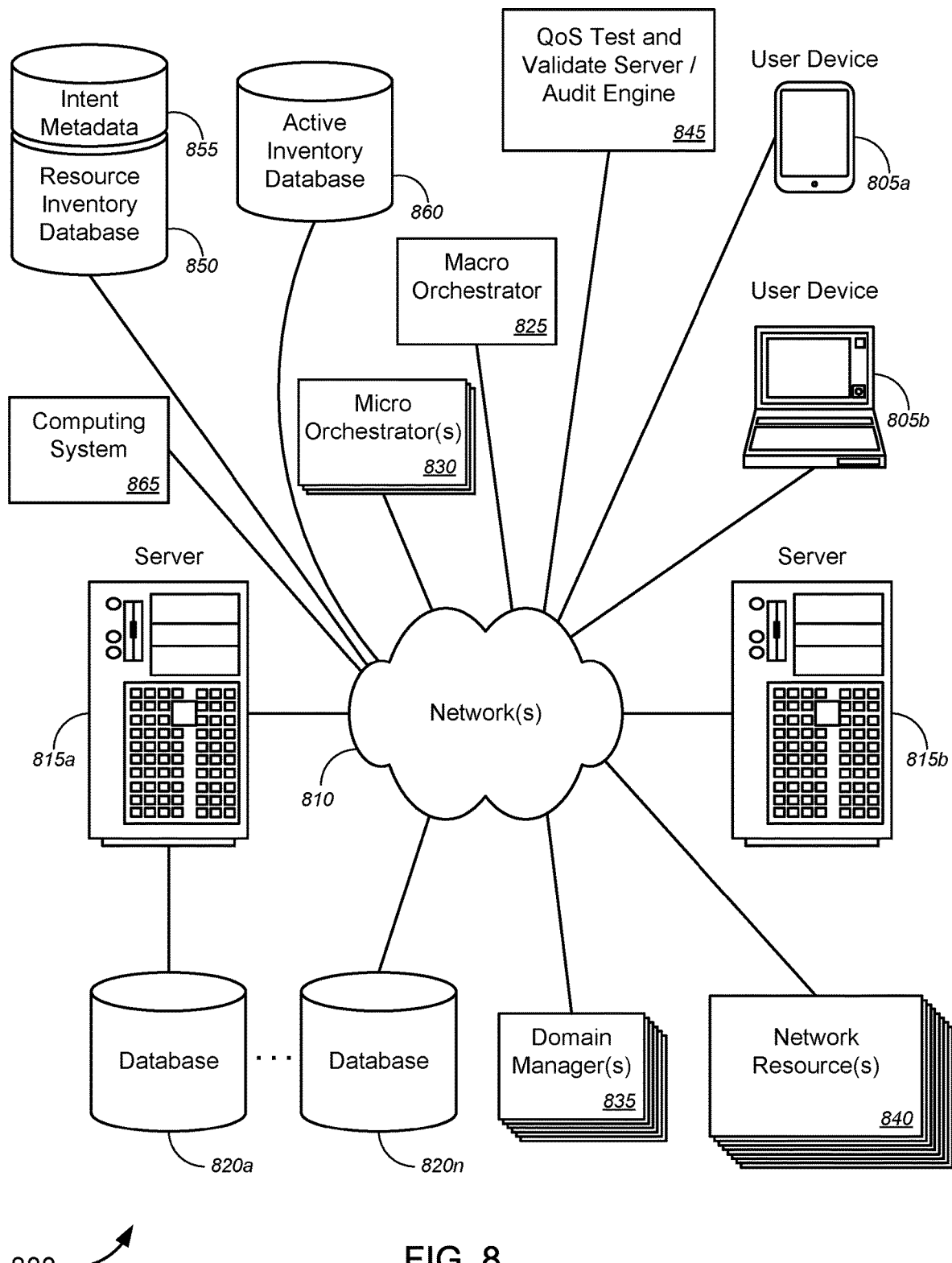
FIG. 8 is a block diagram illustrating a networked system of computers, computing systems, or system hardware architecture, which can be used in accordance with various embodiments.

As noted above, a set of embodiments comprises methods and systems for implementing network services orchestration, and, more particularly, to methods, systems, and apparatuses for implementing intent-based multi-tiered orchestration and automation and/or implementing intent-based orchestration using network parsimony trees. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/ or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 810 (similar to network(s) 115, 130, 145a-145n, and/or 150a-150n of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing network services orchestration, and, more particularly, to methods, systems, and apparatuses for implementing intent-based multi-tiered orchestration and automation and/or implementing intent-based orchestration using network parsimony trees, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise macro orchestrator 825 (similar to macro orchestrators 105 and 305 of FIGS. 1 and 3, or the like), one or more micro orchestrators 830 (similar to micro orchestrators 110, 325, and 350 of FIGS. 1 and 3, or the like), one or more domain managers 835 (similar to domain managers 135a, 135b, 335a, 335b, and 360a-360c of FIGS. 1 and 3, or the like), one or more network resources 840 (similar to network resources or devices or pools 140, 340a-340d, and 365a-365d of FIGS. 1 and 3, or the like), quality of service ("QoS") test and validate server or audit engine 845 (similar to QoS test and validate server or audit engine 170 of FIG. 1, or the like), resource inventory database 850 (similar to resource inventory database 155 of FIG. 1, or the like), intent metadata database 855 (similar to intent metadata database 160 of FIG. 1, or the like), and active inventory database 860 (similar to active inventory database 165 of FIG. 1, or the like). System 800 might further comprise computing system 865 (similar to computing system 505 of FIG. 5, of the like).

In operation, the macro orchestrator 825 might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator 825 might send, to a first micro orchestrator among a plurality of micro orchestrators (e.g., the one or more micro orchestrators 830, or the like), the received request for network services, where the macro orchestrator automates, manages, or controls each of the plurality of micro orchestrators, while each micro orchestrator automates, manages, or controls at least one of a plurality of domain managers (e.g., the one or more domain managers 835, or the like) or a plurality of network resources (e.g., network resources 840, or the like). In response to receiving the request for network services, the first micro orchestrator might identify one or more first network resources among a first plurality of network resources for providing the requested network services, based at least in part on the desired characteristics and performance parameters, and based at least in part on a determination that the one or more network resources are capable of providing network services having the desired characteristics and performance parameters. The first micro orchestrator might allocate at least one first network resource among the identified one or more first network resources for providing the requested network services.

In some embodiments, the first micro orchestrator might (continually, occasionally, randomly, or in response to a request for data, or the like) receive, from one or more first domain managers among a first plurality of domain managers in communication with the first micro orchestrator, data regarding the first plurality of network resources that are automated, managed, or controlled by each of the one or more first domain managers. In such cases, identifying, with the first micro orchestrator, one or more first network resources among a first plurality of network resources for providing the requested network services might comprise identifying, with the first micro orchestrator, one or more first network resources among a first plurality of network resources for providing the requested network services, based at least in part on the data regarding the one or more first network resources, based at least in part on the desired characteristics and performance parameters, and based at least in part on a determination that the one or more network resources are capable of providing network services having the desired characteristics and performance parameters.

According to some embodiments, allocating, with the first micro orchestrator, at least one first network resource among the identified one or more first network resources for providing the requested network services might comprise: sending, with the first micro orchestrator, commands to at least one first domain manager among the one or more first domain managers that automate, manage, or control the at least one first network resource; and in response to receiving the commands from the first micro orchestrator: determining, with the at least one first domain manager, an intent based at least in part on the desired characteristics and performance parameters as comprised in the request for network services; generating and sending, with the at least one first domain manager, device language instructions for allocating the at least one first network resource; and implementing, with the at least one first domain manager, the at least one first network resource on the user device associated with the customer, to provide the requested network services.

In some embodiments, one of the macro orchestrator or the first micro orchestrator might update a resource database (e.g., resource inventory database 850, intent metadata database 855, active inventory database 860, and/or data lake or database(s) 820a-820n, or the like) with information indicating that the at least one first network resource has been allocated for providing the requested network services and with information indicative of the desired characteristics and performance parameters as comprised in the request for network services. In some cases, an audit engine (e.g., audit engine 845, or the like) might determine whether each of the identified one or more first network resources conforms with the desired characteristics and performance parameters. In some instances, determining whether each of the identified one or more first network resources conforms with the desired characteristics and performance parameters might comprise determining, with the audit engine, whether each of the identified one or more first network resources conforms with the desired characteristics and performance parameters on a periodic basis or in response to a request to perform an audit. Alternatively, or additionally, determining whether each of the identified one or more first network resources conforms with the desired characteristics and performance parameters might comprise determining, with the audit engine, whether each of the identified one or more first network resources conforms with the desired characteristics and performance parameters, by: measuring one or more network performance metrics of each of the identified one or more first network resources; comparing, with the audit engine, the measured one or more network performance metrics of each of the identified one or more first network resources with the desired performance parameters; determining characteristics of each of the identified one or more first network resources; and comparing, with the audit engine, the determined characteristics of each of the identified one or more first network resources with the desired characteristics.

In such cases, each of the one or more network performance metrics might include, without limitation, at least one of quality of service ("QoS") measurement data, platform resource data and metrics, service usage data, topology and reference data, historical network data, network usage trend data, or one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS"), and/or the like.

According to some embodiments, based on a determination that at least one identified network resource among the identified one or more first network resources fails to conform with the desired performance parameters within first predetermined thresholds or based on a determination that the determined characteristics of the at least one identified network resource fails to conform with the desired characteristics within second predetermined thresholds, the first micro orchestrator either might reconfigure the at least one identified network resource to provide the desired characteristics and performance parameters; or might reallocate at least one other identified network resources among the identified one or more first network resources for providing the requested network services.

In some aspects, one or more parsimony trees might be generated, based on network telemetry data of one or more networks, where each parsimony tree might be a graphical representation of characteristics and performance parameters based on the network telemetry data of the one or more networks, and the system might perform network orchestration and automation based on the generated one or more parsimony trees. In particular, the macro orchestrator 825 and/or computing system 865 (similar to computing system 505 of FIG. 5, or the like) might receive, over a network, a request for network services from a user device associated with a customer, the request for network services comprising desired characteristics and performance parameters for the requested network services, without information regarding any of specific hardware, specific hardware type, specific location, or specific network for providing the requested network services. The macro orchestrator 825 and/or the computing system 865 might send, to a first micro orchestrator among a plurality of micro orchestrators (e.g., the one or more micro orchestrators 830, or the like), the received request for network services, where the macro orchestrator automates, manages, or controls each of the plurality of micro orchestrators, while each micro orchestrator automates, manages, or controls at least one of a plurality of domain managers (e.g., the one or more domain managers 835, or the like) or a plurality of network resources (e.g., network resources 840, or the like). In response to receiving the request for network services, the first micro orchestrator and/or the computing system 865 might generate a first request-based parsimony tree based at least in part on the desired characteristics and performance parameters contained in the request for network services.

According to some embodiments, the first request-based parsimony tree might be a graphical representation including, without limitation, an end-point of a first portion representing delivery location of the requested network services, an endpoint of each of one or more second portions that connect with the first portion representing a service provider site, each intersection between two or more second portions or between the first portion and one of the second portions representing a network resource node, and characteristics of the first and second portions representing the desired characteristics and performance parameters contained in the request for network services, and/or the like. In some cases, the plurality of micro orchestrators might each include, but is not limited to, one of a server computer over a network, a cloud-based computing system over a network, or a distributed computing system, and/or the like.

The first micro orchestrator and/or the computing system 865 might access, from a datastore, a plurality of first network-based parsimony trees, each of the plurality of first network-based parsimony trees being generated based on measured network metrics. In some embodiments, each first network-based parsimony tree might be a graphical representation including, but not limited to, an end-point of a third portion representing the delivery location of the requested network services, an endpoint of each of one or more fourth portions that connect with the third portion representing a service provider site, each intersection between two or more fourth portions or between the third portion and one of the fourth portions representing a network resource node, and characteristics of the third and fourth portions representing measured characteristics and performance parameters based on the measured network metrics.

According to some embodiments, the first portion of the first request-based parsimony tree and the third portion of each first network-based parsimony tree might each be represented by a trunk, while the one or more second portions of the first request-based parsimony tree and the one or more fourth portions of each first network-based parsimony tree might each be represented by a branch, and, in each parsimony tree, one or more branches might connect with the trunk. In some cases, in each of at least one parsimony tree, two or more branches might connect with each other via one or more connector branches and via the trunk, or the like. In some instances, each portion of each first network-based parsimony tree might be represented by a second network-based parsimony tree among a plurality of second network-based parsimony tree that is indicative of characteristics and performance parameters of that portion, where each portion of each second network-based parsimony tree might be represented by a third network-based parsimony tree among a plurality of third network-based parsimony tree that is indicative of characteristics and performance parameters of that portion, and so on in a fractal-like manner.

In some embodiments, the characteristics of the first and second portions and the characteristics of the third and fourth portions might include, without limitation, at least one of thickness of each portion, length of each portion from the delivery location of the requested network services, number of network resource nodes on each portion, color-code of each portion, number of second or fourth portions, angle of each second or fourth portion relative to the first or third portion, number of any connector portions between two or more second or fourth portions, relative location of any connector portions between two or more second or fourth portions, length of any connector portions between two or more second or fourth portions, or angle of any connector portions between two or more second or fourth portions, and/or the like. In some instances, the characteristics of the first and second portions and the characteristics of the third and fourth portions might represent one or more of latency, jitter, packet loss, number of hops, bandwidth, utilization, capacity, or proximity, and/or the like.

According to some embodiments, the first micro orchestrator and/or the computing system 865 might compare the first request-based parsimony tree with one or more first network-based parsimony trees among the plurality of first network-based parsimony trees to determine a fitness score for each first network-based parsimony tree. In some instances, each fitness score might be a value indicative of a level of heuristic matching (in some cases, embodied as a percentage match) between the first request-based parsimony tree with one of the one or more first network-based parsimony trees. In some embodiments, comparing the first request-based parsimony tree with one or more first network-based parsimony trees might comprise comparing the first request-based parsimony tree with one or more first network-based parsimony trees using one or more GPUs, or the like.

Merely by way of example, in some cases, the first micro orchestrator and/or the computing system 865 might identify a best-fit network-based parsimony tree among the one or more first network-based parsimony trees based on the fitness scores of the one or more first network-based parsimony trees; might identify one or more first network resources among a first plurality of network resources for providing the requested network services, based at least in part on network resources represented within the identified best-fit network-based parsimony tree; and might allocate at least one first network resource among the identified one or more first network resources for providing the requested network services. According to some embodiments, identifying the best-fit network-based parsimony tree might comprise identifying the most parsimonious first network-based parsimony tree for providing the requested network resources. That is, the first micro orchestrator and/or the computing system 865 might identify the tree with the simplest (or least complicated) network characteristics or the tree with the shortest (or fewest) network routing requirements, or the like, that enables allocation of the requested network services with the desired characteristics and performance parameters. In some embodiments, at least one of generating first network-based parsimony trees, comparing the first request-based parsimony tree with the one or more first network-based parsimony tree, identifying the best-fit network-based parsimony tree, or identifying the one or more first network resources may be performed using one or more of at least one ML system, at least one AI systems, or at least one NN system, and/or the like.

In some embodiments, the first micro orchestrator and/or the computing system 865 might apply a first filter to at least one first network-based parsimony tree among the one or more first network-based parsimony trees to filter out one or more characteristics or one or more sub-characteristics, prior to comparing the first request-based parsimony tree with the one or more first network-based parsimony trees. According to some embodiments, the characteristics of the third and fourth portions might include color-codes embodied as a color temperature or range of colors for each portion or for each parsimony tree that is indicative of characteristics or performance parameters including one or more of latency, jitter, packet loss, number of hops, bandwidth, utilization, capacity, or proximity, and/or the like. In such cases, alternative or additional to applying the first filter, the first micro orchestrator and/or the computing system 865 might apply a second filter to at least one first network-based parsimony tree among the one or more first network-based parsimony trees to change the color temperature based on changes in measured network metrics.

According to some embodiments, the first micro orchestrator and/or the computing system 865 might receive updated measured network metrics; might, in response to receiving the updated measured network metrics, generate a plurality of updated first network-based parsimony trees; and might replace the plurality of first network-based parsimony trees in the datastore with the plurality of updated first network-based parsimony trees. In some embodiments, the updated measured network metrics might be received according to one of the following: on a periodic basis, on a continual basis, on a random basis, or in response to a change in network characteristic or performance in at least one network resource in a network, and/or the like. In some cases, each of the plurality of updated first network-based parsimony trees might be stored in the datastore as an image file (e.g., .jpg file, .tiff file, .gif file, .bmp file, .png file, .dwf file, .dwg file, .drw file, .stl file, .pdf file, .svg file, .cgm file, etc.).

In some embodiments, rather than a single request-based parsimony tree being generated in response to receiving the request for network services, the first micro orchestrator and/or the computing system 865 might generate a plurality of first request-based parsimony trees, each representing a desired characteristic or performance parameter, and the subsequent functions performed by the first orchestrator and/or the computing system 865 might be performed on this plurality of first request-based parsimony trees rather than the single request-based parsimony tree.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, a request for network services from a user device associated with a customer;
   in response to receiving the request for network services, generating, with the computing system, a first request-based parsimony tree based at least in part on data contained in the request for network services;
   accessing, with the computing system and from a datastore, a plurality of first network-based parsimony trees, each of the plurality of first network-based parsimony trees being generated based on measured network metrics;
   comparing, with the computing system, the first request-based parsimony tree with one or more first network-based parsimony trees among the plurality of first network-based parsimony trees to determine a fitness score for each first network-based parsimony tree, each fitness score being a value indicative of a level of heuristic matching between the first request-based parsimony tree with one of the one or more first network-based parsimony trees;
   identifying, with the computing system, a best-fit network-based parsimony tree among the one or more first network-based parsimony trees based on the fitness scores of the one or more first network-based parsimony trees;
   identifying, with the computing system, one or more first network resources among a first plurality of network resources for providing the requested network services, based at least in part on network resources represented within the identified best-fit network-based parsimony tree; and
   allocating, with the computing system, at least one first network resource among the identified one or more first network resources for providing the requested network services.

2. The method of claim 1, wherein the computing system comprises one of a server computer over a network, one or more graphics processing units ("GPUs"), a cloud-based computing system over a network, or a distributed computing system.

3. The method of claim 1, wherein the data comprises desired performance parameters including at least one of a maximum latency, a maximum jitter, a maximum packet loss, a maximum cost, or a maximum number of hops.

4. The method of claim 1, wherein the data comprises desired characteristics including at least one of requirement for network equipment to be geophysically proximate to the user device associated with the customer, requirement for network equipment to be located within a first geophysical location, requirement to avoid routing network traffic through a second geophysical location, requirement to route network traffic through a third geophysical location, requirement to exclude a first type of network resources from fulfillment of the requested network services, requirement to include a second type of network resources for fulfillment of the requested network services, requirement to fulfill the requested network services based on a single goal indicated by the customer, or requirement to fulfill the requested network services based on multiple goals indicated by the customer.

5. The method of claim 1, wherein a first portion of the first request-based parsimony tree and a second portion of each first network-based parsimony tree are each represented by a trunk.

6. The method of claim 5, wherein characteristics of the first portion and the characteristics of the second portion comprise at least one of thickness of each portion, length of each portion from the delivery location of the requested network services, number of network resource nodes on each portion, and color-code of each portion.

7. The method of claim 6, wherein the characteristics of the first portion and the characteristics of the second portion represent one or more of latency, jitter, packet loss, number of hops, bandwidth, utilization, capacity, or proximity.

8. The method of claim 6, further comprising:
   applying, with the computing system, a first filter to at least one first network-based parsimony tree among the one or more first network-based parsimony trees to filter out one or more characteristics or one or more sub-characteristics, prior to comparing the first request-based parsimony tree with the one or more first network-based parsimony trees.

9. The method of claim 6, wherein the characteristics of the second portion comprise color-codes embodied as a color temperature or range of colors for each portion or for each parsimony tree that is indicative of characteristics or performance parameters including one or more of latency, jitter, packet loss, number of hops, bandwidth, utilization, capacity, or proximity, wherein the method further comprises:
applying, with the computing system, a second filter to at least one first network-based parsimony tree among the one or more first network-based parsimony trees to change the color temperature based on changes in measured network metrics.

10. The method of claim 1, wherein generating the first request-based parsimony tree comprises generating a plurality of first request-based parsimony trees, each representing a desired characteristic or performance parameter; wherein the plurality of first network-based parsimony trees comprises a plurality of first network-based parsimony trees corresponding to each of the desired characteristics and performance parameters, each of the plurality of first network-based parsimony trees being generated based on measured network metrics; wherein comparing the first request-based parsimony tree with one or more first network-based parsimony trees among the plurality of first network-based parsimony trees comprises comparing, with the computing system, each first request-based parsimony tree representing one of the desired characteristics and performance parameters with a corresponding plurality of first network-based parsimony trees; wherein identifying the best-fit network-based parsimony tree comprises identifying, with the computing system, the best-fit network-based parsimony tree corresponding to each of the desired characteristics and performance parameters; and wherein identifying the one or more first network resources is based at least in part on the network resources represented within the identified best-fit network-based parsimony trees.

11. The method of claim 1, wherein comparing the first request-based parsimony tree with one or more first network-based parsimony trees comprises comparing the first request-based parsimony tree with one or more first network-based parsimony trees using one or more graphics processing units ("GPUs").

12. The method of claim 1, wherein each portion of each first network-based parsimony tree is represented by a second network-based parsimony tree among a plurality of second network-based parsimony tree that is indicative of characteristics and performance parameters of that portion, wherein each portion of each second network-based parsimony tree is represented by a third network-based parsimony tree among a plurality of third network-based parsimony tree that is indicative of characteristics and performance parameters of that portion.

13. The method of claim 1, further comprising:
receiving, with the computing system, updated measured network metrics; and
in response to receiving the updated measured network metrics, generating, with the computing system, a plurality of updated first network-based parsimony trees, and replacing, with the computing system, the plurality of first network-based parsimony trees in the datastore with the plurality of updated first network-based parsimony trees.

14. The method of claim 13, wherein the updated measured network metrics are received according to one of the following: on a periodic basis, on a continual basis, on a random basis, or in response to a change in network characteristic or performance in at least one network resource in a network; and wherein each of the plurality of updated first network-based parsimony trees is stored in the datastore as an image file.

15. The method of claim 1, wherein identifying the best-fit network-based parsimony tree comprises identifying the most parsimonious first network-based parsimony tree for providing the requested network resources.

16. The method of claim 1, wherein at least one of generating first network-based parsimony trees, comparing the first request-based parsimony tree with the one or more first network-based parsimony tree, identifying the best-fit network-based parsimony tree, or identifying the one or more first network resources is performed using one or more of at least one machine learning ("ML") system, at least one artificial intelligence ("AI") systems, or at least one neural network ("NN") system.

17. The method of claim 1, wherein receiving the request for network services from the user device associated with the customer comprises receiving, with a macro orchestrator over a network, a request for network services from a user device associated with a customer; wherein generating the first request-based parsimony tree comprises generating, with a first micro orchestrator among a plurality of micro orchestrators, a first request-based parsimony tree; wherein accessing the plurality of first network-based parsimony trees from the datastore comprises accessing, with the first micro orchestrator and from the datastore, a plurality of first network-based parsimony trees; wherein comparing the first request-based parsimony tree with the one or more first network-based parsimony trees comprises comparing, with the first micro orchestrator, the first request-based parsimony tree with one or more first network-based parsimony trees; wherein identifying the best-fit network-based parsimony tree among the one or more first network-based parsimony trees comprises identifying, with the first micro orchestrator, a best-fit network-based parsimony tree among the one or more first network-based parsimony trees; wherein identifying the one or more first network resources for providing the requested network services comprises identifying, with the first micro orchestrator, one or more first network resources among a first plurality of network resources for providing the requested network services; and wherein allocating the at least one first network resource among the identified one or more first network resources for providing the requested network services comprises allocating, with the first micro orchestrator, at least one first network resource among the identified one or more first network resources for providing the requested network services.

18. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a request for network services from a user device associated with a customer;
in response to receiving the request for network services, generate a first request-based parsimony tree based at least in part on data contained in the request for network services;

access, from a datastore, a plurality of first network-based parsimony trees, each of the plurality of first network-based parsimony trees being generated based on measured network metrics;

compare the first request-based parsimony tree with one or more first network-based parsimony trees among the plurality of first network-based parsimony trees to determine a fitness score for each first network-based parsimony tree, each fitness score being a value indicative of a level of heuristic matching between the first request-based parsimony tree with one of the one or more first network-based parsimony trees;

identify a best-fit network-based parsimony tree among the one or more first network-based parsimony trees based on the fitness scores of the one or more first network-based parsimony trees;

identify one or more first network resources among a first plurality of network resources for providing the requested network services, based at least in part on network resources represented within the identified best-fit network-based parsimony tree; and allocate at least one first network resource among the identified one or more first network resources for providing the requested network services.

19. The system of claim 18, wherein the computing system comprises one of a server computer over a network, one or more graphics processing units ("GPUs"), a cloud-based computing system over a network, or a distributed computing system.

* * * * *